(12) United States Patent
Solovyev et al.

(10) Patent No.: US 12,058,337 B2
(45) Date of Patent: Aug. 6, 2024

(54) USAGE OF DCT BASED INTERPOLATION FILTER

(71) Applicant: Huawei Technologies Co., Ltd., Shenzhen (CN)

(72) Inventors: Timofey Mikhailovich Solovyev, Moscow (RU); Maxim Borisovitch Sychev, Moscow (RU); Huanbang Chen, Shenzhen (CN); Alexander Alexandrovich Karabutov, Moscow (RU); Roman Igorevich Chernyak, Moscow (RU); Sergey Yurievich Ikonin, Moscow (RU); Haitao Yang, Shenzhen (CN); Elena Alexandrovna Alshina, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 17/708,866

(22) Filed: Mar. 30, 2022

(65) Prior Publication Data

US 2022/0239922 A1    Jul. 28, 2022

Related U.S. Application Data

(63) Continuation of application No. PCT/RU2020/050260, filed on Sep. 30, 2020.
(Continued)

(30) Foreign Application Priority Data

Oct. 29, 2019  (WO) ................ PCT/CN2019/114161

(51) Int. Cl.
*H04N 19/105*  (2014.01)
*H04N 19/132*  (2014.01)
(Continued)

(52) U.S. Cl.
CPC ......... *H04N 19/137* (2014.11); *H04N 19/105* (2014.11); *H04N 19/132* (2014.11);
(Continued)

(58) Field of Classification Search
CPC .. H04N 19/137; H04N 19/105; H04N 19/132; H04N 19/176; H04N 19/30;
(Continued)

(56) References Cited

U.S. PATENT DOCUMENTS

2005/0181741 A1   8/2005  Raj et al.
2017/0332095 A1  11/2017  Zou et al.
(Continued)

FOREIGN PATENT DOCUMENTS

CN    109155855 A    1/2019
EP      2107746 A2   10/2009
(Continued)

OTHER PUBLICATIONS

Alshin A et al, "Description of SDR, HDR and 360 video coding technology proposal by Samsung, Huawei, GoPro, and HiSilicon," buJoint Video Exploration Team (JVET) of ITU-T SG 16 WP 3 and ISO/IEC JTC 1/SC 29/WG 11, 10th Meeting: San Diego, US, Apr. 10-20, 2018, JVET-J0024_V2, 119 pages.
(Continued)

*Primary Examiner* — Tat C Chio
(74) *Attorney, Agent, or Firm* — Conley Rose, P.C.

(57) ABSTRACT

A method of coding implemented by a decoding/encoding device for coding video data includes for a block coded in affine mode, determining control point motion vectors (CPMVs); determining a reference area in a reference picture corresponding to a sub-block of the affine coded block based on the CPMVs; setting a variable clipMVX equal to TRUE if a size of the reference area is greater than a predefined threshold, otherwise setting a variable clipMVX
(Continued)

equal to FALSE; deriving a pixel-based motion vector field for the affine coded block; wherein, if the variable clipMVX is equal to TRUE, the deriving the pixel-based motion vector field further comprises motion vector clipping based on a first clipping range, wherein the first clipping range is determined based on the determined CPMVs and a size of the affine coded block.

20 Claims, 8 Drawing Sheets

Related U.S. Application Data

(60) Provisional application No. 62/958,291, filed on Jan. 7, 2020, provisional application No. 62/927,671, filed on Oct. 29, 2019, provisional application No. 62/912,049, filed on Oct. 7, 2019, provisional application No. 62/908,594, filed on Sep. 30, 2019.

(51) Int. Cl.
    *H04N 19/137*    (2014.01)
    *H04N 19/176*    (2014.01)
    *H04N 19/30*     (2014.01)
    *H04N 19/46*     (2014.01)

(52) U.S. Cl.
    CPC ........... *H04N 19/176* (2014.11); *H04N 19/30* (2014.11); *H04N 19/46* (2014.11)

(58) Field of Classification Search
    CPC ........ H04N 19/46; H04N 19/55; H04N 19/70; H04N 19/513; H04N 19/54; H04N 19/117; H04N 19/527
    See application file for complete search history.

(56) References Cited

U.S. PATENT DOCUMENTS

| | | |
|---|---|---|
| 2018/0070102 A1 | 3/2018 | Zhang et al. |
| 2018/0192047 A1 | 7/2018 | Lv et al. |
| 2018/0359483 A1 | 12/2018 | Chen et al. |
| 2019/0045192 A1 | 2/2019 | Socek et al. |
| 2019/0089960 A1* | 3/2019 | Chen ................... H04N 19/176 |
| 2019/0230361 A1 | 7/2019 | Zhang et al. |
| 2019/0313116 A1 | 10/2019 | Lee |
| 2019/0335170 A1 | 10/2019 | Lee et al. |
| 2020/0169744 A1 | 5/2020 | Lee et al. |
| 2020/0236385 A1 | 7/2020 | Chono |
| 2020/0275118 A1* | 8/2020 | Wang ..................... H04N 19/52 |
| 2021/0099729 A1* | 4/2021 | Rusanovskyy ........ H04N 19/70 |

FOREIGN PATENT DOCUMENTS

| | | |
|---|---|---|
| EP | 4026333 A2 | 7/2022 |
| WO | 2016184261 A1 | 11/2016 |
| WO | 2017206804 A1 | 12/2017 |
| WO | 2017222325 A1 | 12/2017 |
| WO | 2018128380 A1 | 7/2018 |
| WO | 2019013217 A1 | 1/2019 |
| WO | 2019027286 A1 | 2/2019 |
| WO | 2019069601 A1 | 4/2019 |
| WO | 2019070944 A1 | 4/2019 |
| WO | 2019117659 A1 | 6/2019 |
| WO | WO-2019160860 A1 * | 8/2019 ........... H04N 19/117 |
| WO | 2020256600 A2 | 12/2020 |

OTHER PUBLICATIONS

Jianle Chen et al, "Algorithm description for Versatile Video Coding and Test Model 6 (VTM 6)," Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O2002-v2, 87 pages.

Zhou Yun et al, Study on the Development of Video Coding Standard VVC, 2018, 6 pages.

Zhou Jiantong et al.,"Trends and technologies of video coding," Aug. 8, 2017, 10 pages.

Xiang Li, et al., "CE2-4.4: Affine block memory bandwidth reduction by MV clip," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0398, 4 pages.

Luong Pham Van et al., "CE4-related: Affine restrictions for the worst-case bandwidth reduction," Joint Video Experts Team (JVET) of ITU-T SG 16 WP 3 and ISO/IEC JTC 1/SC 29/WG 11, 12th Meeting: Macao, CN, Oct. 3-12, 2018, JVET-L0396-v7, 6 pages.

Wei-Jung Chien et al., "CE2-related: Worst-case memory bandwidth reduction for VVC," Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0400-v3, 7 pages.

Li, L., et al., "An Efficient Four-Parameter Affine Motion Model for Video Coding," IEEE Transactions on Circuits and Systems for Video Technology, vol. 28, No. 8, Aug. 2018, 15 pages.

ITU-T H.264, Jun. 2019, "Series H: Audiovisual and Multimedia Systems, Infrastructure of audiovisual services—Coding of moving video, Advanced video coding for generic audiovisual services," 836 pages.

ITU-T H.265, Feb. 2018, "Series H: Audiovisual and Multimedia Systems Infrastructure of audiovisual services—Coding of moving video, High efficiency video coding," 692 pages.

\* cited by examiner

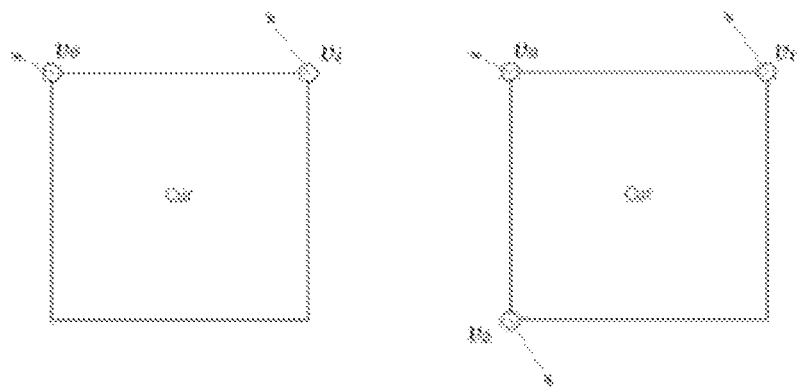
FIG. 6A 4 parameter affine model    FIG. 6B 6 parameter affine model
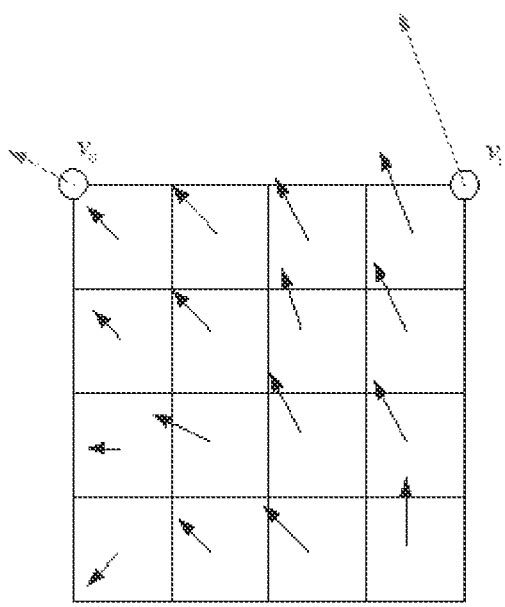
Affine subblock motion vector field
FIG. 7

USAGE OF DCT BASED INTERPOLATION FILTER

CROSS-REFERENCE TO RELATED APPLICATIONS

This is a continuation of International Patent Application No. PCT/RU2020/050260 filed on Sep. 30, 2020, which claims priority to U.S. Provisional Patent Application No. 62/908,594 filed on Sep. 30, 2019, U.S. Provisional Patent Application No. 62/912,049 filed on Oct. 7, 2019, U.S. Provisional Patent Application No. 62/927,671 filed on Oct. 29, 2019, International Patent Application No. PCT/CN2019/114161 filed on Oct. 29, 2019, and U.S. Provisional Patent Application No. 62/958,291 filed on Jan. 7, 2020. All of the aforementioned patent applications are hereby incorporated by reference in their entireties.

TECHNICAL FIELD

Embodiments of the present disclosure generally relate to the field of picture processing and more particularly to inter prediction, such as adaptive usage of interpolation filters in affine motion compensation or sub-block motion compensation.

BACKGROUND

Video encoding and decoding (coding) is used in a wide range of digital video applications, for example broadcast digital television (TV), video transmission over internet and mobile networks, real-time conversational applications such as video chat, video conferencing, DIGITSL VERSATILE DISC (DVD) and BLU-RAY discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

Particular embodiments are outlined in the attached independent claims, with other embodiments in the dependent claims.

The present disclosure provides, according to a first aspect, a method of coding implemented by a decoding/encoding device for coding video data, wherein the method comprises the following steps: for a block coded in affine mode, determining control point motion vectors (CPMVs), determining a reference area in a reference picture corresponding to a sub-block of the affine coded block based on the determined CPMVs, setting a variable clipMVX equal to TRUE if a size of the reference area is greater than a predefined threshold, otherwise setting a variable clipMVX equal to FALSE, deriving a pixel-based motion vector field for the affine coded block, wherein, if the variable clipMVX is equal to TRUE, the deriving the pixel-based motion vector field further comprises motion vector clipping with a first motion vector range, wherein the first motion vector range is determined based on the determined CPMVs and a size of the affine coded block.

The reference area is a rectangular area comprising all reference samples that are needed to perform motion compensation of the current block, as depicted in FIG. 9, having width W' and height H'.

This method has the advantage that memory bandwidth requirements can be met even if the reference area in the reference picture is large.

According to an implementation form of the first aspect, the first motion vector range determination comprises determining a motion vector for a central point of the affine coded block, determining a second motion vector range based on the motion vector for the central point of the affine coded block and predefined offsets for a respective block size, the block size comprising the size of the affine coded block. This provides a convenient way of determining the clipping range and avoid unnecessary clipping in case of asymmetrical scaling in vertical and horizontal directions is performed. With the proposed condition check motion vector (MV) scaling is used only in case of memory bandwidth is really more than the threshold set as a predefined value based on the desirable memory bandwidth worst-case.

According to another implementation form of the first aspect, the determining a motion vector for the central point of the affine coded block is performed by the following equations:

$$mv\_center[0]=(mvBaseScaled[0]+dX[0]*(cbWidth>>1)+dY[0]*(cbHeight>>1));\text{ and}$$

$$mv\_center[1]=(mvBaseScaled[1]+dX[1]*(cbWidth>>1)+dY[1]*(cbHeight>>1)),$$

wherein mvBaseScaled represents the motion vector of the top left corner of the block, cbWidth and cbHeight represents the width and height of the block, respectively, dX[0], dX[1] represents the respective differences of the horizontal and vertical parts of the motion vector per one sample in horizontal direction, and dY[0], dY[1] represents the respective differences of the horizontal and vertical parts of the motion vector per one sample in vertical direction, and mv_center [0] and mv_center [1] represent horizontal and vertical parts of the motion vector for the central point, respectively.

According to another implementation form of the first aspect, the determining a second motion vector range based on the motion vector for the central point of the affine coded block and the predefined offsets for a respective block size is performed by the following equations:

$$mv\_hor\_min = mv\_center[0] - deviationMV[\log 2CbWidth - 3];$$

$$mv\_ver\_min = mv\_center[1] - deviationMV[\log 2CbHeight - 3];$$

$$mv\_hor\_max = mv\_center[0] + deviationMV[\log 2CbWidth - 3]; \text{ and}$$

$$mv\_ver\_max = mv\_center[1] + deviationMV[\log 2CbHeight - 3],$$

wherein deviationMV[ ] represents a table of the offsets predefined for a respective block size, and mv_hor_min, mv_ver_min, mv_hor_max and mv_ver_max represent the second motion vector range. Such MV range calculation based on motion vector for the central point of the block and the predefined offsets almost do not required any additional complexity and guaranteed that memory bandwidth will be less than the predefined threshold. But for 6-parameters affine motion module such a method can cause unnecessary motion vector clipping if asymmetric scaling factors are used horizontally and vertically. For example if block is scaled with scaling factor X vertically and 1/X horizontally, without additional conditions, just performing clipping, according to the bounding box, obtained based on motion vector for the central point of the block and the predefined offsets, corresponding to the width/height of the block, significant part of the transformed block will be missed due to the MV clipping, as a result, prediction quality will be poor, whereas in this particular example the reference area of the block is almost the same as the area of the block itself since (1/X)*X is equal to 1, so memory bandwidth is close to 1 so motion vector clipping made for restricting memory bandwidth is not needed in this case. Not applying additional motion vector clipping in cases, when memory bandwidth is less than the required memory bandwidth threshold, provides video coding efficiency improvement as additional unnecessary motion vector clipping cause motion field quality degradation that in turn cause predicted and reconstructed signal quality degradation. With the method, provided in the disclosure, MV clipping is performed only if it's really needed and in so doing the coding efficiency in comparison with unconditionally applied MV clipping is improved.

According to another implementation form of the first aspect, the offsets predefined for respective block sizes are proportional to {64, 128, 272, 560, 1136}, wherein 64 corresponds to the block size having corresponding dimension equal to 8, 128 corresponds to the block size having corresponding dimension equal to 16, 272 corresponds to the block size having corresponding dimension equal to 32, 560 corresponds to the block size having corresponding dimension equal to 64, or 1136 corresponds to the block size having corresponding dimension equal to 128. Here block size may refer to block width/height. This process may be performed for vertical and horizontal parts of the motion vector separately. If block, e.g. has width equal to 8 and height equal to 16 then for the horizontal part of the motion vector the offset will corresponds to 8 and for the vertical part of the motion vector the offset will corresponds to 16. Therefore, this applies also to rectangular blocks, not only for square blocks.

According to another implementation form of the first aspect, after the first motion vector range determination, the first motion vector range is scaled according to subsampling parameters SubWidthC and SubHeightC:

$$hor\_min = hor\_min / SubWidthC;$$

$$hor\_max = hor\_max / SubWidthC;$$

$$ver\_min = ver\_min / SubHeightC; \text{ and}$$

$$ver\_max = ver\_max / SubHeightC,$$

wherein hor_min, ver_min, hor_max and ver_max represent the scaled first motion vector range. It's important here that such scaling is performed after the first motion vector range derivation. It helps to avoid additional logic distinguishing luma and chroma cases inside first motion vector range determination module.

According to another implementation form of the first aspect, the method further comprises the steps of obtaining interpolated samples in a reference picture based on the derived motion vector field using bilinear interpolation, and applying a high-pass filter to the interpolated samples. Accordingly, the method is advantageously applicable to affine motion compensation using enhanced bi-linear interpolation filter (EIF).

Using pixel-based motion compensation cause additional computational efforts due to less number of operation results can be reused during the interpolation process. That's the reason why pixel-based motion compensation is rarely used with e.g. 8-tap discrete cosine transform (DCT)-based filters that are in contrast widely used for block based motion compensation. Using pixel-based motion compensation with bilinear interpolation allows to preserve and in some cases even reduce complexity in comparison with block-based motion compensation with 8-tap DCT-based interpolation filters, but shorter filter creates visible blurring artifacts that made such pixel-based motion compensation unpractical. At the same time adding simple 3-tap high-pass filter with the fixed coefficients after the bilinear interpolation allows to achieve noticeable subjective improvement of the reconstructed signal with manageable complexity.

According to another implementation form of the first aspect, the sub-block of the affine coded block has a size 4×4.

According to another implementation form of the first aspect, the predefined threshold is 72.

According to another implementation form of the first aspect, in case that the affine inter-prediction comprises bi-prediction, the setting a variable clipMVX comprises deriving the variable clipMV0 for list 0 (clipMVX, X=0) deriving the variable clipMV1 for list 1 (clipMVX, X=1) deriving the variable clipMV as clipMV0|clipMV1, wherein "|" means OR.

The present disclosure provides, according to a second aspect, an encoder comprising processing circuitry for carrying out the method according to the first aspect or any implementation form thereof.

The present disclosure provides, according to a third aspect, a decoder comprising processing circuitry for carrying out the method according to the first aspect or any implementation form thereof.

The present disclosure provides, according to a fourth aspect, a computer program product comprising instructions which, when the program is executed by a computer, cause the computer to carry out the method according to the first aspect or any implementation form thereof.

The present disclosure provides, according to a fifth aspect, a decoder, comprising one or more processors, and a non-transitory computer-readable storage medium coupled to the one or more processors and storing instructions for execution by the one or more processors, wherein the programming, when executed by the one or more processors, configures the decoder to carry out the method according to the first aspect or any implementation form thereof.

The present disclosure provides, according to a sixth aspect, an encoder, comprising one or more processors, and a non-transitory computer-readable storage medium coupled to the one or more processors and storing instructions for execution by the one or more processors, wherein the programming, when executed by the processors, configures the encoder to carry out the method according to the first aspect or any implementation form thereof.

The present disclosure provides, according to a seventh aspect, a non-transitory computer-readable medium carrying a program code which, when executed by a computer device, causes the computer device to perform the method of any one of the first aspect or any implementation form thereof.

The present disclosure provides, according to an eighth aspect, a decoder or an encoder for coding a video sequence, comprising a determining unit configured determine CPMVs for a affine coded block coded in affine mode and to determine a reference area in a reference picture corresponding to a sub-block of the affine coded block based on the determined CPMVs, and a predicting unit configured to set a variable clipMVX equal to TRUE if a size of the reference area is greater than the predefined threshold, otherwise set a variable clipMVX equal to FALSE, derive a pixel-based motion vector field for the affine coded block, wherein, if variable clipMVX is equal to TRUE, deriving the pixel-based motion vector field further comprises motion vector clipping with a first motion vector range, wherein the first motion vector range is determined based on the determined CPMVs and a size of the affine coded block.

The advantages of the decoder or encoder according to the eighth aspect or any of the following implementation forms thereof correspond to the respective advantages of the method according to the first aspect or implementation form thereof.

According to an implementation form of the eighth aspect, the first motion vector range determination comprises determining a motion vector for a central point of the affine coded block, determining a second motion vector range based on the motion vector for the central point of the affine coded block and predefined offsets for a respective block size, the block size comprising the size of the affine coded block.

According to another implementation form of the eighth aspect, the determining a motion vector for the central point of the affine coded block is performed by the following equations:

$$mv\_center[0]=(mvBaseScaled[0]+dX[0]*(cbWidth>>1)+dY[0]*(cbHeight>>1));\ and$$

$$mv\_center[1]=(mvBaseScaled[1]+dX[1]*(cbWidth>>1)+dY[1]*(cbHeight>>1)),$$

wherein mvBaseScaled represents the motion vector of the top left corner of the block, cbWidth and cbHeight represents the width and height of the block, respectively, dx[0], dX[1] represents the respective differences of the horizontal and vertical parts of the motion vector per one sample in horizontal direction, and dY[0], dY[1] represents the respective differences of the horizontal and vertical parts of the motion vector per one sample in vertical direction, and mv_center [0] and mv_center [1] represent the horizontal and vertical parts of the motion vector for the central point, respectively.

According to another implementation form of the eighth aspect, the determining a second motion vector range based on the motion vector for the central point of the affine coded block and the predefined offsets for a respective block size is performed by the following equations:

$$mv\_hor\_min=mv\_center[0]-deviationMV[\log 2CbWidth-3];$$

$$mv\_ver\_min=mv\_center[1]-deviationMV[\log 2CbHeight-3];$$

$$mv\_hor\_max=mv\_center[0]+deviationMV[\log 2CbWidth-3];\ and$$

$$mv\_ver\_max=mv\_center[1]+deviationMV[\log 2CbHeight-3],$$

wherein deviationMV[ ] represents a table of the offsets predefined for a respective block size, and mv_hor_min, mv_ver_min, mv_hor_max and mv_ver_max represent the second motion vector range.

According to another implementation form of the eighth aspect, the offsets predefined for respective block sizes are proportional to {64, 128, 272, 560, 1136}, wherein 64 corresponds to the block size having corresponding dimension equal to 8, 128 corresponds to the block size having corresponding dimension equal to 16, 272 corresponds to the block size having corresponding dimension equal to 32, 560 corresponds to the block size having corresponding dimension equal to 64, or 1136 corresponds to the block size having corresponding dimension equal to 128. This "proportional" means that the MV precision can be different but will be proportional to the given values in the table. For example, with a factor of 2, the offsets may be defined by {128, 272, 560, 1136, 2272}.

According to another implementation form of the eighth aspect, after the first motion vector range determination, the first motion vector range is scaled according to subsampling parameters SubWidthC and SubHeightC:

$$hor\_min=hor\_min/SubWidthC;$$

$$hor\_max=hor\_max/SubWidthC;$$

$$ver\_min=ver\_min/SubHeightC;\ and$$

$$ver\_max=ver\_max/SubHeightC,$$

wherein hor_min, ver_min, hor_max and ver_max represent the scaled first motion vector range.

According to another implementation form of the eighth aspect, the encoder or decoder is configured to perform the steps of obtaining interpolated samples in a reference picture based on the derived motion vector field using bilinear interpolation, and applying a high-pass filter to the interpolated samples.

According to another implementation form of the eighth aspect, the sub-block of the affine coded block has a size 4×4.

According to another implementation form of the eighth aspect, the predefined threshold is 72.

According to another implementation form of the eighth aspect, in case that the affine inter-prediction comprises bi-prediction, the setting a variable clipMVX comprises deriving the variable clipMV0 for list 0, deriving the variable clipMV1 for list 1, deriving the variable clipMV as clipMV0|clipMV1, wherein "|" means OR.

According to an example, the disclosure relates to a method for inter-prediction of a current image block in a current picture of a video, the method is used by a decoding/encoding device the method comprising calculating a sub-block size M×N based on affine motion model parameters or based on information from which the affine motion model parameters can be derived, in the case that either a subblock width M or a subblock height N is smaller than or equal to a predefined value, performing EIF motion compensation process, wherein the performing EIF motion compensation process comprises deriving a motion vector of a respective subblock of an image block (such as an affine image block) based on the affine motion model parameters on a P×Q (such as 1×1) subblock basis, and performing clipping on the motion vector of the subblock, so that the clipped motion vector is in a motion vector range (such as a second motion vector range).

According to another example, the present disclosure relates to an apparatus for inter-prediction of a current image block in a current picture of a video The apparatus comprises a first module configured for calculating a subblock size M×N based on affine motion model parameters or based on information from which the affine motion model parameters can be derived, a second module configured for performing, in the case that either a subblock width M or a subblock height N is smaller than or equal to a predefined value, enhanced bi-linear EIF motion compensation process, wherein performing EIF motion compensation process comprises deriving a motion vector of a respective subblock of an image block (such as an affine image block) based on the affine motion model parameters on a P×Q (such as 1×1) subblock basis, and performing clipping on the motion vector of the subblock, so that the clipped motion vector is in a motion vector range (such as a second motion vector range).

The method according to the example can be performed by the apparatus according to the other example.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings.

FIG. 6A is an illustration example of control point based affine motion model: 4-parameters.

FIG. 6B is an illustration example of control point based affine motion model: 6-parameters.

FIG. 7 is an illustration example of affine subblock motion vector field.

Figure 1A:
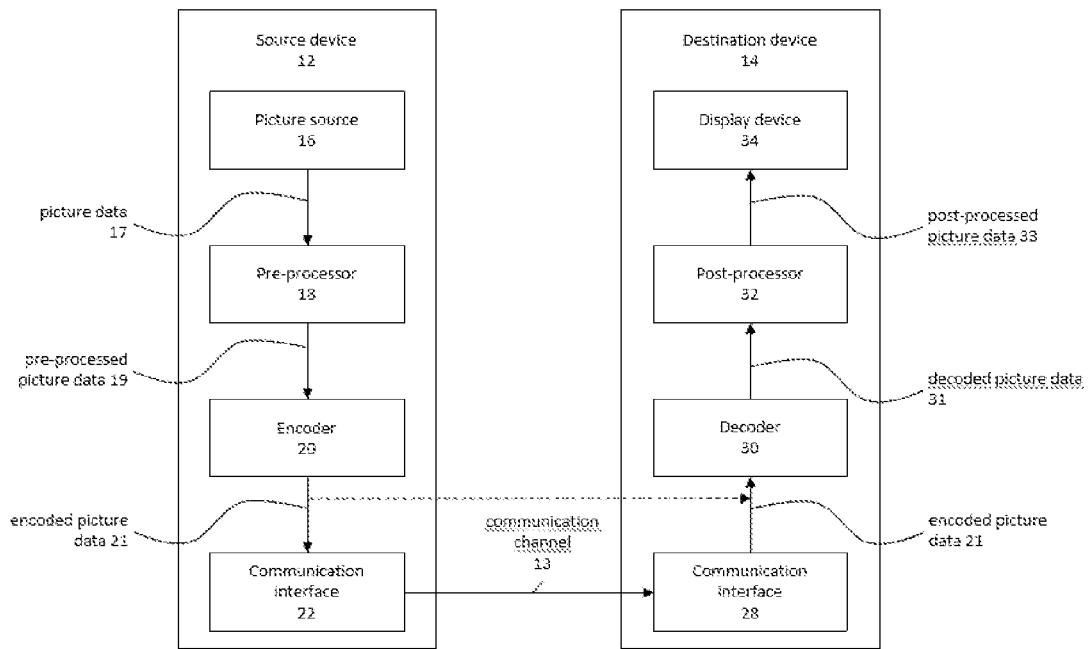
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as coding and decoding (CODEC).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and two-dimensional (2D) transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from red, green, and blue (RGB) to luma, blue projection, and red projection (YCbCr)), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g., comprise liquid-crystal displays (LCDs), organic light-emitting diode (OLED) displays, plasma displays, projectors, micro LED displays, liquid-crystal on silicon (LCoS) displays, digital light processor (DLP) displays, or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
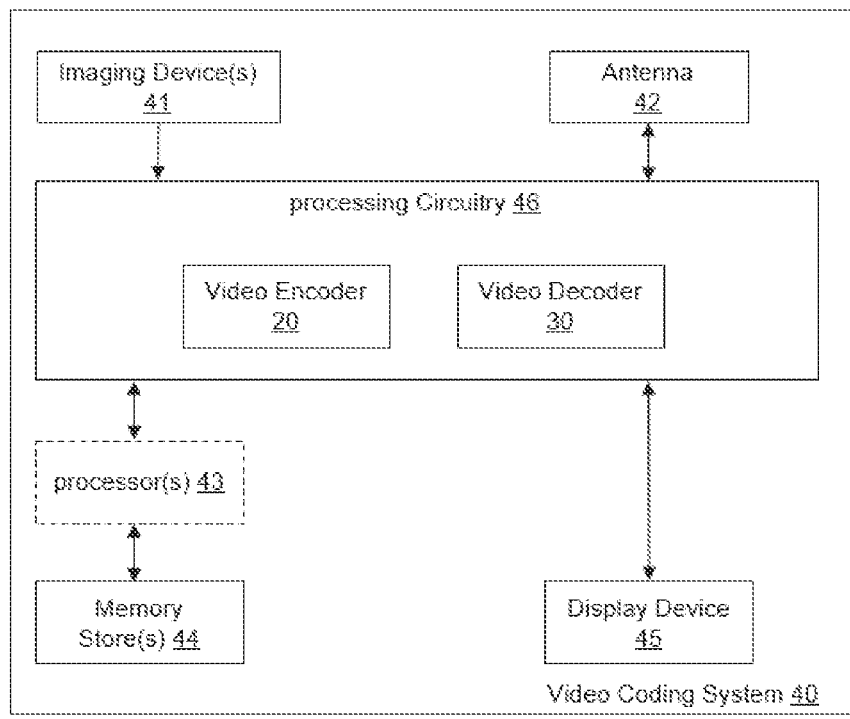
FIG. 1B is a block diagram showing another example of a video coding system configured to implement embodiments of the disclosure.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of the International Telecommunication Union (ITU) Telecommunication Standardization Sector ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
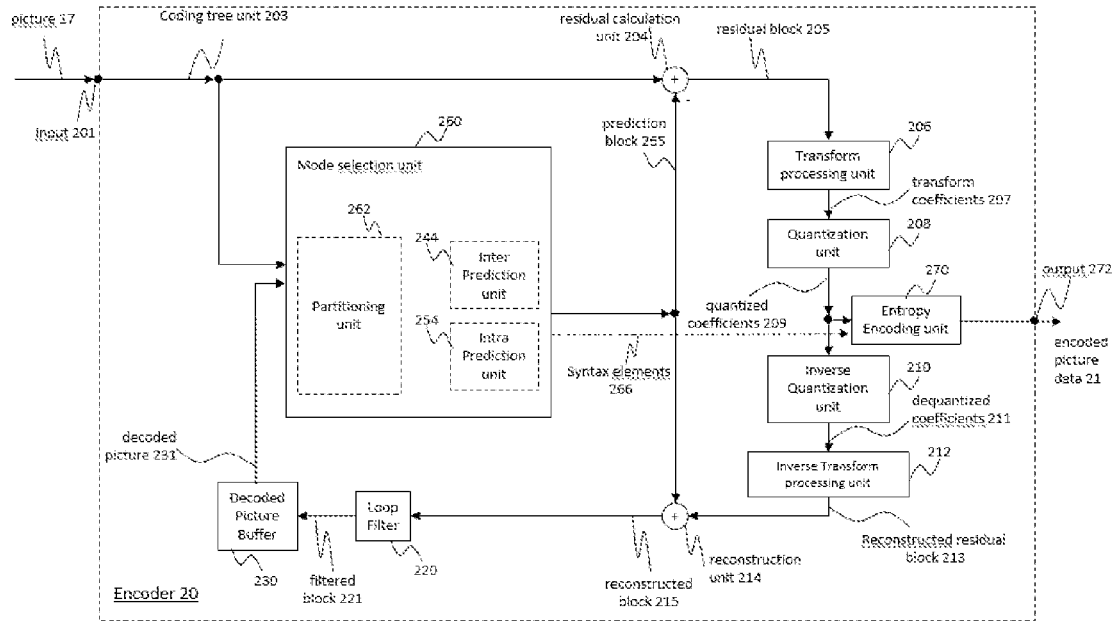
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
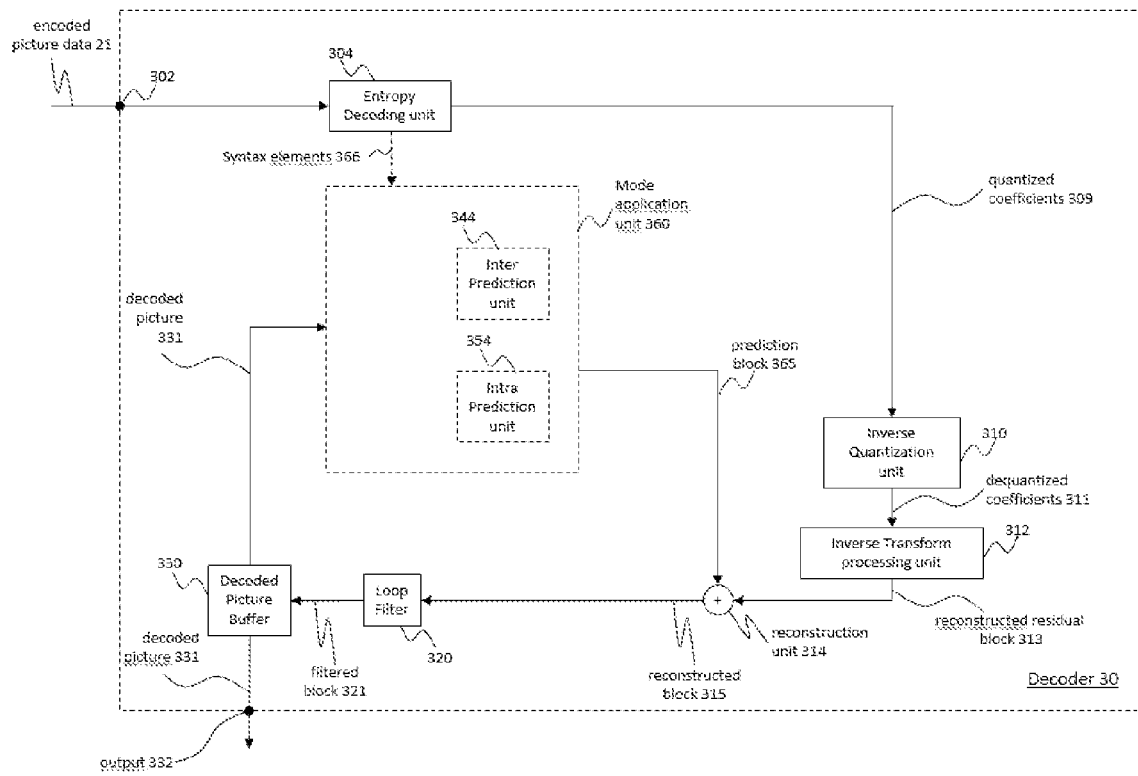
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the DPB 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the DPB 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/Advanced Video Coding (AVC)) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video encoder 20 as shown in FIG. 2 may be further configured to partition and/or encode the picture by using slices/tile groups (also referred to as video tile groups) and/or tiles (also referred to as video tiles), wherein a picture may be partitioned into or encoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation:

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform:

The transform processing unit 206 may be configured to apply a transform, e.g. a DCT or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization:

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a QP. The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output QPs, e.g. directly or encoded via the entropy encoding unit 270, so that, e.g., the video decoder 30 may receive and apply the quantization parameters for decoding.

Inverse Quantization:

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse DCT or DST or other inverse transforms, to obtain a reconstructed residual block 213 (or corresponding dequantized coefficients 213) in the sample domain. The reconstructed residual block 213 may also be referred to as transform block 213.

Reconstruction:

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering:

The loop filter unit 220 (or short "loop filter" 220), is configured to filter the reconstructed block 215 to obtain a filtered block 221, or in general, to filter reconstructed samples to obtain filtered sample values. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, alternative temporal motion vector prediction (ATMVP) sub-blocks edges, sub-block transform (SBT) edges and intra sub-partition (ISP) edges. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as SAO filter parameters or ALF filter parameters or LMCS parameters), e.g. directly or encoded via the entropy encoding unit 270, so that, e.g., a decoder 30 may receive and apply the same loop filter parameters or respective loop filters for decoding.

DPB:

The DPB 230 may be a memory that stores reference pictures, or in general reference picture data, for encoding video data by video encoder 20. The DPB 230 may be formed by any of a variety of memory devices, such as dynamic random-access memory (RAM) (DRAM), including synchronous DRAM (SDRAM), magnetoresistive RAM (MRAM), resistive RAM (RRAM), or other types of memory devices. The DPB 230 may be configured to store one or more filtered blocks 221. The DPB 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The DPB 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction):

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition a picture from a video sequence into a sequence of coding tree units (CTUs), and the CTU 203 may be further partitioned into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning:

The partitioning unit 262 may be configured to partition a picture from a video sequence into a sequence of coding tree units (CTUs), and the partitioning unit 262 may partition (or split) a coding tree unit (CTU) 203 into smaller partitions, e.g. smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing VVC, but it can be specified to be value rather than 128×128 in the future, for example, 256×256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile. There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quadtree structure similar to the coding tree for the CU.

In embodiments, e.g., according to the latest video coding standard currently in development, which is referred to as VVC, a combined Quad-tree nested multi-type tree using binary and ternary splits segmentation structure for example used to partition a coding tree unit. In the coding tree structure within a coding tree unit, a CU can have either a square or rectangular shape. For example, the coding tree unit (CTU) is first partitioned by a quaternary tree. Then the quaternary tree leaf nodes can be further partitioned by a multi-type tree structure. There are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU. VVC develops a unique signaling mechanism of the partition splitting information in quadtree with nested multi-type tree coding tree structure. In the signaling mechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned, when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64, as shown in FIG. 6. TT split is also forbidden when either width or height of a chroma coding block is larger than 32. The pipelining design will divide a picture into virtual pipeline data units (VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In addition, it should be noted that, when a portion of a tree node block exceeds the bottom or right picture boundary, the tree node block is forced to be split until the all samples of every coded CU are located inside the picture boundaries.

As an example, the intra sub-partitions (ISP) tool may divide luma intra-predicted blocks vertically or horizontally into 2 or 4 sub-partitions depending on the block size.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction:

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC. As an example, several conventional angular intra prediction modes are adaptively replaced with wide-angle intra prediction modes for the non-square blocks, e.g. as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction:

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel, quarter-pel and/or 1/16 pel interpolation, or not.

Additional to the above prediction modes, skip mode, direct mode and/or other inter prediction mode may be applied.

For example, Extended merge prediction, the merge candidate list of such mode is constructed by including the following five types of candidates in order: spatial motion vector prediction (MVP) from spatial neighbor CUs, temporal MVP from collocated CUs, history-based MVP from a first in first out (FIFO) table, pairwise average MVP and zero MVs. And a bilateral-matching based decoder side motion vector refinement (DMVR) may be applied to increase the accuracy of the MVs of the merge mode. Merge mode with MV difference (MVD) (MMVD), which comes from merge mode with motion vector differences. A MMVD flag is signaled right after sending a skip flag and merge flag to specify whether MMVD mode is used for a CU. And a CU-level adaptive motion vector resolution (AMVR)

scheme may be applied. AMVR allows MVD of the CU to be coded in different precision. Dependent on the prediction mode for the current CU, the MVDs of the current CU can be adaptively selected. When a CU is coded in merge mode, the combined inter/intra prediction (CIIP) mode may be applied to the current CU. Weighted averaging of the inter and intra prediction signals is performed to obtain the CIIP prediction. Affine motion compensated prediction, the affine motion field of the block is described by motion information of two control point (4-parameter) or three CPMVs (6-parameter). Subblock-based temporal motion vector prediction (SbTMVP), which is similar to the temporal motion vector prediction (TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. Triangle partition mode, in such a mode, a CU is split evenly into two triangle-shaped partitions, using either the diagonal split or the anti-diagonal split. Besides, the bi-prediction mode is extended beyond simple averaging to allow weighted averaging of the two prediction signals.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding:

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method:

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a DBP 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214, the loop filter 220, the DPB 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding:

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization:

The inverse quantization unit 310 may be configured to receive QPs (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform:

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction:

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering:

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 320 is shown in FIG. 3 as being an in loop filter, in other configurations, the loop filter unit 320 may be implemented as a post loop filter.

DPB:

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction:

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or generalized P and B (GPB) slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video decoder 30 as shown in FIG. 3 may be configured to partition and/or decode the picture by using slices/tile groups (also referred to as video tile groups) and/or tiles (also referred to as video tiles), wherein a picture may be partitioned into or decoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to CPMVs of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(bitDepth-1) \sim 2^{\wedge}(bitDepth-1)-1$, where "^" means exponentiation. For example, if bitDepth is set equal to 16, the range is $-32768 \sim 32767$, if bitDepth is set equal to 18, the range is $-131072 \sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Figure 4:
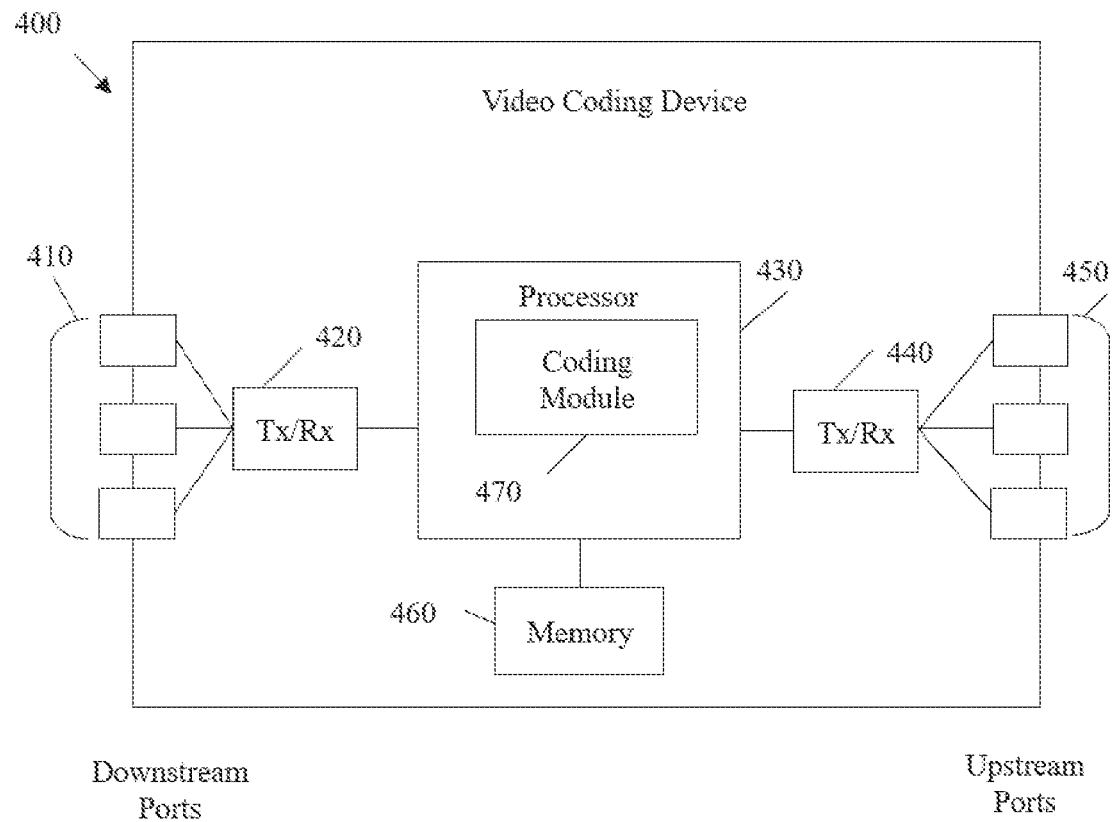
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data, a processor, logic unit, or central processing unit (CPU) 430 to process the data, transmitter units (Tx) 440 and egress ports 450 (or output ports 450) for transmitting the data, and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), RAM, ternary content-addressable memory (TCAM), and/or static RAM (SRAM).

Figure 5:
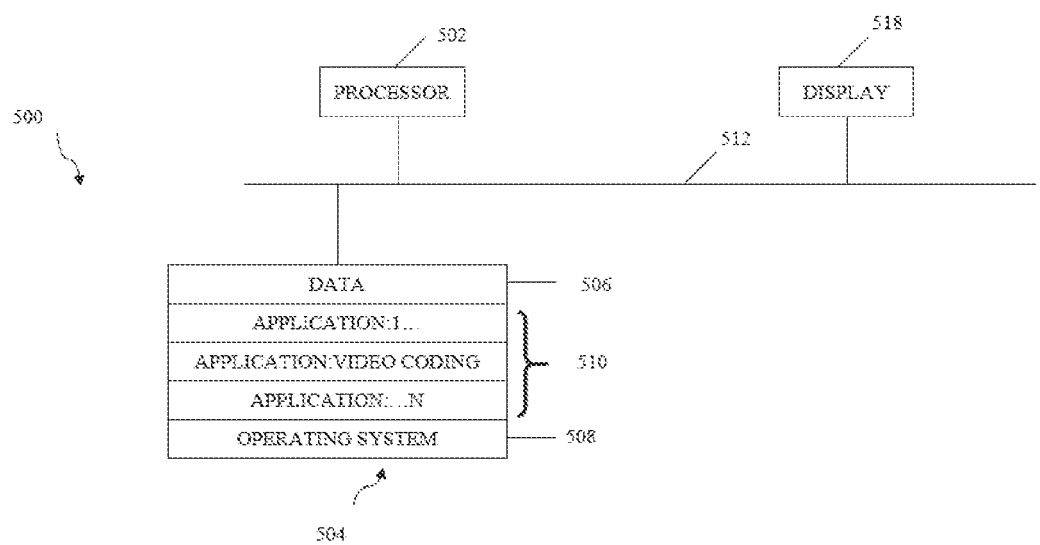
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a ROM device or a RAM device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Affine motion compensated prediction:

In ITU-T H.265, only translation motion model is applied for motion compensation prediction (MCP). While in the real world, there are many kinds of motion, e.g. zoom in/out, rotation, perspective motions and the other irregular motions. In the VTM6, a block-based affine transform motion compensation prediction is applied. As shown at FIG. 6, the affine motion field of the block is described by motion information of two control point (4-parameter) or three CPMVs (6-parameter).

The general equation for calculation motion vector at sample location (x, y) is:

$$\begin{cases} mv_x = dHorX * x + dVerY * y + mv_{0x} \\ mv_y = dHorY * x + dVerY * y + mv_{0y} \end{cases} \quad (1\text{-}1)$$

For 4-parameter affine motion model, motion vector at sample location (x, y) is derived as:

$$\begin{cases} mv_x = \frac{mv_{1x} - mv_{0x}}{W} x + \frac{mv_{0y} - mv_{1y}}{W} y + mv_{0x} \\ mv_y = \frac{mv_{1y} - mv_{0y}}{W} x + \frac{mv_{1x} - mv_{0x}}{W} y + mv_{0y} \end{cases} \quad (1\text{-}2)$$

For 6-parameter affine motion model, motion vector at sample location (x, y) is derived as:

$$\begin{cases} mv_x = \frac{mv_{1x} - mv_{0x}}{W} x + \frac{mv_{2x} - mv_{0x}}{H} y + mv_{0x} \\ mv_y = \frac{mv_{1y} - mv_{0y}}{W} x + \frac{mv_{2y} - mv_{0y}}{H} y + mv_{0y} \end{cases} \quad (1\text{-}3)$$

Where ($mv_{0x}$, $mv_{0y}$) is motion vector of the top-left corner control point, ($mv_{1x}$, $mv_{1y}$) is motion vector of the top-right corner control point, and ($mv_{2x}$, $mv_{2y}$) is motion vector of the bottom-left corner control point.

For case of using 6-parameter affine motion model $$dHorX = \frac{mv_{1x} - mv_{0x}}{W} \quad (1\text{-}4)$$

$$dHorY = \frac{mv_{1y} - mv_{0y}}{W}, \quad (1\text{-}5)$$

$$dVerX = \frac{mv_{2x} - mv_{0x}}{H}, \quad (1\text{-}6)$$

$$dVerY = \frac{mv_{2y} - mv_{0y}}{H} \quad (1\text{-}7)$$

For case of using 4-parameter affine motion model, $$dHorX = \frac{mv_{1x} - mv_{0x}}{W} \quad (1\text{-}8)$$

$$dHorY = \frac{mv_{1y} - mv_{0y}}{W}, \quad (1\text{-}9)$$

$$dVerX = -dHorY, \quad (1\text{-}10)$$

$$dVerY = dHorX. \quad (1\text{-}11)$$

As done for translational motion inter prediction, there are also two affine motion inter prediction modes: affine merge mode and affine AMVP mode.

Block Based Affine Transform Prediction:

In order to simplify the motion compensation prediction, block based affine transform prediction is applied. To derive motion vector of each 8×8 luma sub-block, the motion vector of the center sample of each sub-block, as shown in FIG. 7, is calculated according to above equations, and rounded to $\frac{1}{16}$ fraction accuracy. Then the motion compensation interpolation filters are applied, to generate the prediction of each sub-block with derived motion vector. The sub-block size of chroma-components is set to be 4×4.

Enhanced Bilinear Interpolation Filter:

EIF can be used for a prediction block and on subblock basis. The filtering procedure is the same for luma and for chroma signals, the filtering procedure comprises of following steps.

Deriving pixel-based motion vector field from the CPMVs, according to the equation (1-1).

Obtaining interpolated samples based on the derived motion vectors, using bilinear interpolation for the fractional offsets.

Performing horizontal and then vertical filtering using fixed 3—tap high-pass filter [−1, 10, −1] with normalization factor of 8.

Figure 8:
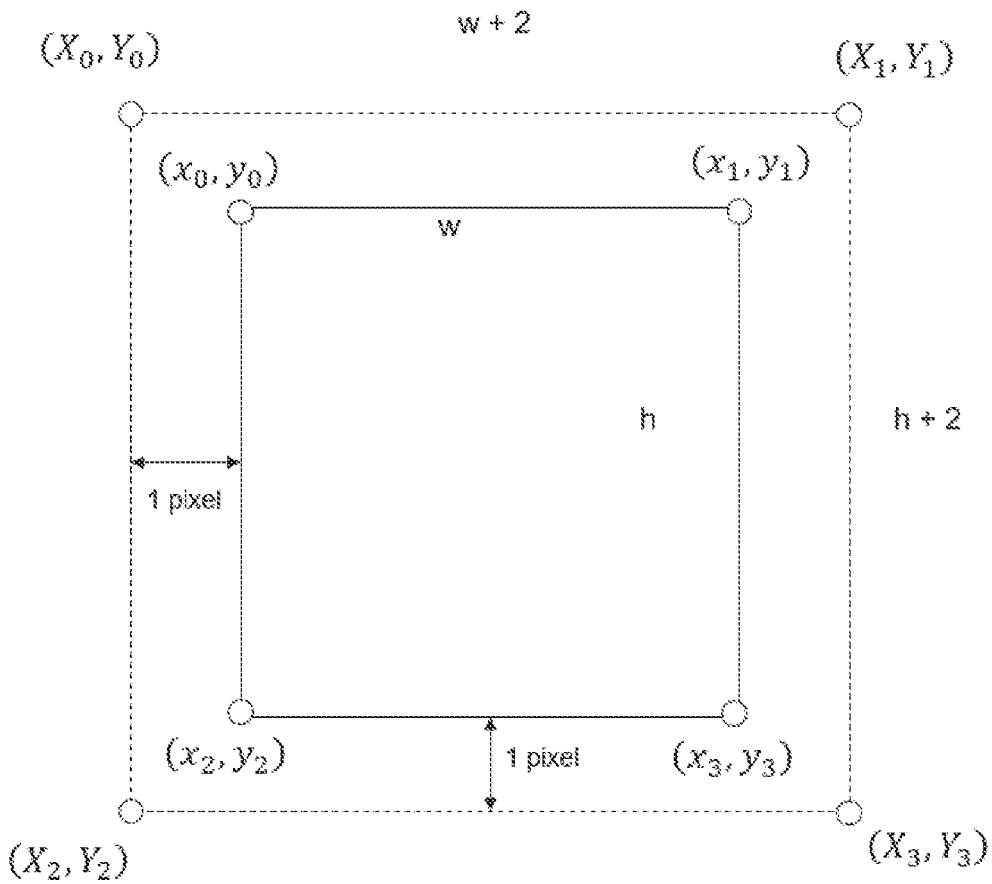
FIG. 8 is an illustration example of the coordinates of corners of affine coded block (subblock) and of intermediate EIF block (subblock).

First two steps are performed for (w+2)×(h+2) area, where w and h are prediction block width and height correspondingly, one pixel margin from each border is added for applying 3-tap filter at the third step. Original affine block and corresponding (w+2)×(h+2) block that is used in intermediate step of EIF are depicted in FIG. 8.

Memory Bandwidth Calculation:

Memory bandwidth is calculated as a reference block to current block area ratio. For example, for 8×8 bi-predictive block in case of usage interpolation filter with T taps, the reference area value is Sr is equal to 2(8+T−1)(8+T−1), block area Sb is equal to 8*8. So memory bandwidth is $$MB_{8\times 8} = \frac{2(8+T-1)(8+T-1)}{64}.$$

For 8-tap DCTIF that is used in ITU-T H.265, VVC and EVC, $$MB_{8\times 8} = \frac{2*15*15}{64} = 7.03125.$$

Figure 9:
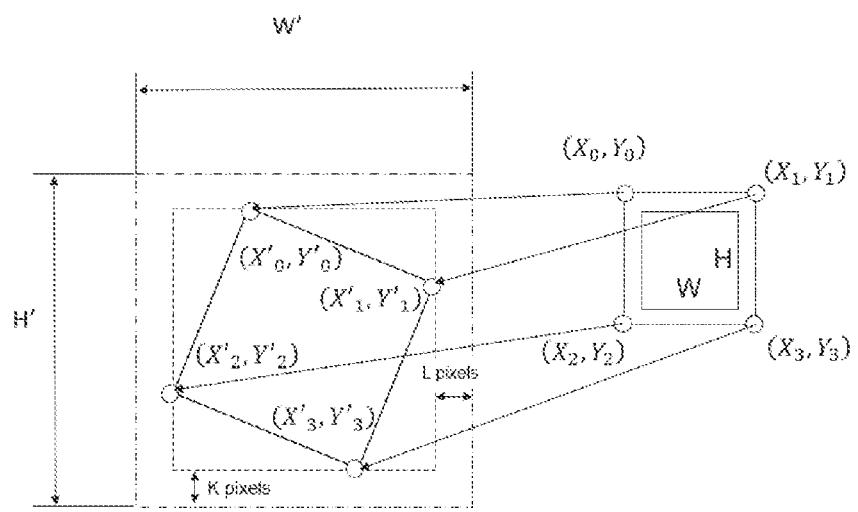
FIG. 9 is an illustration example of the location of a transformed block (subblock) in the reference picture and corresponding bounding box.

The reference area is a rectangular area comprising all reference samples that are needed to perform motion compensation of the current block, as depicted in FIG. 9, having width W' and height H' (bounding box).

Adaptive usage of EIF and block-based affine motion compensation. Problem definition.

Subblock affine motion compensation with minimal subblock size 8×8 is much more hardware friendly than affine motion compensation with minimal subblock size 4×4. There are at least three reasons for that.

Memory bandwidth. Affine motion compensation with minimal subblock size 8×8 does not increase the memory bandwidth compared to ITU-T H.265, because 8×8 bi-predictive blocks are the worst case for ITU-T H.265 in terms of memory bandwidth calculation. In EVC 8×8 bi-predictive blocks also does not change the worst case in terms of memory bandwidth (8×4/4×8 bi-predictive blocks are the worst case in EVC 3.0 and 4×16/16×4 blocks are going to be the worst case in EVC 4.0). Basically, 8×8 bi-predictive blocks can occur in regular inter prediction both in EVC and ITU-T H.265, so affine subblock motion compensation with such minimal block size does not increase complexity of motion compensation.

Number of multiplications. Motion compensation for 8×8 subblock requires much less number of multiplications than motion compensation of four 4×4 subblocks.

Memory access. In some hardware implementations no less than 16 samples can be read. From this perspective 8×8 blocks that in case of usage 8-tap DCTIF takes (8+8−1)*(8+8−1) reference samples utilize memory much more efficient than 4×4 blocks.

However, subblock affine motion compensation with minimal subblock size 8×8 is much provides significant performance drop in comparison with subblock affine motion compensation with minimal subblock size 4×4. Especially for content with fast rotation. For such content EIF can be used. EIF have less multiplications in comparison with subblock affine motion compensation with minimal subblock sizes 8×8 and 4×4. However, memory bandwidth for EIF without affine motion model restrictions can be huge. Also, for effective hardware implementations of EIF some additional requirements can appears. For example, the following requirements can appear for EIF from the hardware perspective.

The internal buffer is limited by N lines, where N can be for example 3, 4, 5 or more. This means that during processing of one line (one row) of the current block (subblock) no more than N lines from the reference picture can be used.

Memory access should be sequential, which means that if for $i_{th}$ line of current block $j_{th}$ line of the reference picture is fetched, then for (i+1)th line of the current block only lines j+1, j+2, . . . can be fetched.

No more than one additional line can be fetched for all lines of the current block except for the first.

The current disclosure is an adaptive scheme of usage EIF and subblock affine motion compensation.

Embodiment 1

Adaptive usage of EIF and block-based affine motion compensation. Basic algorithm.

The basic algorithm of adaptive usage of EIF and subblock affine motion compensation is as follows.

Calculate optimal subblock size M×N based on affine motion model parameters.

If both optimal subblock width M and optimal subblock height N are greater or equal than 8, then perform subblock motion compensation with M×N subblock.

Otherwise, check EIF applicability conditions
EIF applicability condition 1
EIF applicability condition 2
. . .
If all EIF applicability conditions are met, then perform EIF motion compensation Otherwise set M=max(M, 8), N=max(N, 8) and perform subblock motion compensation with M×N subblock.

The details of some steps of this basic algorithm is described below.

Step 1. Optimal Subblock Size Calculation

One method for deriving affine sub-block size is based on the motion vector differences of the affine control points and the width and height of an affine block. The sub-block size M×N could be derived as by Equation (2-1), where MvPre is the motion vector accuracy (e.g., ¼ pel in HEVC standard or 1/16 pel in VVC and EVC standards), and affine motion model parameters dHorX, dHorY, dVerX, dVerY are calculated according to equations (1-4)-(1-7) for 6 parameter model and according to equations (1-8)-(1-11) for 4 parameter model.

$$\begin{cases} M = \text{clip3}\left(4, w, \frac{w \times MvPre}{\max(\text{abs}(dHorX), \text{abs}(dHorY))}\right) \\ N = \text{clip3}\left(4, h, \frac{h \times MvPre}{\max(\text{abs}(dVerX), \text{abs}(dVerY))}\right) \end{cases} \quad (2\text{-}1)$$

M and N derived in Equation (2-1) will be adjusted downward if necessary to make sure that w and h is divisible by M and N, respectively.

Another method is to build a 3 dimensional looking up table, then get the sub-block size directly from the looking up table according to motion vector difference, block size, and motion vector precision. For example, set M to Table_M[x][y][z], where x equal to max (abs($v_{1x}-v_{0x}$), abs($v_{1y}-v_{0y}$)), y equal to affine block width, z equal to the motion vector precision, set N to Table_N[x][y][z], where x equal to max (abs($v_{2x}-v_{0x}$), abs($v_{2y}-v_{0y}$)), y equal to affine block height, z equal to the motion vector precision.

Step 3. EIF Applicability Conditions:

EIF applicability conditions can be for example as following:

Memory bandwidth restrictions. This kind of restrictions guarantee that the size of area in the reference picture corresponding to the current affine block (EIF block) is no more than predefined threshold T. The example of definition of area in the reference picture corresponding to the current affine block is depicted in FIG. 9.

The internal buffer is limited by R lines, where R is predefined value and can be for example 3, 4, 5 or more. This means that during processing of one line (one row) of the current block (subblock) no more than R lines from the reference picture can be used.

Memory access should be sequential, which means that if for $i_{th}$ line of current block $j_{th}$ line of the reference picture is fetched, then for $(i+1)_{th}$ line of the current block only lines j+1, j+2, . . . can be fetched.

No more than one additional line can be fetched for all lines of the current block except for the first.

The inequalities for affine motion model parameters, for example as following $$\begin{cases} a \le dHorX \le b \\ c \le dHorY \le d \\ e \le dVerX \le f \\ g \le dVerY \le h \end{cases},$$

where a, b, c, d, e, f, g, h are predefined values or plus/minus infinity.

$$\begin{cases} dHorX \le a * dVerX \\ dVerY \le b * dHorY \end{cases},$$

where a and b are predefined values.

The example 1 of using embodiment 1 in MPEG-5/EVC

In this example, EIF subblock size is equal to 4×4, maximum number of fetched lines during processing the first line R is equal to 3, dX[0] corresponds to dHorX, dX[1] corresponds to dHorY, dY[0] corresponds to dVerX and dY[1] corresponds to dVerY.

The variables dX[0], dX[1], dY[0], dY[1] are in $\frac{1}{512}$ precision.

. . .

The variable eifSubblockSize is set equal to 4.
The variable eifCanBeApplied is derived as follows:
eifCanBeApplied is set to TRUE
The arrays X[i], Y[i] are derived as follows:
X[0]=0
X[1]=(eifSubblockSize+1)*(dX[0]+(1<<9))
X[2]=(eifSubblockSize+1)*dY[0]
X[3]=X[1]+X[2]
Y[0]=0
Y[1]=(eifSubblockSize+1)*dX[1]
Y[2]=(eifSubblockSize+1)*(dY[1]+(1<<9))
Y[3]=Y[1]+Y[2]
The variable Xmax is set equal to maximum of X[i] for i is equal 0 . . . 3
The variable Xmin is set equal to minimum of X[i] for i is equal 0 . . . 3
The variable Ymax is set equal to maximum of Y[i] for i is equal 0 . . . 3
The variable Ymin is set equal to minimum of Y[i] for i is equal 0 . . . 3
The variable W is set equal to (Xmax−Xmin+(1<<9)−1)>>9
The variable H is set equal to (Ymax−Ymin+(1<<9)−1)>>9
If(W+2)*(H+2) is greater than 81, the variable eifCanBeApplied is equal to FALSE
Otherwise,
If dY[1] is less than ((−1)<<9), then the variable eifCanBeApplied is equal to FALSE
Otherwise,
If(max(0, dY[1])+Abs(dX[1]))*(1+eifSubblockSize) is greater than (1<<9) then the variable eifCanBeApplied is equal to FALSE.
If eifCanBeApplied is equal to FALSE than the variables sizeSbX and sizeSbY are modified as follows:
sizeSbX=max(8, sizeSbX)
sizeSbY=max(8, sizeSbY)

. . .

The example 2 of using embodiment 1 in MPEG-5/EVC

In this example, EIF subblock size is equal to 8×8, maximum number of fetched lines during processing the first line R is equal to 4, dX[0] corresponds to dHorX, dX[1] corresponds to dHorY, dY[0] corresponds to dVerX and dY[1] corresponds to dVerY.

The variables dX[0], dX[1], dY[0], dY[1] are in $\frac{1}{512}$ precision.

. . .

The variable eifSubblockSize is set equal to 8.
The variable eifCanBeApplied is derived as follows:
eifCanBeApplied is set to TRUE
The arrays X[i], Y[i] are derived as follows:
X[0]=0
X[1]=(eifSubblockSize+1)*(dX[0]+(1<<9))
X[2]=(eifSubblockSize+1)*dY[0]
X[3]=X[1]+X[2]
Y[0]=0
Y[1]=(eifSubblockSize+1)*dX[1]
Y[2]=(eifSubblockSize+1)*(dY[1]+(1<<9))
Y[3]=Y[1]+Y[2]
The variable Xmax is set equal to maximum of X[i] for i is equal 0 . . . 3
The variable Xmin is set equal to minimum of X[i] for i is equal 0 . . . 3
The variable Ymax is set equal to maximum of Y[i] for i is equal 0 . . . 3
The variable Ymin is set equal to minimum of Y[i] for i is equal 0 . . . 3
The variable W is set equal to (Xmax−Xmin+(1<<9)−1)>>9
The variable H is set equal to (Ymax−Ymin+(1<<9)−1)>>9
If (W+2)*(H+2) is greater than 225, the variable eifCanBeApplied is equal to FALSE
Otherwise,
If dY[1] is less than ((−1)<<9), then the variable eifCanBeApplied is equal to FALSE
Otherwise,
If (max(0, dY[1])+Abs(dX[1]))*(1+eifSubblockSize) is greater than 2*(1<<9) then the variable eifCanBeApplied is equal to FALSE.
If eifCanBeApplied is equal to FALSE than the variables sizeSbX and sizeSbY are modified as follows:
sizeSbX=max(8, sizeSbX)
sizeSbY=max(8, sizeSbY)

. . .

The example 3 of using embodiment 1 in MPEG-5/EVC:

In this example, EIF subblock size is equal to 8×8, maximum number of fetched lines during processing the first line R is equal to 5, dX[0] corresponds to dHorX, dX[1] corresponds to dHorY, dY[0] corresponds to dVerX and dY[1] corresponds to dVerY.

The variables dX[0], dX[1], dY[0], dY[1] are in $\frac{1}{512}$ precision.

. . .

The variable eifSubblockSize is set equal to 8.
The variable eifCanBeApplied is derived as follows:
eifCanBeApplied is set to TRUE
The arrays X[i], Y[i] are derived as follows:
X[0]=0
X[1]=(eifSubblockSize+1)*(dX[0]+(1<<9))
X[2]=(eifSubblockSize+1)*dY[0]
X[3]=X[1]+X[2]
Y[0]=0
Y[1]=(eifSubblockSize+1)*dX[1]
Y[2]=(eifSubblockSize+1)*(dY[1]+(1<<9))
Y[3]=Y[1]+Y[2]
The variable Xmax is set equal to maximum of X[i] for i is equal 0 . . . 3
The variable Xmin is set equal to minimum of X[i] for i is equal 0 . . . 3
The variable Ymax is set equal to maximum of Y[i] for i is equal 0 . . . 3
The variable Ymin is set equal to minimum of Y[i] for i is equal 0 . . . 3
The variable W is set equal to (Xmax−Xmin+(1<<9)−1)>>9
The variable H is set equal to (Ymax−Ymin+(1<<9)−1)>>9
If (W+2)*(H+2) is greater than 225, the variable eifCanBeApplied is equal to FALSE
Otherwise,
If dY[1] is less than ((−1)<<9), then the variable eifCanBeApplied is equal to FALSE Otherwise,
If (max(0, dY[1])+Abs(dX[1]))*(1+eifSubblockSize) is greater than 3*(1<<9) then the variable eifCanBeApplied is equal to FALSE.
If eifCanBeApplied is equal to FALSE than the variables sizeSbX and sizeSbY are modified as follows:
sizeSbX=max(8, sizeSbX)
sizeSbY=max(8, sizeSbY)
. . . .

The example 4 of using embodiment 1 in MPEG-5/EVC
In this example, EIF subblock size is equal to 8×8, the only memory bandwidth restriction is checked for EIF, dX[0] corresponds to dHorX, dX[1] corresponds to dHorY, dY[0] corresponds to dVerX and dY[1] corresponds to dVerY.
The variables dX[0], dX[1], dY[0], dY[1] are in 1/512 precision.
. . .
The variable eifSubblockSize is set equal to 8.
The variable eifCanBeApplied is derived as follows:
eifCanBeApplied is set to TRUE
The arrays X[i], Y[i] are derived as follows:
X[0]=0
X[1]=(eifSubblockSize+1)*(dX[0]+(1<<9))
X[2]=(eifSubblockSize+1)*dY[0]
X[3]=X[1]+X[2]
Y[0]=0
Y[1]=(eifSubblockSize+1)*dX[1]
Y[2]=(eifSubblockSize+1)*(dY[1]+(1<<9))
Y[3]=Y[1]+Y[2]
The variable Xmax is set equal to maximum of X[i] for i is equal 0 . . . 3
The variable Xmin is set equal to minimum of X[i] for i is equal 0 . . . 3
The variable Ymax is set equal to maximum of Y[i] for i is equal 0 . . . 3
The variable Ymin is set equal to minimum of Y[i] for i is equal 0 . . . 3
The variable W is set equal to (Xmax−Xmin+(1<<9)−1)>>9
The variable H is set equal to (Ymax−Ymin+(1<<9)−1)>>9
If(W+2)*(H+2) is greater than 225, the variable eifCanBeApplied is equal to FALSE
If eifCanBeApplied is equal to FALSE than the variables sizeSbX and sizeSbY are modified as follows:
sizeSbX=max(8, sizeSbX)
sizeSbY=max(8, sizeSbY)
. . . .

The example 5 of using embodiment 1 in MPEG-5/EVC
In this example, EIF subblock size is equal to 4×4, the only memory bandwidth restriction is checked for EIF, dX[0] corresponds to dHorX, dX[1] corresponds to dHorY, dY[0] corresponds to dVerX and dY[1] corresponds to dVerY.
The variables dX[0], dX[1], dY[0], dY[1] are in 1/512 precision.
. . .
The variable eifSubblockSize is set equal to 8.
The variable eifCanBeApplied is derived as follows:
eifCanBeApplied is set to TRUE
The arrays X[i], Y[i] are derived as follows:
X[0]=0
X[1]=(eifSubblockSize+1)*(dX[0]+(1<<9))
X[2]=(eifSubblockSize+1)*dY[0]
X[3]=X[1]+X[2]
Y[0]=0
Y[1]=(eifSubblockSize+1)*dX[1]
Y[2]=(eifSubblockSize+1)*(dY[1]+(1<<9))
Y[3]=Y[1]+Y[2]
The variable Xmax is set equal to maximum of X[i] for i is equal 0 . . . 3
The variable Xmin is set equal to minimum of X[i] for i is equal 0 . . . 3
The variable Ymax is set equal to maximum of Y[i] for i is equal 0 . . . 3
The variable Ymin is set equal to minimum of Y[i] for i is equal 0 . . . 3
The variable W is set equal to (Xmax−Xmin+(1<<9)−1)>>9
The variable H is set equal to (Ymax−Ymin+(1<<9)−1)>>9
If(W+2)*(H+2) is greater than 81, the variable eifCanBeApplied is equal to FALSE
If eifCanBeApplied is equal to FALSE than the variables sizeSbX and sizeSbY are modified as follows:
sizeSbX=max(8, sizeSbX)
sizeSbY=max(8, sizeSbY)
. . . .

Embodiment 2

Adaptive usage of EIF and block-based affine motion compensation. Basic algorithm.
The basic algorithm of adaptive usage of EIF and sub-block affine motion compensation is as follows.
Calculate optimal subblock size M×N based on affine motion model parameters.
If both optimal subblock width M and optimal subblock height N are greater or equal than 8, then perform subblock motion compensation with M×N subblock.
Otherwise, check EIF applicability conditions
EIF applicability condition 1
EIF applicability condition 2
. . .
EIF applicability condition P
If all EIF applicability conditions are met, then perform EIF motion compensation. EIF motion compensation process comprise:
Check EIF applicability condition P+1
Check EIF applicability condition P+2
. . .
Check EIF applicability condition P+K
If one of EIF applicability conditions P+1 . . . P+K are not met, then calculate first motion vector range that provide fulfilment of conditions that were not met. clip motion vectors calculated according to affine model to guarantee, that these vectors are in first motion vector range
Otherwise set M'=max(M, 8), N'=max(N, 8) and perform subblock motion compensation with M×N subblock.
In some examples P and K can be equal to zero that means that the algorithm above will not have steps 3.a-3.d if P is equal to zero and will not have steps 3.e.i-3.e.v if K is equal to zero.
The details of some steps of this basic algorithm is described below.
Step 1. Optimal Subblock Size Calculation:
One method for deriving affine sub-block size is based on the motion vector differences of the affine control points and the width and height of an affine block. The sub-block size M×N could be derived as by Equation (2-1), where MvPre is the motion vector accuracy (e.g., 1/4 pel in HEVC standard or 1/16 pel in VVC and EVC standards), and affine motion model parameters dHorX, dHorY, dVerX, dVerY are calculated according to equations (1-4)-(1-7) for 6 parameter model and according to equations (1-8)-(1-11) for 4 parameter model.

$$\begin{cases} M = \text{clip3}\left(4, w, \dfrac{w \times MvPre}{\max(\text{abs}(dHorX), \text{abs}(dHorY))}\right) \\ N = \text{clip3}\left(4, h, \dfrac{h \times MvPre}{\max(\text{abs}(dVerX), \text{abs}(dVerY))}\right) \end{cases} \quad (2\text{-}1)$$

M and N derived in Equation (2-1) will be adjusted downward if necessary to make sure that w and h is divisible by M and N, respectively.

Another method is to build a 3 dimensional looking up table, then get the sub-block size directly from the looking up table according to motion vector difference, block size, and motion vector precision. For example, set M to Table_M [x][y][z], where x equal to max ($\text{abs}(v_{1x}-v_{0x})$, $\text{abs}(v_{1y}-v_{0y})$), y equal to affine block width, z equal to the motion vector precision, set N to Table_N[x][y][z], where x equal to max ($\text{abs}(v_{2x}-v_{0x})$, $\text{abs}(v_{2y}-v_{0y})$), y equal to affine block height, z equal to the motion vector precision.

Step 3. EIF Applicability Conditions:

EIF applicability conditions can be for example as following:

Memory bandwidth restrictions. This kind of restrictions guarantee that the size of area in the reference picture corresponding to the current affine block (EIF block) is no more than predefined threshold T. The example of definition of area in the reference picture corresponding to the current affine block is depicted in FIG. 9.

The internal buffer is limited by R lines, where R is predefined value and can be for example 3, 4, 5 or more. This means that during processing of one line (one row) of the current block (subblock) no more than R lines from the reference picture can be used.

Memory access should be sequential, which means that if for $i_{th}$ line of current block $j_{th}$ line of the reference picture is fetched, then for $(i+1)_{th}$ line of the current block only lines j+1, j+2, . . . can be fetched.

No more than one additional line can be fetched for all lines of the current block except for the first.

The inequalities for affine motion model parameters, for example as following $$\begin{cases} a \leq dHorX \leq b \\ c \leq dHorY \leq d \\ e \leq dVerX \leq f \\ g \leq dVerY \leq h \end{cases},$$

where a, b, c, d, e, f, g, h are predefined values or plus/minus infinity.

$$\begin{cases} dHorX \leq a * dVerX \\ dVerY \leq b * dHorY \end{cases},$$

In one example the basic algorithm is as follows:

Calculate optimal subblock size M×N based on affine motion model parameters.

If both optimal subblock width M or optimal subblock height N is greater or equal than 8, then perform subblock motion compensation with M×N subblock.

Otherwise, check EIF applicability conditions:

EIF applicability condition 1: The internal buffer is limited by R lines, where R is predefined value and can be for example 3, 4, 5 or more. This means that during processing of one line (one row) of the current block (subblock) no more than R lines from the reference picture can be used.

EIF applicability condition 2: Memory access should be sequential, which means that if for $i_{th}$ line of current block $j_{th}$ line of the reference picture is fetched, then for $(i+1)_{th}$ line of the current block only lines j+1, j+2, . . . can be fetched.

EIF applicability condition 3: No more than one additional line can be fetched for all lines of the current block except for the first.

. . .

EIF applicability condition P

If all EIF applicability conditions are met, then perform EIF motion compensation. EIF motion compensation process comprise the following.

Check EIF applicability condition P+1: Checking memory bandwidth restrictions. This kind of restrictions guarantee that the size of area in the reference picture corresponding to the current affine block (EIF block) is no more than predefined threshold T. The example of definition of area in the reference picture corresponding to the current affine block is depicted in FIG. 9.

. . .

Check EIF applicability condition P+K:

If one of EIF applicability conditions P+1 . . . P+K are not met, then calculate first motion vector range that provide fulfilment of conditions that were not met.

Clip motion vectors calculated according to affine model to guarantee, that these vectors are in first motion vector range.

Otherwise set M'=max(M, 8), N'=max(N, 8) and perform subblock motion compensation with M×N subblock.

In some examples N can be equal to 3 that means that the algorithm above will not have steps 3.d-3.e. In some examples K can be equal to 1 that means that the algorithm above will not have steps 3.f.ii-3.ii.

Embodiment 3

Adaptive usage of EIF and block-based affine motion compensation. Basic algorithm.

The basic algorithm of adaptive usage of EIF and subblock affine motion compensation is as follows.

Calculate optimal subblock size M×N based on affine motion model parameters.

If both optimal subblock width M and optimal subblock height N are greater or equal than 8, then perform subblock motion compensation with M×N subblock.

Otherwise, check EIF applicability conditions:

EIF applicability condition 1

EIF applicability condition 2

. . .

EIF applicability condition P

If all EIF applicability conditions are met, then perform EIF motion compensation. EIF motion compensation process comprise the following.

Check EIF applicability condition P+1

Check EIF applicability condition P+2

. . .

Check EIF applicability condition P+K

If one of EIF applicability conditions P+1 . . . P+K are not met, then calculate first motion vector range that provide fulfilment of conditions that were not met. set second motion vector range equal to the first motion vector range.

Otherwise, calculate third motion vector range and set second motion vector range equal to the third motion vector range.

Clip motion vectors calculated according to affine model to guarantee, that these vectors are in the second motion vector range.

Otherwise set M'=max(M, 8), N'=max(N, 8) and perform subblock motion compensation with M×N subblock.

In some examples P and K can be equal to zero that means that the algorithm above will not have steps 3.a-3.d if P is equal to zero and will not have steps 3.e.i-3.e.v if K is equal to zero.

The details of some steps of this basic algorithm is described below.

Step 1. Optimal Subblock Size Calculation:

One method for deriving affine sub-block size is based on the motion vector differences of the affine control points and the width and height of an affine block. The sub-block size M×N could be derived as by Equation (2-1), where MvPre is the motion vector accuracy (e.g., ¼ pel in HEVC standard or 1/16 pel in VVC and EVC standards), and affine motion model parameters dHorX, dHorY, dVerX, dVerY are calculated according to equations (1-4)-(1-7) for 6 parameter model and according to equations (1-8)-(1-11) for 4 parameter model.

$$\begin{cases} M = \text{clip3}\left(4, w, \dfrac{w \times MvPre}{\max(\text{abs}(dHorX), \text{abs}(dHorY))}\right) \\ N = \text{clip3}\left(4, h, \dfrac{h \times MvPre}{\max(\text{abs}(dVerX), \text{abs}(dVerY))}\right) \end{cases} \quad (2\text{-}1)$$

M and N derived in Equation (2-1) will be adjusted downward if necessary to make sure that w and h is divisible by M and N, respectively.

Another method is to build a 3 dimensional looking up table, then get the sub-block size directly from the looking up table according to motion vector difference, block size, and motion vector precision. For example, set M to Table_M [x][y][z], where x equal to max(abs($v_{1x}$−$v_{0x}$), abs($v_{1y}$−$v_{0y}$)), y equal to affine block width, z equal to the motion vector precision, set N to Table_N[x][y][z], where x equal to max (abs($v_{2x}$−$v_{0x}$), abs($v_{2y}$−$v_{0y}$)), y equal to affine block height, z equal to the motion vector precision.

Step 3. EIF Applicability Conditions:

EIF applicability conditions can be for example as following:

Memory bandwidth restrictions. This kind of restrictions guarantee that the size of area in the reference picture corresponding to the current affine block (EIF block) is no more than predefined threshold T. The example of definition of area in the reference picture corresponding to the current affine block is depicted in FIG. 9.

The internal buffer is limited by R lines, where R is predefined value and can be for example 3, 4, 5 or more. This means that during processing of one line (one row) of the current block (subblock) no more than R lines from the reference picture can be used.

Memory access should be sequential, which means that if for $i_{th}$ line of current block $j_{th}$ line of the reference picture is fetched, then for $(i+1)_{th}$ line of the current block only lines j+1, j+2, . . . can be fetched.

No more than one additional line can be fetched for all lines of the current block except for the first.

The inequalities for affine motion model parameters, for example as following $$\begin{cases} a \le dHorX \le b \\ c \le dHorY \le d \\ e \le dVerX \le f \\ g \le dVerY \le h \end{cases},$$

where a, b, c, d, e, f, g, h are predefined values or plus/minus infinity.

$$\begin{cases} dHorX \le a * dVerX \\ dVerY \le b * dHorY \end{cases},$$

where a and b are predefined values

In one example basic algorithm is as follows.

Calculate optimal subblock size M×N based on affine motion model parameters.

If both optimal subblock width M or optimal subblock height N is greater or equal than 8, then perform subblock motion compensation with M×N subblock.

Otherwise, check EIF applicability conditions:

EIF applicability condition 1: The internal buffer is limited by R lines, where R is predefined value and can be for example 3, 4, 5 or more. This means that during processing of one line (one row) of the current block (subblock) no more than R lines from the reference picture can be used.

EIF applicability condition 2: Memory access should be sequential, which means that if for $i_{th}$ line of current block $j_{th}$ line of the reference picture is fetched, then for $(i+1)_{th}$ line of the current block only lines j+1, j+2, . . . can be fetched.

EIF applicability condition 3: No more than one additional line can be fetched for all lines of the current block except for the first.

. . .

EIF applicability condition P

If all EIF applicability conditions are met, then perform EIF motion compensation. EIF motion compensation process comprise the following.

Check EIF applicability condition P+1: Checking memory bandwidth restrictions. This kind of restrictions guarantee that the size of area in the reference picture corresponding to the current affine block (EIF block) is no more than predefined threshold T. The example of definition of area in the reference picture corresponding to the current affine block is depicted in FIG. 9. (This part will be changed in embodiment 4):

. . .

Check EIF applicability condition P+K:

If one of EIF applicability conditions P+1 . . . P+K are not met, then calculate first motion vector range that provide fulfilment of conditions that were not met. (This part will be changed in embodiment 4) Set second motion vector range equal to the first motion vector range.

Otherwise calculate third motion vector range, set second motion vector range equal to the third motion vector range.

Clip motion vectors calculated according to affine model to guarantee, that these vectors are in the second motion vector range.

Otherwise set M=max(M, 8), N=max(N, 8) and perform subblock motion compensation with M×N subblock.

In some examples N can be equal to 3 that means that the algorithm above will not have steps 3.d-3.e. In some examples K can be equal to 1 that means the algorithm above will not have steps 3.f.ii-3.f.iii.

In one example steps 3.f.i and 3.f.iv.1 is implemented as follows.

Memory access consumption calculation for affine block in case of usage EIF:

When EIF is used for motion compensation of affine block with size W×H, the following steps are performed for memory access consumption calculation.

Derive the location of each corner sample of the affine block.

Derive the location of each corner sample of the block which are used on step 3 of EIF (denote it as EIF intermediate block).

Derive motion vectors for each corner sample of EIF intermediate block.

Derive location of transformed block in reference picture.

Derive the bounding box size for the transformed block.

Get the memory access consumption based on transformed block size and filter length (EIF uses bilinear interpolation, so filter length is equal to 2).

The details of implementation of these steps are described below.

Step 1. Derive the Location of Each Corner Sample of the Affine Block

Denote (x0, y0) as the coordinate of the top-left sample of the affine block. Then the location of the affine block can be descripted by the coordinates of its corner samples (top-left, top-right, bottom-left, bottom-right):

$$\begin{cases} (x_0, y_0) = (x_0, y_0) \\ (x_1, y_1) = (x_0 + W - 1, y_0) \\ (x_2, y_2) = (x_0, y_0 + H - 1) \\ (x_3, y_3) = (x_0 + W - 1, y_0 + H - 1) \end{cases} \quad (2\text{-}1)$$

Step 2. Derive the Location of Each Corner Sample of the EIF Intermediate Block:

Bilinear interpolation at the step 2 of EIF is performed for (W+2)×(H+2) block (one pixel margin from each border is added). This (W+2)×(H+2) block is denoted as intermediate EIF block. The coordinates of intermediate EIF block corner samples (top-left, top-right, bottom-left, bottom-right) are:

$$\begin{cases} (X_0, Y_0) = (x_0 - 1, y_0 - 1) \\ (X_1, Y_1) = (x_0 + W, y_0 - 1) \\ (X_2, Y_2) = (x_0 - 1, y_0 + H) \\ (X_3, Y_3) = (x_0 + W, y_0 + H) \end{cases} \quad (2\text{-}2)$$

The coordinates of corners of affine block and of intermediate EIF block are depicted in FIG. 8.

Step 3. Derive Motion Vectors for Each Corner Sample of EIF Intermediate Block:

Motion vectors are derived according to equation (1-1). In some examples, motion vector clipping can be used to guarantee that samples outside of the current picture with margin of one CTU size are not used.

Step 4. Derive Location of Transformed Block in Reference Picture:

Denote horizontal and vertical parts of vector Vi as $V_{ix}$ and $V_{iy}$ respectively.

The location of the transformed block in reference picture can be described by the coordinates of its corner samples (top-left, top-right, bottom-left, bottom-right):

$$\begin{cases} (X'_0, Y'_0) = (X_0 + V_{0x}, Y_0 + V_{0y}) \\ (X'_1, Y'_1) = (X_1 + V_{1x}, Y_1 + V_{1y}) \\ (X'_2, Y'_2) = (X_2 + V_{2x}, Y_2 + V_{2y}) \\ (X'_3, Y'_3) = (X_3 + V_{3x}, Y_3 + V_{3x}) \end{cases} \quad (2\text{-}4)$$

Step 5. Derive the Bounding Box Size for the Transformed Block:

The bounding box size for transformed block in reference picture can be calculated by following equation, where max function returns the maximum value of the arguments, min function returns the minimum value of the arguments:

$$\begin{cases} W' = \max(X'_0, X'_1, X'_2, X'_3) - \min(X'_0, X'_1, X'_2, X'_3) + 1 \\ H' = \max(Y'_0, Y'_1, Y'_2, Y'_3) - \min(Y'_0, Y'_1, Y'_2, Y'_3) + 1 \end{cases} \quad (2\text{-}5)$$

The location of transformed block in reference picture and corresponding bounding box are depicted in FIG. 9.

In one example, W'=Ceil(W'), H'=Ceil(H') is performed after equation (2-5).

In another example, W'=Floor(W'), H'=Floor(H') is performed after equation (2-5).

Step 6. Get the memory access consumption:

The memory access consumption of the affine block in one reference picture can be decided, by the bounding box size for the transformed block transformed block and the length of MC interpolation filter for affine motion block T', e.g., 2, 4, 6, 8 . . . :

$$\text{Mem} = (W'+T'-1)*(H'+T'-1) \quad (2\text{-}6)$$

For EIF, bilinear interpolation is used, therefore filter length is 2 and memory access consumption is equal to:

$$\text{Mem} = (W'+1)*(H'+1) \quad (2\text{-}7)$$

Affine Motion Model Restrictions for EIF:
Denote target worst case memory bandwidth as $$T = \frac{S_{wc}}{W*H},$$

where W and H are current block width and heights respectively, and $S_{wc}$ is maximum allowed memory access consumption for the current block, according to the target case memory bandwidth. To guarantee that EIF memory bandwidth is not greater that the target case memory bandwidth, the memory access consumption of affine block should be constrained as following condition:

$$\begin{cases} V_0 = V_{X_0,Y_0} = (mv_{0x} + (-1)dHorX + (-1)dVerX, mv_{oy} + (-1)dHorY + (-1)dVerY) \\ V_1 = V_{X_1,Y_1} = (mv_{0x} + (W)dHorX + (-1)dVerX, mv_{oy} + (W)dHorY + (-1)dVerY) \\ V_2 = V_{X_2,Y_2} = (mv_{0x} + (-1)dHorX + (H)dVerX, mv_{oy} + (-1)dHorY + (H)dVerY) \\ V_3 = V_{X_3,Y_3} = (mv_{0x} + (W)dHorX + (H)dVerX, mv_{oy} + (W)dHorY + (H)dVerY) \end{cases} \quad (2\text{-}3)$$

$$\frac{(W'+1)*(H'+1)}{W*H} \leq T \text{ or} \qquad (2\text{-}8)$$

$(W'+1)*(H'+1) \leq T*W*H$ or $(W'+1)*(H'+1) \leq S_{wc}$

The value T can be predefined in both encoder and decoder, or specified in a parameter set of a codec video sequence, e.g., sequence levels, picture level, slice level parameter set, etc.

In one example, if the maximum allowed memory access consumption per sample is defined as the memory access consumption of a 4×4 block, then T can be derived as follows, where T is the length of interpolation filter:

$$T = \frac{(4+T'-1)*(4+T'-1)}{4*4} \qquad (2\text{-}9)$$

For T' equal to 6 the restriction is as follows:

$(W'+1)*(H'+1) \leq (4+6-1)*(4+6-1)$ \hfill (2-10)

In another example, if the maximum allowed memory access consumption per sample is defined as the memory access consumption of a 8×8 block, then T can be derived as follows, where T is the length of interpolation filter:

$$T = \frac{(8+T'-1)*(8+T'-1)}{8*8} \qquad (2\text{-}11)$$

In another example, the maximum allowed memory access consumption of per sample can be different according the prediction direction of current block, i.e. when current block is uni-prediction, use threshold $T_{UNI}$, when current block is bi-prediction, use threshold $T_{BI}$.

For example, $T_{UNI}$ is defined as the memory access consumption of 4×4 block, $T_{BI}$ is defined as the memory access consumption of 8×4 block, then:

$$T_{UNI} = \frac{(4+T'-1)*(4+T'-1)}{4*4} \qquad (2\text{-}12)$$

$$T_{Bi} = \frac{(8+T'-1)*(4+T'-1)}{8*4} \qquad (2\text{-}13)$$

In another example, $T_{UNI}$ is defined as the memory access consumption of 4×4 block, $T_{BI}$ is defined as the memory access consumption of 8×8 block, then:

$$T_{UNI} = \frac{(4+T'-1)*(4+T'-1)}{4*4} \qquad (2\text{-}14)$$

$$T_{Bi} = \frac{(8+T'-1)*(8+T'-1)}{8*8} \qquad (2\text{-}15)$$

T' in the examples above is the length of motion compensation (MC) interpolation filter for translational motion block, e.g., 2, 4, 6, 8 . . .

The value of T, $T_{UNI}$ and $T_{BI}$ may depend on width and height of the current block.

For bi-prediction affine block, the above constraint is applied to both list0 and list1, individually.

In another example memory access consumption is calculated for list0 and for list1 as $Mem_0$ and $Mem_1$, and sum of these elements is restricted. For example, if the $T_{BI}$ is defined as the memory access consumption of 8×8 block, the following restriction is used:

$Mem_0 + Mem_1 \leq 2*(8+T'-1)*(8+T'-1)$ \hfill (2-16)

If the motion vectors of the affine block cannot follow the constraint conditions (2-8), the block cannot use EIF motion compensation.

In one example, if the affine block cannot use EIF motion compensation, subblock motion compensation with minimum subblock size 8×8 is used instead of EIF.

In another example, if the affine block cannot use EIF motion compensation, translational motion compensation with motion vector calculated for the center of the affine block is used instead of EIF.

In another example, if the affine block cannot use EIF motion compensation, the bounding box is derived based on W' and H' for those inequality (2-8) is satisfied. For example W' and H' can be calculated as:

$W' = \sqrt{T*W*H} - 1$; and $H' = \sqrt{T*W*H} - 1$.

After that during MV calculation in EIF according to equation (1-1), the horizontal part of motion vectors is clipped to the range $[mv_{0x}, mv_{0x}+W'-1]$, and vertical part of motion vectors is clipped to the range $[mv_{0y}, mv_{0y}+H'-1]$. In one example, if block aspect ratio is k (W=kH), H' is calculated by solving the equation:

$k(H')^2 + (k+1)H' + 1 - TWH = 0$, and performing the following steps:

$H' = \text{Floor}(H'), W' = kH'$.

In another example steps 3.f.i and 3.f.iv.1 is implemented as follows:

Memory access consumption calculation for affine block in case of usage EIF:

The following steps are performed for memory access consumption calculation.

Derive the location of each corner sample of the W×H subblock.

Derive the location of each corner sample of the subblock used on step 3 of EIF (denote it as EIF intermediate subblock).

Derive motion vectors for each corner sample of EIF intermediate subblock.

Derive location of transformed subblock in reference picture.

Derive the bounding box size for the transformed subblock.

Get the memory access consumption based on the bounding box size for transformed subblock size and filter length (EIF uses bilinear interpolation, so filter length is equal to 2).

The details of implementation of these steps are described below.

Step 1. Derive the Location of Each Corner Sample of the Affine Subblock:

Denote (x0, y0) as the coordinate of the top-left sample of the affine block. In this embodiment for memory access consumption calculation, it's supposed that coordinate of the top-left sample of the affine block is equal to (1, 1). The position $(x_0, y_0)$ does not make sense for memory access consumption calculation and with $(x_0, y_0) = (1, 1)$ the equations are simpler.

Then the location of the affine block can be described by the coordinates of its corner samples (top-left, top-right, bottom-left, bottom-right):

$$\begin{cases} (x_0, y_0) = (1, 1) \\ (x_1, y_1) = (W, 1) \\ (x_2, y_2) = (1, H) \\ (x_3, y_3) = (W, H) \end{cases} \quad (3\text{-}1)$$

Step 2. Derive the Location of Each Corner Sample of the EIF Intermediate Subblock:

Due to EIF uses 3-tap filter at the step 3, bilinear interpolation at the step 2 of EIF is performed for (W+2)×(H+2) subblock (one pixel margin from each border is added). This (W+2)×(H+2) subblock is denoted as intermediate EIF subblock. The coordinates of intermediate EIF block corner samples (top-left, top-right, bottom-left, bottom-right) are:

$$\begin{cases} (X_0, Y_0) = (0, 0) \\ (X_1, Y_1) = (1 + W, 0) \\ (X_2, Y_2) = (0, 1 + H) \\ (X_3, Y_3) = (1 + W, 1 + H) \end{cases} \quad (3\text{-}2)$$

The coordinates of corners of affine subblock and of intermediate EIF subblock are depicted in FIG. 8.

Step 3. Derive Motion Vectors for Each Corner Sample of EIF Intermediate Subblock:

The initial motion vector ($mv_{0x}$, $mv_{0y}$) does not make sense for memory access consumption calculation and with ($mv_{0x}$, $mv_{0y}$)=(dHorX+dVerX, dHorY+dVerY) the equations are simpler.

Motion vectors are derived according to equation (1-1).

$$\begin{cases} V_0 = V_{X_0,Y_0} = (0, 0) \\ V_1 = V_{X_1,Y_1} = ((W + 1)dHorX, (W + 1)dHorY) \\ V_2 = V_{X_2,Y_2} = ((H + 1)dVerX, (H + 1)dVerY) \\ V_3 = V_{X_3,Y_3} = ((W + 1)dHorX + (H + 1)dVerX, (W + 1)dHorY + (H + 1)dVerY) \end{cases} \quad (3\text{-}3)$$

Step 4. Derive Location of Transformed Block in Reference Picture:

The location of the transformed block in reference picture can be described by the coordinates of its corner samples (top-left, top-right, bottom-left, bottom-right):

$$\begin{cases} (X'_0, Y'_0) = (0, 0) \\ (X'_1, Y'_1) = (1 + W + (W + 1)dHorX, (W + 1)dHorY) \\ (X'_2, Y'_2) = ((H + 1)dVerX, 1 + H + (H + 1)dVerY) \\ (X'_3, Y'_3) = (1 + W + (W + 1)dHorX + (H + 1)dVerX, 1 + H + (W + 1)dHorY + (H + 1)dVerY) \end{cases} \quad (3\text{-}4)$$

Step 5. Derive the Bounding Box Size for the Transformed Subblock:

The bounding box size for transformed subblock in reference picture can be calculated by following equation, where max function returns the maximum value of the arguments, min function returns the minimum value of the arguments:

$$\begin{cases} W' = \max(X'_0, X'_1, X'_2, X'_3) - \min(X'_0, X'_1, X'_2, X'_3) + 1 \\ H' = \max(Y'_0, Y'_1, Y'_2, Y'_3) - \min(Y'_0, Y'_1, Y'_2, Y'_3) + 1 \end{cases} \quad (3\text{-}5)$$

The location of transformed subblock in reference picture and corresponding bounding box are depicted in FIG. 9.

In one example W'=Ceil(W'), H'=Ceil(H') is performed after equation (3-5).

In another example W'=Floor(W'), H'=Floor(H') is performed after equation (3-5).

Step 6. Get the Memory Access Consumption

The memory access consumption of the affine subblock in one reference picture can be decided, by the bounding box size for the transformed subblock size and the length of MC interpolation filter for affine motion block T', e.g., 2, 4, 6, 8 . . . :

$$\text{Mem}=(W'+T'-1)*(H'+T'-1) \quad (3\text{-}6)$$

For EIF, bilinear interpolation is used, therefore filter length is 2 and memory access consumption is equal to $$\text{Mem}=(W'+1)*(H'+1) \quad (3\text{-}7)$$

Affine Motion Model Restrictions for EIF:

Denote target worst case memory bandwidth as $$T = \frac{S_{wc}}{W*H},$$

where W and H are current subblock width and heights respectively, and $S_{wc}$ is maximum allowed memory access consumption for the current subblock, according to the target case memory bandwidth. To guarantee that EIF memory bandwidth is not greater that the target case memory bandwidth, the memory access consumption of EIF subblock should be constrained as following condition:

$$\frac{(W' + 1)*(H' + 1)}{W*H} \leq T \text{ or} \quad (3\text{-}8)$$

$$(W' + 1)*(H' + 1) \leq T*W*H \text{ or}$$

$$(W' + 1)*(H' + 1) \leq S_{wc}$$

The value T can be predefined in both encoder and decoder, or specified in a parameter set of a codec video sequence, e.g., sequence levels, picture level, slice level parameter set, etc.

In one example, if the maximum allowed memory access consumption per sample is defined as the memory access consumption of a 4×4 block, then T can be derived as follows, where T is the length of interpolation filter:

$$T = \frac{(4+T'-1)*(4+T'-1)}{4*4} \quad (3\text{-}9)$$

For T' equal to 6 the restriction is as follows:

$$(W'+1)*(H'+1) \leq (4+6-1)*(4+6-1) \quad (3\text{-}10)$$

In another example, if the maximum allowed memory access consumption per sample is defined as the memory access consumption of a 8×8 block, then T can be derived as follows, where T is the length of interpolation filter:

$$T = \frac{(8+T'-1)*(8+T'-1)}{8*8} \quad (3\text{-}11)$$

In another example, the maximum allowed memory access consumption of per sample can be different according the prediction direction of current block, i.e.: when current block is uni-prediction, use threshold $T_{UNI}$, when current block is bi-prediction, use threshold $T_{BI}$.

For example, $T_{UNI}$ is defined as the memory access consumption of 4×4 block, $T_{BI}$ is defined as the memory access consumption of 8×4 block, then:

$$T_{UNI} = \frac{(4+T'-1)*(4+T'-1)}{4*4} \quad (3\text{-}12)$$

$$T_{Bi} = \frac{(8+T'-1)*(4+T'-1)}{8*4} \quad (3\text{-}13)$$

In another example, $T_{UNI}$ is defined as the memory access consumption of 4×4 block, $T_{BI}$ is defined as the memory access consumption of 8×8 block, then:

$$T_{UNI} = \frac{(4+T'-1)*(4+T'-1)}{4*4} \quad (3\text{-}14)$$

$$T_{Bi} = \frac{(8+T'-1)*(8+T'-1)}{8*8} \quad (3\text{-}15)$$

T' in the examples above is the length of motion compensation (MC) interpolation filter for translational motion block, e.g., 2, 4, 6, 8 . . . .

The value of T, $T_{UNI}$ and $T_{BI}$ may depend on width and height of the current block.

For bi-prediction affine block, the above constraint is applied to both list0 and list1, individually.

In another example memory access consumption is calculated for list0 and for list1 as $Mem_0$ and $Mem_1$ and sum of these elements is restricted. For example if the $T_{BI}$ is defined as the memory access consumption of 8×8 block the following restriction is used:

$$Mem_0 + Mem_1 \leq 2*(8+T'-1)*(8+T'-1) \quad (3\text{-}16)$$

If the motion vectors of the affine block cannot follow the constraint conditions (3-8), the block cannot use EIF motion compensation.

In one example if the affine block cannot use EIF motion compensation, subblock motion compensation with minimum subblock size 8×8 is used instead of EIF.

In another example if the affine block cannot use EIF motion compensation, translational motion compensation with motion vector calculated for the center of the affine block is used instead of EIF.

In another example if the affine block cannot use EIF motion compensation, the bounding box is derived based on W' and H' for those inequality (3-8) is satisfied. For example W' and H' can be calculated as:

$$W' = \sqrt{T*W*H} - 1; \text{ and}$$

$$H' = \sqrt{T*W*H} - 1.$$

After that during MV calculation in EIF according to equation (1-1), the horizontal part of motion vectors is clipped to the range $[mv_{0x}, mv_{0x}+W'-1]$ and vertical part of motion vectors is clipped to the range $[mv_{0y}, mv_{0y}+H'-1]$. In one example if block aspect ratio is k (W=kH), H' is calculated by solving the equation:

$$k(H')^2 + (k+1)H' + 1 - TWH = 0$$

and performing the following steps:

$$H' = \text{Floor}(H'), W' = kH'.$$

In one example step 3.f.iv.1 is implemented as follows:
8.5.4.5 Derivation of Clipping Parameters for Affine Motion Vector:
Inputs to this process are:
a location (xCb, yCb) in full-sample units,
two variables cbWidth and cbHeight specifying the width and the height of the current coding block,
horizontal change of motion vector dX,
vertical change of motion vector dY,
motion vector mvBaseScaled,
width of the picture in samples pic_width,
height of the picture in samples pic_height,
mvClippingMode flag specifying type of the bounding box constrains.
Outputs of this process are: hor_max, ver_max, hor_min and ver_min that denotes the maximum and minimum allowed motion vector horizontal and vertical components.
The center motion vector mv_center is derived as follows:

$$mv\_center[0] = (mvBaseScaled[0] + dX[0]*(cbWidth>>1) + dY[0]*(cbHeight>>1)) \quad (8\ 743)$$

$$mv\_center[1] = (mvBaseScaled[1] + dX[1]*(cbWidth>>1) + dY[1]*(cbHeight>>1)) \quad (8\ 743)$$

The rounding process for motion vectors as specified in clause 8.5.3.10 is invoked with mv_center, rightShift set equal to 5, and leftShift set equal to 0 as inputs and the rounded motion vector is return as mv_center.
The motion vector mv_center is clipped as follows:

$$mv\_center[0] = \text{Clip3}(-2^{17}, 2^{17}-1, mv\_center[0]) \quad (8686)$$

$$mv\_center[1] = \text{Clip3}(-2^{17}, 2^{17}-1, mv\_center[1]) \quad (8686)$$

The variable smv_hor_min, mv_ver_min, mv_hor_max and mv_ver_max are derived as following:

$$mv\_hor\_min = mv\_center[0] - deviationA[\log 2CbWidth-3] \quad (8743)$$

$$mv\_ver\_min = mv\_center[1] - deviationA[\log 2CbHeight-3] \quad (8743)$$

$$mv\_hor\_max = mv\_center[0] + deviationB[\log 2CbWidth-3] \quad (8743)$$

$$mv\_ver\_max = mv\_center[1] + deviationB[\log 2CbHeight-3] \quad (8743)$$

with deviationA and deviationB specified for k=0 . . . 4 as:
If mvClippingMode is set equal to 0, variables deviationA and deviationB are defined as follows:

deviation$A[k]$={$Ta1,Ta2,Ta3,Ta4,Ta5$}, deviation$B[k]$={$Tb1,Tb2,Tb3,Tb4,Tb5$}.

In one example values Ta1-5, Tb1-5 can be as follows:

deviation$A[k]$={16,80,224,512,1088}, deviation$B[k]${16,96,240,528,1104}.

Otherwise, variables deviationA and deviationB are derived by invoking process specified in clause XXX.

The variables hor_max_pic, ver_max_pic, hor_min_pic and ver_min_pic are derived as follows:

hor_max_pic=(pic_width+$Ctb$Size$Y$−$xCb$−$cb$Width+
   1)<<4     (8743)

ver_max_pic=(pic_height+$Ctb$Size$Y$−$yCb$−$cb$Height+
   1)<<4     (8743)

hor_min_pic=(−$Ctb$Size$Y$−$xCb$)<<4     (8743)

ver_min_pic=(−$Ctb$Size$Y$−$yCb$)<<4     (8 743)

The output hor_max, ver_max, hor_min and ver_min that denotes the maximum and minimum allowed motion vector horizontal and vertical components are derived as following:

hor_max=min(hor_max_pic,$mv$_hor_max)<<5     (8743)

ver_max=min(ver_max_pic,$mv$_ver_max)<<5     (8743)

hor_min=max(hor_min_pic,$mv$_hor_min)<<5     (8743)

ver_min=max(ver_min_pic,$mv$_ver_min)<<5     (8743)

The example 1 of using embodiment 3 in MPEG-5/EVC

In this example, EIF subblock size is equal to 4×4, maximum number of fetched lines during processing the first line R is equal to 3, dX[0] corresponds to dHorX, dX[1] corresponds to dHorY, dY[0] corresponds to dVerX and dY[1] corresponds to dVerY.

The variables dX[0], dX[1], dY[0], dY[1] are in 1/512 precision.

8.5.3.7 Derivation Process for Motion Vector Arrays from Affine CPMVs

Inputs to this process are: a luma location (xCb, yCb) of the top-left sample of the current luma coding block relative to the top-left luma sample of the current picture, two variables cbWidth and cbHeight specifying the width and the height of the luma coding block, the number of CPMVs numCpMv, the CPMVs cpMvLX[cpIdx], with cpIdx=0 . . . numCpMv−1 and X being 0 or 1, the reference index refIdxLX and X being 0 or 1.

Outputs of this process are: the number of luma coding subblocks in horizontal direction numSbXLX and in vertical direction numSbYLX with X being 0 or 1, the size of luma coding subblocks in horizontal direction sizeSbXLX and in vertical direction sizeSbYLX with X being 0 or 1, the luma subblock motion vector array mvLX[xSbIdx][ySbIdx] with xSbIdx=0 . . . numSbXLX−1, ySbIdx=0 . . . numSbYLX−1 and X being 0 or 1, the chroma subblock motion vector array mvCLX[xSbIdx][ySbIdx] with xSbIdx=0 . . . numSbXLX−1, ySbIdx=0 . . . numSbYLX−1 and X being 0 or 1.

The variables sizeSbXLX, sizeSbYLX, numSbXLX, numSbYLX, and clipMV flag are derived according to 8.5.3.8.

. . .

8.5.3.8 Derivation Process for Affine Subblock Size

Inputs to this process are: two variables cbWidth and cbHeight specifying the width and the height of the luma coding block, the number of CPMVs numCpMv, the CPMVs cpMvLX[cpIdx], with cpIdx=0 . . . numCpMv−1 and X being 0 or 1.

Outputs of this process are: the size of luma coding subblocks in horizontal direction sizeSbX and in vertical direction sizeSbY, the number of luma coding subblocks in horizontal direction numSbX and in vertical direction numSbY. The flag clipMV indicating the current block to processed with EIF with MV clipping.

The variable sizeSbX is derived as follows:
The variable eifSubblockSize is set equal to 4.
The variable eifCanBeApplied is derived as follows:
eifCanBeApplied is set to TRUE
clipMV is set to FALSE
The arrays X[i], Y[i] are derived as follows:
X[0]=0
X[1]=(eifSubblockSize+1)*(dX[0]+(1<<9))
X[2]=(eifSubblockSize+1)*dY[0]
X[3]=X[1]+X[2]
Y[0]=0
Y[1]=(eifSubblockSize+1)*dX[1]
Y[2]=(eifSubblockSize+1)*(dY[1]+(1<<9))
Y[3]=Y[1]+Y[2]
The variable Xmax is set equal to maximum of X[i] for i is equal 0 . . . 3
The variable Xmin is set equal to minimum of X[i] for i is equal 0 . . . 3
The variable Ymax is set equal to maximum of Y[i] for i is equal 0 . . . 3
The variable Ymin is set equal to minimum of Y[i] for i is equal 0 . . . 3
The variable W is set equal to (Xmax−Xmin+(1<<9)−1)>>9
The variable H is set equal to (Ymax−Ymin+(1<<9)−1)>>9
If (W+2)*(H+2) is greater than 81, the variable clipMV is set equal to TRUE
If dY[1] is less than ((−1)<<9), then the variable eifCanBeApplied is equal to FALSE
If (max(0, dY[1])+Abs(dX[1]))*(1+eifSubblockSize) is greater than (1<<9) then the variable eifCanBeApplied is equal to FALSE.
If eifCanBeApplied is equal to FALSE than the variables sizeSbX and sizeSbY are modified as follows:
sizeSbX=max(8, sizeSbX)
sizeSbY=max(8, sizeSbY)
. . .

8.5.4 Decoding Process for Inter Prediction Samples:

Inputs to this process are: a luma location (xCb, yCb) specifying the top-left sample of the current luma coding block relative to the top-left luma sample of the current picture, two variables nCbW and nCbH specifying the width and the height of the current luma coding block, variables numSbXL0, numSbXL1 and numSbYL0, numSbYL1 specifying the number of luma coding subblocks in horizontal and vertical direction, the luma motion vectors in 1/16 fractional-sample accuracy mvL0[xSbIdx][ySbIdx] with xSbIdx=0 . . . numSbXL0−1, and ySbIdx=0 . . . numSbYL0−1, and mvL1[xSbIdx][ySbIdx] with xSbIdx=0 . . . numSbXL1−1, and ySbIdx=0 . . . numSbYL1−1, the refined motion vectors refMvL0[xSbIdx][ySbIdx] and refMvL1 [xSbIdx][ySbIdx] with xSbIdx=0 . . . numSbX−1, and ySbIdx=0 . . . numSbY−1, the chroma motion vectors in 1/32 fractional-sample accuracy mvCL0[xSbIdx][ySbIdx] with xSbIdx=0 . . . numSbXL0−1, ySbIdx=0 . . . numSbYL0−1, and mvCL1[xSbIdx][ySbIdx] with xSbIdx=0 . . . numSbXL1−1, ySbIdx=0 . . . numSbYL1−1, the reference indices refIdxL0 and refIdxL1, the prediction list utilization flags, predFlagL0, and predFlagL1, a variable dmvrApplied-Flag indicating the use of DMVR, the number of CPMVs numCpMv, the CPMVs cpMvL0[cpIdx] with cpIdx=0 . . . numCpMv−1 and cpMvL1 [cpIdx] with cpIdx=0 . . . numCpMv−1.

Outputs of this process are: an (nCbWL)×(nCbHL) array predSamplesL of luma prediction samples, where nCbWL and nCbHL are derived as specified below, when ChromaArrayType is not equal to 0, an (nCbWC)×(nCbHC) array preSamplesCb of chroma prediction samples for the component Cb, where nCbWC and nCbHC are derived as specified below, when ChromaArrayType is not equal to 0, an (nCbWC)×(nCbHC) array predSamplesCr of chroma residual samples for the component Cr, where nCbWC and nCbHC are derived as specified below.

The variables nCbWL and nCbHL are set equal to nCbW and nCbH, respectively, and the variables nCbWC and nCbHC are set equal to nCbW/SubWidthC and nCbH/SubHeightC, respectively.

Let predSamplesL0L and predSamplesL1L be (nCbW)×(nCbH) arrays of predicted luma sample values and, when ChromaArrayType is not equal to 0, predSampleL0Cb, predSampleL1Cb, predSampleL0Cr, and predSampleL1Cr be (nCbW/SubWidthC)×(nCbH/SubHeightC) arrays of predicted chroma sample values.

For X being each of 0 and 1, when predFlagLX is equal to 1, the following applies: The reference picture consisting of an ordered two-dimensional array refPicLXL of luma samples and, when ChromaArrayType is not equal to 0, two ordered two-dimensional arrays refPicLXCb and refPicLXCr of chroma samples is derived by invoking the process specified in clause 8.5.4.1 with refIdxLX as input. The width and the height of the current luma coding sublock sbWidth, sbHeight are derived as follows:

$$sbWidth=nCbW/numSbXLX \quad (8701); \text{ and}$$

$$sbHeight=nCbH/numSbYLX \quad (8702).$$

If affine_flag is equal to 1 and one of the variables sbWidth, sbHeight is less than 8, the following applies:

Horizontal change of motion vector dX, vertical change of motion vector dY and base motion vector mvBaseScaled are derived by invoking the process specified in clause 8.5.3.9 with the luma coding block width nCbW, the luma coding block height nCbH, number of CPMVs numCpMv and the CPMVs cpMvLX[cpIdx] with cpIdx=0 . . . numCpMv−1 as inputs.

The array predSamplesLXL is derived by invoking interpolation process for enhanced interpolation filter specified in clause 8.5.4.3 with the luma locations (xSb, ySb), the luma coding block width nCbW, the luma coding block height nCbH, horizontal change of motion vector dX, vertical change of motion vector dY, base motion vector mvBaseScaled, the reference array refPicLXL, sample bitDepth bitDepthY, picture width pic_width_in_luma_samples and height pic_height_in_luma_samples and clipMV flag as inputs.

If ChromaArrayType is not equal to 0, the following applies:

$$mvBaseScaled[0]=mvBaseScaled[0]/SubWidthC \quad (8703); \text{ and}$$

$$mvBaseScaled[1]=mvBaseScaled[1]/SubHeightC \quad (8704).$$

The arrays predSamplesLXCb, is derived by invoking iterpolation process for enhanced interpolation filter specified in clause 8.5.4.3 with the chroma locations (xSb/SubWidthC, ySb/SubHeightC), the chroma coding block width nCbW/subWidthC, the luma coding block height nCbH/SubHeightC, horizontal change of motion vector dX, vertical change of motion vector dY, base motion vector mvBaseScaled, the reference array refPicLXCb, sample bitDepth bitDepthC, picture width pic_width_in_luma_samples/SubWidthC, picture height pic_height_in_luma_samples/SubHeightC and clipMV flag as inputs. The arrays predSamplesLXCb, is derived by invoking iterpolation process for enhanced interpolation filter specified in clause 8.5.4.3 with the chroma locations (xSb/SubWidthC, ySb/SubHeightC), the chroma coding block width nCbW/subWidthC, the chroma coding block height nCbH/SubHeightC, horizontal change of motion vector dX, vertical change of motion vector dY, base motion vector mvBaseScaled, the reference array refPicLXCb, sample bitDepth bitDepthC, picture width pic_width_in_luma_samples/SubWidthC, picture height pic_height_in_luma_samples/SubHeightC and clipMV flag as inputs.

8.5.4.3 Interpolation Process for the Enhanced Interpolation Filter:

Inputs to this process are: a location (xCb, yCb) in full-sample units, two variables cbWidth and cbHeight specifying the width and the height of the current coding block, horizontal change of motion vector dX, vertical change of motion vector dY, motion vector mvBaseScaled, the selected reference picture sample arrays refPicLX, sample bit depth bitDepth width of the picture in samples pic_width, height of the picture in samples pic_height. clipMV flag specifying if MV clipping is to be applied.

Outputs of this process are: an (cbWidth)×(cbHeight) array predSamplesLX of prediction sample values.

Interpolation filter coefficients T[p] for each 1/32 fractional sample position p equal to xFrac or yFrac are specified in Table 8 15.

The variables shift0, shift1, offset0, offset1 are derived as follows: shift0 is set equal to bitDepth−8, offset0 is equal to 0, shift1 is set equal to 12−shift0, offset1 is equal to 2shift1−1

The variables hor_max, ver_max, hor_min and ver_min are derived by invoking the process specified in 8.5.4.5 with a location (xCb, yCb) in full-sample units, two variables cbWidth and cbHeight specifying the width and the height of the current coding block, horizontal change of motion vector dX, vertical change of motion vector dY, motion vector mvBaseScaled, width of the picture in samples pic_width, height of the picture in samples pic_height and clipMV flag as input, and hor_max, ver_max, hor_min and ver_min as output.

For x=−1 . . . cbWidth and y=−1 . . . cbHeight, the following applies:

The motion vector mvX is derived as follows:

$$mvX[0]=(mvBaseScaled[0]+dX[0]*x+dY[0]*y) \quad (8728)$$

$$mvX[1]=(mvBaseScaled[1]+dX[1]*x+dY[1]*y) \quad (8729)$$

$$mvX[0]=\text{Clip3}(hor\_min,hor\_max,mvX[0]) \quad (8730)$$

$$mvX[1]=\text{Clip3}(ver\_min,ver\_max,mvX[1]) \quad (8731)$$

The variables xInt, yInt, xFrac and yFrac are derived as follows:

$$xInt=xCb+(mvX[0]>>9)+x \quad (8730)$$

$$yInt=yCb+(mvX[1]>9)+y \quad (8731)$$

$x\text{Frac}=(mvX[0]>>4)\&31$ (8732)

$y\text{Frac}=(mvX[1]>>4)\&31$ (8733)

The variables A and B are derived as follows:

$A=(\text{refPic}LX[x\text{Int}][y\text{Int}]*T[x\text{Frac}][0]++\text{refPic}LX[x\text{Int}+1][y\text{Int}]*T[x\text{Frac}][1]+\text{offset}0)>>\text{shift}0$ (8736)

$B=(\text{refPic}LX[x\text{Int}][y\text{Int}+1]*T[x\text{Frac}][0]++\text{refPic}LX[x\text{Int}+1][y\text{Int}+1]*T[x\text{Frac}][1]+\text{offset}0)>>\text{shift}0$ (8737)

The sample value bx,y corresponding to location (x, y) is derived as follows:

$b_{x,y}=(A*T[y\text{Frac}][0]+B*T[y\text{Frac}][1]+\text{offset}1)>>\text{shift}1$ (8740)

The enhancement interpolation filter coefficients eF[ ] are specified as {−1, 10, −1}.

The variables shift2, shift3, offset2 and offset3 are derived as follows:
 shift2 is set equal to max(bit_depth−11, 0), offset2 is equal to 2shift2−1,
 shift3 is set equal to (6−max(bit_depth−11, 0)), offset3 is equal to 2shift3−1, For x=0 . . . cbWidth−1 and y=−1 . . . cbHeight, the following applies:

$h_{x,y}=(eF[0]*b_{x-1,y}+eF[1]*b_{x,y}+eF[2]*b_{x+1,y}+\text{offset}2)>>\text{shift}2$ (8741)

For x=0 . . . cbWidth−1 and y=0 . . . cbHeight−1, the following applies:

$\text{predSamples}LXL[x][y]=\text{Clip}3(0,(1<<\text{bitDepth})-1,(eF[0]*h_{x,y-1}+eF[1]*h_{x,y}+eF[2]*b_{x,y+1}+\text{offset}3)>>\text{shift}3)$ (8742)

TABLE 1

Specification of the interpolation filter coefficients T[p] for each 1/32 fractional sample position p

| Fractional sample position p | Interpolation filter coefficients | |
| --- | --- | --- |
| | T[p][0] | T[p][1] |
| 0 | 64 | 0 |
| 1 | 62 | 2 |
| 2 | 60 | 4 |
| 3 | 58 | 6 |
| 4 | 56 | 8 |
| 5 | 54 | 10 |
| 6 | 52 | 12 |
| 7 | 50 | 14 |
| 8 | 48 | 16 |
| 9 | 46 | 18 |
| 10 | 44 | 20 |
| 11 | 42 | 22 |
| 12 | 40 | 24 |
| 13 | 38 | 26 |
| 14 | 36 | 28 |
| 15 | 34 | 30 |
| 16 | 32 | 32 |
| 17 | 30 | 34 |
| 18 | 28 | 36 |
| 19 | 26 | 38 |
| 20 | 24 | 40 |
| 21 | 22 | 42 |
| 22 | 20 | 44 |
| 23 | 18 | 46 |
| 24 | 16 | 48 |
| 25 | 14 | 50 |
| 26 | 12 | 52 |
| 27 | 10 | 54 |

TABLE 1-continued

Specification of the interpolation filter coefficients T[p] for each 1/32 fractional sample position p

| Fractional sample position p | Interpolation filter coefficients | |
| --- | --- | --- |
| | T[p][0] | T[p][1] |
| 28 | 8 | 56 |
| 29 | 6 | 58 |
| 30 | 4 | 60 |
| 31 | 2 | 62 . . . |

. . .

8.5.4.5 Derivation of Clipping Parameters for Affine Motion Vector

Inputs to this process are: a location (xCb, yCb) in full-sample units, two variables cbWidth and cbHeight specifying the width and the height of the current coding block, horizontal change of motion vector dX, vertical change of motion vector dY, motion vector mvBaseScaled, width of the picture in samples pic_width, height of the picture in samples pic_height, mvClippingMode flag specifying type of the bounding box constrains.

Outputs of this process are: hor_max, ver_max, hor_min and ver_min that denotes the maximum and minimum allowed motion vector horizontal and vertical components.

The center motion vector mv_center is derived as follows:

$mv\_\text{center}[0]=(mv\text{BaseScaled}[0]+dX[0]*(cb\text{Width}>>1)+dY[0]*(cb\text{Height}>>1))$ (8743)

$mv\_\text{center}[1]=(mv\text{BaseScaled}[1]+dX[1]*(cb\text{Width}>>1)+dY[1]*(cb\text{Height}>>1))$ (8743)

The rounding process for motion vectors as specified in clause 8.5.3.10 is invoked with mv_center, rightShift set equal to 5, and leftShift set equal to 0 as inputs and the rounded motion vector is return as mv_center.

The motion vector mv_center is clipped as follows:

$mv\_\text{center}[0]=\text{Clip}3(-2^{17},2^{17}-1,mv\_\text{center}[0])$ (8686)

$mv\_\text{center}[1]=\text{Clip}3(-2^{17},2^{17}-1,mv\_\text{center}[1])$ (8686)

The variable smv_hor_min, mv_ver_min, mv_hor_max and mv_ver_max are derived as following:

$mv\_\text{hor\_min}=mv\_\text{center}[0]-\text{deviation}A[\log 2Cb\text{Width}-3]$ (8743)

$mv\_\text{ver\_min}=mv\_\text{center}[1]-\text{deviation}A[\log 2Cb\text{Height}-3]$ (8743)

$mv\_\text{hor\_max}=mv\_\text{center}[0]+\text{deviation}B[\log 2Cb\text{Width}-3]$ (8743)

$mv\_\text{ver\_max}=mv\_\text{center}[1]+\text{deviation}B[\log 2Cb\text{Height}-3]$ (8743)

with deviationA and deviationB specified for k=0 . . . 4 as:
 If mvClippingMode is set equal to 0, variables deviationA and deviationB are defined as follows:

$\text{deviation}A[k]=\{16,80,224,512,1088\},$ $\text{deviation}B[k]\{16,96,240,528,1104\}.$ Otherwise, variables deviationA and deviationB are derived by invoking process specified in clause XXX.

The variables hor_max_pic, ver_max_pic, hor_min_pic and ver_min_pic are derived as follows:

hor_max_pic=(pic_width+*Ctb*Size*Y*–*xCb*–*cb*Width+1)<<4  (8743)

ver_max_pic=(pic_height+*Ctb*Size*Y*–*yCb*–*cb*Height+1)<<4  (8743)

hor_min_pic=(–*Ctb*Size*Y*–*xCb*)<<4  (8743)

ver_min_pic=(–*Ctb*Size*Y*–*yCb*)<<4  (8743)

The output hor_max, ver_max, hor_min and ver_min that denotes the maximum and minimum allowed motion vector horizontal and vertical components are derived as following:

hor_max=min(hor_max_pic,*mv*_hor_max)<<5  (8743)

ver_max=min(ver_max_pic,*mv*_ver_max)<<5  (8743)

hor_min=max(hor_min_pic,*mv*_hor_min)<<5  (8743)

ver_min=max(ver_min_pic,*mv*_ver_min)<<5  (8743)

Embodiment 4

Algorithm 1. Adaptive usage of EIF and block-based affine motion compensation (basic algorithm):

The basic algorithm of adaptive usage of EIF and sub-block affine motion compensation is as follows.

Calculate optimal subblock size M×N based on affine motion model parameters.

If both optimal subblock width M and optimal subblock height N are greater or equal than 8, then perform subblock motion compensation with M×N subblock.

Otherwise, check EIF applicability conditions:
EIF applicability condition 1
EIF applicability condition 2
. . .
EIF applicability condition P If all EIF applicability conditions are met, then perform EIF motion compensation. EIF motion compensation process comprise:
Check EIF applicability condition P+1
Check EIF applicability condition P+2
. . .
Check EIF applicability condition P+K If one of EIF applicability conditions P+1 . . . P+K are not met, then calculate first motion vector range that provide fulfilment of conditions that were not met and set second motion vector range equal to the first motion vector range.

Otherwise, calculate third motion vector range and set second motion vector range equal to the third motion vector range Clip motion vectors calculated according to affine model to guarantee, that these vectors are in the second motion vector range.

Otherwise, set M=max(M, 8), N=max(N, 8) and perform subblock motion compensation with M×N subblock.

In some examples P and K can be equal to zero that means that the algorithm above will not have steps 3.a-3.d if P is equal to zero and will not have steps 3.e.i-3.e.v if K is equal to zero.

The details of some steps of this basic algorithm is described below.

Step 1. Optimal Subblock Size Calculation:

One method for deriving affine sub-block size is based on the motion vector differences of the affine control points and the width and height of an affine block. The sub-block size M×N could be derived as by Equation (2-1), where MvPre is the motion vector accuracy (e.g., ¼ pel in HEVC standard or 1/16 pel in VVC and EVC standards), and affine motion model parameters dHorX, dHorY, dVerX, dVerY are calculated according to equations (1-4)-(1-7) for 6 parameter model and according to equations (1-8)-(1-11) for 4 parameter model.

$$\begin{cases} M = \text{clip3}\left(4, w, \frac{w \times MvPre}{\max(\text{abs}(dHorX), \text{abs}(dHorY))}\right) \\ N = \text{clip3}\left(4, h, \frac{h \times MvPre}{\max(\text{abs}(dVerX), \text{abs}(dVerY))}\right) \end{cases} \quad (2\text{-}1)$$

M and N derived in Equation (2-1) will be adjusted downward if necessary to make sure that w and h is divisible by M and N, respectively.

Another method is to build a 3 dimensional looking up table, then get the sub-block size directly from the looking up table according to motion vector difference, block size, and motion vector precision. For example, set M to Table_M [x][y][z], where x equal to $\max(\text{abs}(v_{1x}-v_{0x}),\text{abs}(v_{1y}-v_{0y}))$, y equal to affine block width, z equal to the motion vector precision, set N to Table_N[x][y][z], where x equal to $\max(\text{abs}(v_{2x}-v_{0x}),\text{abs}(v_{2y}-v_{0y}))$, y equal to affine block height, z equal to the motion vector precision.

In some exemplary implementation steps 1 is implemented as follows:

8.5.3.8 Derivation Process for Affine Subblock Size:

Inputs to this process are: two variables cbWidth and cbHeight specifying the width and the height of the luma coding block, the number of CPMVs numCpMv, the CPMVs cpMvLX[cpIdx], with cpIdx=0 . . . numCpMv−1 and X being 0 or 1, the prediction list utilization flags predFlagLX, with X being 0 or 1.

Outputs of this process are: the size of luma coding subblocks in horizontal direction sizeSbX and in vertical direction sizeSbY, sizeSbX is set equal to cbWidth, sizeSbY is set equal to cbHeight.

When predFlagLX is equal to 1, the following applies for X being 0 and 1:

Horizontal change of motion vector dX, vertical change of motion vector dY and base motion vector mvBaseScaled are derived by invoking the process specified in clause 8.5.3.9 with the luma coding block width cbWidth, the luma coding block height cbHeight, number of CPMVs numCpMv and the CPMVs cpMvLX[cpIdx] with cpIdx= 0 . . . numCpMv−1 as inputs.

The variable mvWx and mvWy are derived as follows:

mvWx=max(abs(*dX*[0]),abs(*dX*[1]))

mvWy=max(abs(*dY*[0]),abs(*dY*[1]))

The variable sizeSbXTemp is specified in Table 8-5 according to the value of mvWx.

The variable sizeSbYTemp is specified in Table 8-5 according to the value of mvWy.

The variable sizeSbX is modified as follow:

size*SbX*=min(sizes*SbX*,size*SbX*Temp)

The variable sizeSbY is modified as follow:

size*SbY*=min(size*SbY*,size*SbY*Temp)

TABLE 8-5

Specification of sizeSbXTemp for various input values of mvWx

| mvWx    | 0       | 1  | 2  | 3 | 4 | >4 |
|---------|---------|----|----|---|---|----|
| sizeSbX | cbWidth | 32 | 16 | 8 | 8 | 4  |

TABLE 8-5

Specification of sizeSbYTemp for various input values of mvWy

| mvWx    | 0        | 1  | 2  | 3 | 4 | >4 |
|---------|----------|----|----|---|---|----|
| sizeSbY | cbHeight | 32 | 16 | 8 | 8 | 4  |

Where clause 8.5.3.9 is described as follows:
8.5.3.9. Derivation Process for Affine Motion Model Parameters from CPMVs:

Inputs to this process are: two variables cbWidth and cbHeight specifying the width and the height of the luma coding block, the number of CPMVs numCpMv, the CPMVs cpMvLX[cpIdx], with cpIdx=0 . . . numCpMv−1 and X being 0 or 1.

Outputs of this process are: horizontal change of motion vector dX, vertical change of motion vector dY, motion vector mvBaseScaled corresponding to the top left corner of the luma coding block.

The variables log 2CbW (also denoted as log 2CbWidth) and log 2CbH (also denoted as log 2CbHeight) are derived as follows:

$$\log 2CbW = \text{Log } 2(cbWidth) \tag{8-688}$$

$$\log 2CbH = \text{Log } 2(cbHeight) \tag{8-689}$$

Horizontal change of motion vector dX is derived as follows:

$$dx[0] = (cpMvLX[1][0] - cpMvLX[0][0]) << (7 - \log 2CbW) \tag{8-690}$$

$$dX[1] = (cpMvLX[1][1] - cpMvLX[0][1]) << (7 - \log 2CbW) \tag{8-691}$$

Vertical change of motion vector dY is derived as follows:
If numCpMv is equal to 3, dY is derived as follow:

$$dY[0] = (cpMvLX[2][0] - cpMvLX[0][0]) << (7 - \log 2CbH) \tag{8-692}$$

$$dY[1] = (cpMvLX[2][1] - cpMvLX[0][1]) << (7 - \log 2CbH) \tag{8-693}$$

Otherwise (numCpMv is equal to 2), dY is derived as follows:

$$dY[0] = -dx[1] \tag{8-694}$$

$$dY[1] = dX[0] \tag{8-695}$$

Motion vector mvBaseScaled corresponding to the top left corner of the luma coding block is derived as follows:

$$mvBaseScaled[0] = cpMvLX[0][0] << 7 \tag{8-696}$$

$$mvBaseScaled[1] = cpMvLX[0][1] << 7 \tag{8-697}$$

Step 3. EIF Applicability Conditions:
EIF applicability conditions can be for example as following:
Memory bandwidth restrictions. This kind of restrictions guarantee that the size of area in the reference picture corresponding to the current affine block (EIF block) is no more than predefined threshold T. The example of definition of area in the reference picture corresponding to the current affine block is depicted in FIG. 9.

The internal buffer is limited by R lines, where R is predefined value and can be for example 3, 4, 5 or more. This means that during processing of one line (one row) of the current block (subblock) no more than R lines from the reference picture can be used.

Memory access should be sequential, which means that if for $i_{th}$ line of current block $j_{th}$ line of the reference picture is fetched, then for $(i+1)_{th}$ line of the current block only lines j+1, j+2, . . . can be fetched.

No more than one additional line can be fetched for all lines of the current block except for the first.

The inequalities for affine motion model parameters, for example as following:

$$\begin{cases} a \le dHorX \le b \\ c \le dHorY \le d \\ e \le dVerX \le f \\ g \le dVerY \le h \end{cases},$$

where a, b, c, d, e, f, g, h are predefined values or plus/minus infinity.

$$\begin{cases} dHorX \le a * dVerX \\ dVerY \le b * dHorY \end{cases},$$

where a and b are predefined values
In one example with specific EIF applicability conditions, basic algorithm is as follows:
Algorithm 2. Adaptive usage of EIF and block-based affine motion compensation with specific EIF applicability conditions:

Calculate optimal subblock size M×N based on affine motion model parameters.

If both optimal subblock width M or optimal subblock height N is greater or equal than 8, then perform subblock motion compensation with M×N subblock.

Otherwise, check EIF applicability conditions:
EIF applicability condition 1: The internal buffer is limited by R lines, where R is predefined value and can be for example 3, 4, 5 or more. This means that during processing of one line (one row) of the current block (subblock) no more than R lines from the reference picture can be used.

EIF applicability condition 2: Memory access should be sequential, which means that if for $i_{th}$ line of current block $j_{th}$ line of the reference picture is fetched, then for $(i+1)_{th}$ line of the current block only lines j+1, j+2, . . . can be fetched.

EIF applicability condition 3: No more than one additional line can be fetched for all lines of the current block except for the first.

. . .

EIF applicability condition P
If all EIF applicability conditions are met, then perform EIF motion compensation. EIF motion compensation process comprise:

Check EIF applicability condition P+1: Checking memory bandwidth restrictions. This kind of restrictions guarantee that the size of area in the reference picture corresponding to the current affine block (EIF block) is no more than predefined threshold T. The example of definition of area in the reference picture corresponding to the current affine block is depicted in FIG. 9.

. . .

Check EIF applicability condition P+K:

If one of EIF applicability conditions P+1 ... P+K are not met, then calculate first motion vector range that provide fulfilment of conditions that were not met and set second motion vector range equal to the first motion vector range.

Otherwise, calculate third motion vector range and set second motion vector range equal to the third motion vector range.

Clip motion vectors calculated according to affine model to guarantee, that these vectors are in the second motion vector range.

Otherwise set M=max(M, 8), N=max(N, 8) and perform subblock motion compensation with M×N subblock.

In some examples P can be equal to 3 that means that the algorithm above will not have steps 3.d-3.e. In some examples K can be equal to 1 that means that the algorithm above will not have steps 3.f.ii-3.f.iii.

In one exemplary implementation steps 3.a-e are implemented as follows:

When predFlagLX is equal to 1, the following applies for X being 0 and 1:

Horizontal change of motion vector dX, vertical change of motion vector dY and base motion vector mvBaseScaled are derived by invoking the process specified in clause 8.5.3.9 with the luma coding block width cbWidth, the luma coding block height cbHeight, number of CPMVs numCpMv and the CPMVs cpMvLX[cpIdx] with cpIdx= 0 ... numCpMv−1 as inputs.

If dY[1] is less than ((−1)<<9), then the variable eifCanBeAppliedX is equal to FALSE.

Otherwise, If (max(0, dY[1])+Abs(dX[1]))*(1+eifSubblockSize) is greater than (1<<9) then the variable eifCanBeAppliedX is equal to FALSE.

Where clause 8.5.3.9 is described as in previous examples.

The variable eifCanBeAppliedX equal to TRUE here means that all EIF applicability conditions 1-P (steps 3.a-3.e of algorithm 2) are met.

The details about step 3.f.i of the algorithm 2 are provided below.

Memory access consumption calculation for affine block in case of usage EIF

When EIF is used for motion compensation of affine block with size W×H, the following steps are performed for memory access consumption calculation.

Derive the location of each corner sample of the affine block.

Derive the location of each corner sample of the block which are used on step 3 of EIF (denote it as EIF intermediate block).

Derive motion vectors for each corner sample of EIF intermediate block.

Derive location of transformed block in reference picture.

Derive the bounding box size for the transformed block.

Get the memory access consumption based on transformed block size and filter length (EIF uses bilinear interpolation, so filter length is equal to 2).

The details of implementation of these steps are described below.

Step 1. Derive the Location of Each Corner Sample of the Affine Block

Denote (x0, y0) as the coordinate of the top-left sample of the affine block. Then the location of the affine block can be described by the coordinates of its corner samples (top-left, top-right, bottom-left, bottom-right):

$$\begin{cases} (x_0, y_0) = (x_0, y_0) \\ (x_1, y_1) = (x_0 + W - 1, y_0) \\ (x_2, y_2) = (x_0, y_0 + H - 1) \\ (x_3, y_3) = (x_0 + W - 1, y_0 + H - 1) \end{cases} \quad (2\text{-}1)$$

Step 2. Derive the Location of Each Corner Sample of the EIF Intermediate Block

Bilinear interpolation at the step 2 of EIF is performed for (W+2)×(H+2) block (one pixel margin from each border is added). This (W+2)×(H+2) block is denoted as intermediate EIF block. The coordinates of intermediate EIF block corner samples (top-left, top-right, bottom-left, bottom-right) are:

$$\begin{cases} (X_0, Y_0) = (x_0 - 1, y_0 - 1) \\ (X_1, Y_1) = (x_0 + W, y_0 - 1) \\ (X_2, Y_2) = (x_0 - 1, y_0 + H) \\ (X_3, Y_3) = (x_0 + W, y_0 + H) \end{cases} \quad (2\text{-}2)$$

The coordinates of corners of affine block and of intermediate EIF block are depicted in FIG. 8.

Step 3. Derive Motion Vectors for Each Corner Sample of EIF Intermediate Block

Motion vectors are derived according to equation (1-1). In some examples, motion vector clipping can be used to guarantee that samples outside of the current picture with margin of one CTU size are not used.

$$\begin{cases} V_0 = V_{X_0, Y_0} = (mv_{0x} + (-1)dHorX + (-1)dVerX, mv_{0y} + (-1)dHorY + (-1)dVerY) \\ V_1 = V_{X_1, Y_1} = (mv_{0x} + (W)dHorX + (-1)dVerX, mv_{0y} + (W)dHorY + (-1)dVerY) \\ V_2 = V_{X_2, Y_2} = (mv_{0x} + (-1)dHorX + (H)dVerX, mv_{0y} + (-1)dHorY + (H)dVerY) \\ V_3 = V_{X_3, Y_3} = (mv_{0x} + (W)dHorX + (H)dVerX, mv_{0y} + (W)dHorY + (H)dVerY) \end{cases} \quad (2\text{-}3)$$

Step 4. Derive Location of Transformed Block in Reference Picture

Denote horizontal and vertical parts of vector Vi as $V_{ix}$ and $V_{iy}$ respectively.

The location of the transformed block in reference picture can be described by the coordinates of its corner samples (top-left, top-right, bottom-left, bottom-right):

$$\begin{cases} (X'_0, Y'_0) = (X_0 + V_{0x}, Y_0 + V_{0y}) \\ (X'_1, Y'_1) = (X_1 + V_{1x}, Y_1 + V_{1y}) \\ (X'_2, Y'_2) = (X_2 + V_{2x}, Y_2 + V_{2y}) \\ (X'_3, Y'_3) = (X_3 + V_{3x}, Y_3 + V_{3y}) \end{cases} \quad (2\text{-}4)$$

Step 5. Derive the Bounding Box Size for the Transformed Block:

The bounding box size for transformed block in reference picture can be calculated by following equation, where max function returns the maximum value of the arguments, min function returns the minimum value of the arguments:

$$\begin{cases} W' = \max(X'_0, X'_1, X'_2, X'_3) - \min(X'_0, X'_1, X'_2, X'_3) + 1 \\ H' = \max(Y'_0, Y'_1, Y'_2, Y'_3) - \min(Y'_0, Y'_1, Y'_2, Y'_3) + 1 \end{cases} \quad (2\text{-}5)$$

The location of transformed block in reference picture and corresponding bounding box are depicted in FIG. 9.

In one example, W'=Ceil(W'), H'=Ceil(H') is performed after equation (2-5).

In another example, W'=Floor(W'), H'=Floor(H') is performed after equation (2-5).

Step 6. Get the Memory Access Consumption:

The memory access consumption of the affine block in one reference picture can be decided, by the bounding box size for the transformed block transformed block and the length of MC interpolation filter for affine motion block T', e.g., 2, 4, 6, 8 . . . :

$$\text{Mem} = (W' + T' - 1)*(H' + T' - 1) \quad (2\text{-}6)$$

For EIF, bilinear interpolation is used, therefore filter length is 2 and memory access consumption is equal to $$\text{Mem} = (W' + 1)*(H' + 1) \quad (2\text{-}7)$$

Affine Motion Model Restrictions for EIF:

Denote target worst case memory bandwidth as $$T = \frac{S_{wc}}{W * H},$$

where W and H are current block width and heights respectively, and $S_{wc}$ is maximum allowed memory access consumption for the current block, according to the target case memory bandwidth. To guarantee that EIF memory bandwidth is not greater that the target case memory bandwidth, the memory access consumption of affine block should be constrained as following condition:

$$\frac{(W'+1)*(H'+1)}{W*H} \leq T \quad (2\text{-}8)$$

or $$(W'+1)*(H'+1) \leq T*W*H$$

or $$(W'+1)*(H'+1) \leq S_{wc}$$

The value T can be predefined in both encoder and decoder, or specified in a parameter set of a codec video sequence, e.g., sequence levels, picture level, slice level parameter set, etc.

In one example, if the maximum allowed memory access consumption per sample is defined as the memory access consumption of a 4×4 block, then T can be derived as follows, where T is the length of interpolation filter:

$$T = \frac{(4+T'-1)*(4+T'-1)}{4*4} \quad (2\text{-}9)$$

For T' equal to 6 the restriction is as follows:

$$(W'+1)*(H'+1) \leq (4+6-1)*(4+6-1) \quad (2\text{-}10)$$

In another example, if the maximum allowed memory access consumption per sample is defined as the memory access consumption of a 8×8 block, then T can be derived as follows, where T is the length of interpolation filter:

$$T = \frac{(8+T'-1)*(8+T'-1)}{8*8} \quad (2\text{-}11)$$

In another example, the maximum allowed memory access consumption of per sample can be different according the prediction direction of current block, i.e.: when current block is uni-prediction, use threshold $T_{UNI}$, when current block is bi-prediction, use threshold $T_{BI}$.

For example, $T_{UNI}$ is defined as the memory access consumption of 4×4 block, $T_{BI}$ is defined as the memory access consumption of 8×4 block, then:

$$T_{UNI} = \frac{(4+T'-1)*(4+T'-1)}{4*4} \quad (2\text{-}12)$$

$$T_{Bi} = \frac{(8+T'-1)*(4+T'-1)}{8*4} \quad (2\text{-}13)$$

In another example, $T_{UNI}$ is defined as the memory access consumption of 4×4 block, $T_{BI}$ is defined as the memory access consumption of 8×8 block, then:

$$T_{UNI} = \frac{(4+T'-1)*(4+T'-1)}{4*4} \quad (2\text{-}14)$$

$$T_{Bi} = \frac{(8+T'-1)*(8+T'-1)}{8*8} \quad (2\text{-}15)$$

T' in the examples above is the length of motion compensation (MC) interpolation filter for translational motion block, e.g., 2, 4, 6, 8 . . . .

The value of T, $T_{UNI}$ and $T_{BI}$ may depend on width and height of the current block.

For bi-prediction affine block, the above constraint is applied to both list0 and list1, individually.

In another example memory access consumption is calculated for list0 and for list1 as $\text{Mem}_0$ and $\text{Mem}_1$, and sum of these elements is restricted. For example, if the $T_{BI}$ is defined as the memory access consumption of 8×8 block, the following restriction is used:

$$\text{Mem}_0 + \text{Mem}_1 \leq 2*(8+T'-1)*(8+T'-1) \quad (2\text{-}16)$$

If the motion vectors of the affine block cannot follow the constraint conditions (2-8), the block cannot use EIF motion compensation.

In one example, if the affine block cannot use EIF motion compensation, subblock motion compensation with minimum subblock size 8×8 is used instead of EIF.

In another example, if the affine block cannot use EIF motion compensation, translational motion compensation with motion vector calculated for the center of the affine block is used instead of EIF.

In another example, if the affine block cannot use EIF motion compensation, the bounding box is derived based on W' and H' for those inequality (2-8) is satisfied. For example W' and H' can be calculated as:

$W' = \sqrt{T*W*H} - 1$, and $H' = \sqrt{T*W*H} - 1$.

After that during MV calculation in EIF according to equation (1-1), the horizontal part of motion vectors is clipped to the range [$mv_{0x}$, $mv_{0x}+W'-1$], and vertical part of motion vectors is clipped to the range [$mv_{0y}$, $mv_{0y}+H'-1$]. In one example, if block aspect ratio is k (W=kH), H' is calculated by solving the equation:

$$k(H')^2+(k+1)H'+1-TWH=0,$$

and performing the following steps:

$$H'=Floor(H'), W'=kH'.$$

In another example steps 3.f.i and 3.f.iv.1 is implemented as follows:

Memory access consumption calculation for affine block in case of usage EIF

The following steps are performed for memory access consumption calculation.

Derive the location of each corner sample of the W×H subblock.

Derive the location of each corner sample of the subblock used on step 3 of EIF (denote it as EIF intermediate subblock).

Derive motion vectors for each corner sample of EIF intermediate subblock.

Derive location of transformed subblock in reference picture.

Derive the bounding box size for the transformed subblock.

Get the memory access consumption based on the bounding box size for transformed subblock size and filter length (EIF uses bilinear interpolation, so filter length is equal to 2).

The details of implementation of these steps are described below.

Step 1. Derive the Location of Each Corner Sample of the Affine Subblock

Denote (x0, y0) as the coordinate of the top-left sample of the affine block. In this embodiment for memory access consumption calculation, it's supposed that coordinate of the top-left sample of the affine block is equal to (1, 1). The position ($x_0$, $y_0$) does not make sense for memory access consumption calculation and with ($x_0$, $y_0$)=(1, 1) the equations are simpler.

Then the location of the affine block can be described by the coordinates of its corner samples (top-left, top-right, bottom-left, bottom-right):

$$\begin{cases} (x_0, y_0) = (1, 1) \\ (x_1, y_1) = (W, 1) \\ (x_2, y_2) = (1, H) \\ (x_3, y_3) = (W, H) \end{cases} \quad (3\text{-}1)$$

Step 2. Derive the Location of Each Corner Sample of the EIF Intermediate Subblock Due to EIF uses 3-tap filter at the step 3, bilinear interpolation at the step 2 of EIF is performed for (W+2)×(H+2) subblock (one pixel margin from each border is added). This (W+2)×(H+2) subblock is denoted as intermediate EIF subblock. The coordinates of intermediate EIF block corner samples (top-left, top-right, bottom-left, bottom-right) are:

$$\begin{cases} (X_0, Y_0) = (0, 0) \\ (X_1, Y_1) = (1+W, 0) \\ (X_2, Y_2) = (0, 1+H) \\ (X_3, Y_3) = (1+W, 1+H) \end{cases} \quad (3\text{-}2)$$

The coordinates of corners of affine subblock and of intermediate EIF subblock are depicted in FIG. 8.

Step 3. Derive Motion Vectors for Each Corner Sample of EIF Intermediate Subblock The initial motion vector ($mv_{0x}$, $mv_{0y}$) does not make sense for memory access consumption calculation and with ($mv_{0x}$, $mv_{0y}$)=(dHorX+dVerX, dHorY+dVerY) the equations are simpler.

Motion vectors are derived according to equation (1-1).

$$\begin{cases} V_0 = V_{X_0,Y_0} = (0, 0) \\ V_1 = V_{X_1,Y_1} = ((W+1)dHorX, (W+1)dHorY) \\ V_2 = V_{X_2,Y_2} = ((H+1)dVerX, (H+1)dVerY) \\ V_3 = V_{X_3,Y_3} = ((W+1)dHorX + (H+1)dVerX, (W+1)dHorY + (H+1)dVerY) \end{cases} \quad (3\text{-}3)$$

Step 4. Derive Location of Transformed Block in Reference Picture

The location of the transformed block in reference picture can be descripted by the coordinates of its corner samples (top-left, top-right, bottom-left, bottom-right):

$$\begin{cases} (X'_0, Y'_0) = (0, 0) \\ (X'_1, Y'_1) = (1+W+(W+1)dHorX, (W+1)dHorY) \\ (X'_2, Y'_2) = ((H+1)dVerX, 1+H+(H+1)dVerY) \\ (X'_3, Y'_3) = (1+W+(W+1)dHorX + (H+1)dVerX, 1+H+(W+1)dHorY + (H+1)dVerY) \end{cases} \quad (3\text{-}4)$$

Step 5. Derive the Bounding Box Size for the Transformed Subblock

The bounding box size for transformed subblock in reference picture can be calculated by following equation, where max function returns the maximum value of the arguments, min function returns the minimum value of the arguments:

$$\begin{cases} W' = \max(X'_0, X'_1, X'_2, X'_3) - \min(X'_0, X'_1, X'_2, X'_3) + 1 \\ H' = \max(Y'_0, Y'_1, Y'_2, Y'_3) - \min(Y'_0, Y'_1, Y'_2, Y'_3) + 1 \end{cases} \quad (3\text{-}5)$$

The location of transformed subblock in reference picture and corresponding bounding box are depicted in FIG. 9.

In one example W'=Ceil(W'), H'=Ceil(H') is performed after equation (3-5).

In another example W'=Floor(W'), H'=Floor(H') is performed after equation (3-5).

Step 6. Get the Memory Access Consumption

The memory access consumption of the affine subblock in one reference picture can be decided, by the bounding box size for the transformed subblock size and the length of MC interpolation filter for affine motion block T', e.g., 2, 4, 6, 8 . . . :

$$Mem=(W'+T'-1)*(H'+T'-1) \quad (3\text{-}6)$$

For EIF, bilinear interpolation is used, therefore filter length is 2 and memory access consumption is equal to $$\text{Mem} = (W'+1)*(H'+1) \quad (3\text{-}7)$$

Affine Motion Model Restrictions for EIF:

Denote target worst case memory bandwidth as $$T = \frac{S_{wc}}{W*H},$$

where w and H are current subblock width and heights respectively, and $S_{wc}$ is maximum allowed memory access consumption for the current subblock, according to the target case memory bandwidth. To guarantee that EIF memory bandwidth is not greater that the target case memory bandwidth, the memory access consumption of EIF subblock should be constrained as following condition:

$$\frac{(W'+1)*(H'+1)}{W*H} \le T \quad (3\text{-}8)$$

or $$(W'+1)*(H'+1) \le T*W*H$$

or $$(W'+1)*(H'+1) \le S_{wc}$$

The value T can be predefined in both encoder and decoder, or specified in a parameter set of a codec video sequence, e.g., sequence levels, picture level, slice level parameter set, etc.

In one example, if the maximum allowed memory access consumption per sample is defined as the memory access consumption of a 4×4 block, then T can be derived as follows, where T is the length of interpolation filter:

$$T = \frac{(4+T'-1)*(4+T'-1)}{4*4} \quad (3\text{-}9)$$

For T' equal to 6 the restriction is as follows:

$$(W'+1)*(H'+1) \le (4+6-1)*(4+6-1) \quad (3\text{-}10)$$

In another example, if the maximum allowed memory access consumption per sample is defined as the memory access consumption of a 8×8 block, then T can be derived as follows, where T is the length of interpolation filter:

$$T = \frac{(8+T'-1)*(8+T'-1)}{8*8} \quad (3\text{-}11)$$

In another example, the maximum allowed memory access consumption of per sample can be different according the prediction direction of current block, i.e.: when current block is uni-prediction, use threshold $T_{UNI}$, when current block is bi-prediction, use threshold $T_{BI}$.

For example, $T_{UNI}$ is defined as the memory access consumption of 4×4 block, $T_{BI}$ is defined as the memory access consumption of 8×4 block, then:

$$T_{UNI} = \frac{(4+T'-1)*(4+T'-1)}{4*4} \quad (3\text{-}12)$$

$$T_{Bi} = \frac{(8+T'-1)*(4+T'-1)}{8*4} \quad (3\text{-}13)$$

In another example, $T_{UNI}$ is defined as the memory access consumption of 4×4 block, $T_{BI}$ is defined as the memory access consumption of 8×8 block, then:

$$T_{UNI} = \frac{(4+T'-1)*(4+T'-1)}{4*4} \quad (3\text{-}14)$$

$$T_{Bi} = \frac{(8+T'-1)*(8+T'-1)}{8*8} \quad (3\text{-}15)$$

T' in the examples above is the length of motion compensation (MC) interpolation filter for translational motion block, e.g., 2, 4, 6, 8 . . . .

The value of T, $T_{UNI}$ and $T_{BI}$ may depend on width and height of the current block.

For bi-prediction affine block, the above constraint is applied to both list0 and list1, individually.

In another example memory access consumption is calculated for list0 and for list1 as $\text{Mem}_0$ and $\text{Mem}_1$ and sum of these elements is restricted. For example, if the $T_{BI}$ is defined as the memory access consumption of 8×8 block the following restriction is used:

$$\text{Mem}_0 + \text{Mem}_1 \le 2*(8+T'-1)*(8+T'-1) \quad (3\text{-}16)$$

If the motion vectors of the affine block cannot follow the constraint conditions (3-8), the block cannot use EIF motion compensation.

In one example if the affine block cannot use EIF motion compensation, subblock motion compensation with minimum subblock size 8×8 is used instead of EIF.

In another example if the affine block cannot use EIF motion compensation, translational motion compensation with motion vector calculated for the center of the affine block is used instead of EIF.

In another example if the affine block cannot use EIF motion compensation, the bounding box is derived based on W' and H' for those inequality (3-8) is satisfied. For example W' and H' can be calculated as:

$$W' = \sqrt{T*W*H} - 1, \text{ and}$$

$$H' = \sqrt{T*W*H} - 1.$$

After that during MV calculation in EIF according to equation (1-1), the horizontal part of motion vectors is clipped to the range [$mv_{0x}$, $mv_{0x}+W'-1$] and vertical part of motion vectors is clipped to the range [$mv_{0y}$, $mv_{0y}+H'-1$]. In one example if block aspect ratio is k (W=kH), H' is calculated by solving the equation $k(H')^2+(k+1)H'+1-TWH=0$ and performing the following steps: H'=Floor(H'), W'=kH'.

In one exemplary implementation steps 3.f.i and 3.f.iii of the algorithm 2 are implemented as follows:

The variable clipMVX is derived as follows for X being 0 and 1: clipMVX is set equal to FALSE.

The variable eifSubblockSize is set equal to 4.

When predFlagLX is equal to 1, the following applies for X being 0 and 1:

Horizontal change of motion vector dX, vertical change of motion vector dY and base motion vector mvBaseScaled are derived by invoking the process specified in clause 8.5.3.9 with the luma coding block width cbWidth, the luma coding block height cbHeight, number of CPMVs numCpMv and the CPMVs cpMvLX[cpIdx] with cpIdx=0 . . . numCpMv−1 as inputs.

The variable mvWx and mvWy are derived as follows:

$mvWx=\max(\text{abs}(dX[0]),\text{abs}(dX[1]))$, and $mvWy=\max(\text{abs}(dY[0]),\text{abs}(dY[1]))$.

The variable sizeSbXTemp is specified in Table 8-5 according to the value of mvWx.

The variable sizeSbYTemp is specified in Table 8-5 according to the value of mvWy.

The variable sizeSbX is modified as follow: sizeSbX=min (sizeSbX, sizeSbXTemp)

The variable sizeSbY is modified as follow: sizeSbY=min (sizeSbY, sizeSbYTemp)

TABLE 8-5

Specification of sizeSbXTemp for various input values of mvWx

| mvWx | 0 | 1 | 2 | 3 | 4 | >4 |
|---|---|---|---|---|---|---|
| sizeSbX | cbWidth | 32 | 16 | 8 | 8 | 4 |

TABLE 8-5

Specification of sizeSbYTemp for various input values of mvWy

| mvWx | 0 | 1 | 2 | 3 | 4 | >4 |
|---|---|---|---|---|---|---|
| sizeSbY | cbHeight | 32 | 16 | 8 | 8 | 4 |

The variable clipMVX are modified as follows:
The arrays X[i], Y[i] are derived as follows:
X[0]=0
X[1]=(eifSubblockSize+1)*(dX[0]+(1<<9))
X[2]=(eifSubblockSize+1)*dY[0]
X[3]=X[1]+X[2]
Y[0]=0
Y[1]=(eifSubblockSize+1)*dX[1]
Y[2]=(eifSubblockSize+1)*(dY[1]+(1<<9))
Y[3]=Y[1]+Y[2]
The variable Xmax is set equal to maximum of X[i] for i is equal 0 . . . 3
The variable Xmin is set equal to minimum of X[i] for i is equal 0 . . . 3
The variable Ymax is set equal to maximum of Y[i] for i is equal 0 . . . 3
The variable Ymin is set equal to minimum of Y[i] for i is equal 0 . . . 3
The variable W is set equal to (Xmax−Xmin+(1<<9)−1)>>9
The variable H is set equal to (Ymax−Ymin+(1<<9)−1)>>9
If (W+2)*(H+2) is greater than 81, the variable clipMVX is set equal to TRUE
The variables eifCanBeApplied and clipMV are derived as following: clipMV=clipMV0|clipMV1
The variable clipMV equal to TRUE here means that memory bandwidth EIF applicability condition is not met and further mv clipping is needed (step 3.f.iv of the Algorithm 2)

In one example steps 3.f.iv-3.f.v are implemented as follows:

8.5.4.5 Derivation of Clipping Parameters for Affine Motion Vector:

Inputs to this process are: a location (xCb, yCb) in full-sample units, two variables cbWidth and cbHeight specifying the width and the height of the current coding block, horizontal change of motion vector dX, vertical change of motion vector dY, motion vector mvBaseScaled, width of the picture in samples pic_width, height of the picture in samples pic_height, clipMV flag specifying if MV clipping is to be applied.

Outputs of this process are: hor_max, ver_max, hor_min and ver_min that denotes the maximum and minimum allowed motion vector horizontal and vertical components.

The center motion vector mv_center is derived as follows:

$mv\_center[0]=(mvBaseScaled[0]+dX[0]*(cbWidth>>1)+dY[0]*(cbHeight>>1))$ (8-743)

$mv\_center[1]=(mvBaseScaled[1]+dX[1]*(cbWidth>>1)+dY[1]*(cbHeight>>1))$ (8-743)

The rounding process for motion vectors as specified in clause 8.5.3.10 is invoked with mv_center, rightShift set equal to 5, and leftShift set equal to 0 as inputs and the rounded motion vector is return as mv_center.

The motion vector mv_center is clipped as follows:

$mv\_center[0]=\text{Clip3}(-2^{17},2^{17}-1,mv\_center[0])$ (8-686)

$mv\_center[1]=\text{Clip3}(-2^{17},2^{17}-1,mv\_center[1])$ (8-686)

The variables hor_max_pic, ver_max_pic, hor_min_pic and ver_min_pic are derived as follows:

$hor\_max\_pic=(pic\_width+128-xCb-cbWidth)<<4$ (8-743)

$ver\_max\_pic=(pic\_height+128-yCb-cbHeight)<<4$ (8-743)

$hor\_min\_pic=(-128-xCb)<<4$ (8-743)

$ver\_min\_pic=(-128-yCb)<<4$ (8-743)

If clipMV is equal to FALSE, then the output variables hor_max, ver_max, hor_min and ver_min that denotes the maximum and minimum allowed motion vector horizontal and vertical components are derived as following:

$hor\_max=hor\_max\_pic<<5$ (8-743)

$ver\_max=ver\_max\_pic<<5$ (8-743)

$hor\_min=hor\_min\_pic<<5$ (8-743)

$ver\_min=ver\_min\_pic,<<5$ (8-743)

Otherwise if clipMV is equal to TRUE, the following steps are applied:

The variables mv_hor_min, mv_ver_min, mv_hor_max and mv_ver_max are derived as following:

$mv\_hor\_min=mv\_center[0]-deviationMV[\log 2CbWidth-3]$ (8-743)

$mv\_ver\_min=mv\_center[1]-deviationMV[\log 2CbHeight-3]$ (8-743)

$mv\_hor\_max=mv\_center[0]+deviationMV[\log 2CbWidth-3]$ (8-743)

$mv\_ver\_max=mv\_center[1]+deviationMV[\log 2CbHeight-3]$ (8-743)

with array deviationMV specified for k=0 . . . 4 as deviationMV[k]={64, 128, 272, 560, 1136}.

The variables hor_max, ver_max, hor_min and ver_min are derived as following:

$$\text{hor\_max}=\min(\text{hor\_max\_pic}, mv\_\text{hor\_max})<<5 \quad (8\text{-}743)$$

$$\text{ver\_max}=\min(\text{ver\_max\_pic}, mv\_\text{ver\_max})<<5 \quad (8\text{-}743)$$

$$\text{hor\_min}=\max(\text{hor\_min\_pic}, mv\_\text{hor\_min})<<5 \quad (8\text{-}743)$$

$$\text{ver\_min}=\max(\text{ver\_min\_pic}, mv\_\text{ver\_min})<<5 \quad (8\text{-}743)$$

The example 1 of using embodiment 4 in MPEG-5/EVC:

In this example, EIF subblock size is equal to 4×4, maximum number of fetched lines during processing the first line R is equal to 3, dX[0] corresponds to dHorX, dX[1] corresponds to dHorY, dY[0] corresponds to dVerX and dY[1] corresponds to dVerY.

The variables dX[0], dX[1], dY[0], dY[1] are in 1/512 precision.

8.5.3.7 Derivation Process for Motion Vector Arrays from Affine CPMVs:

Inputs to this process are: a luma location (xCb, yCb) of the top-left sample of the current luma coding block relative to the top-left luma sample of the current picture, two variables cbWidth and cbHeight specifying the width and the height of the luma coding block, the number of CPMVs numCpMv, the CPMVs cpMvLX[cpIdx], with cpIdx=0 . . . numCpMv−1 and X being 0 or 1, the prediction list utilization flags predFlagLX, with X being 0 or 1, the reference index refIdxLX and X being 0 or 1.

Outputs of this process are: the number of luma coding subblocks in horizontal direction numSbX and in vertical direction numSbY, the size of luma coding subblocks in horizontal direction sizeSbX and in vertical direction sizeSbY, the luma subblock motion vector array mvLX[xSbIdx][ySbIdx] with xSbIdx=0 . . . numSbX−1, ySbIdx=0 . . . numSbY−1 and X being 0 or 1, the chroma subblock motion vector array mvCLX[xSbIdx][ySbIdx] with xSbIdx=0 . . . numSbX−1, ySbIdx=0 . . . numSbY−1 and X being 0 or 1.

The variables sizeSbX, sizeSbY, numSbX, numSbY, and clipMV flag are derived according to 8.5.3.8.

When predFlagLX is equal to 1, the following applies for X being 0 and 1:

Horizontal change of motion vector dX, vertical change of motion vector dY and base motion vector mvBaseScaled are derived by invoking the process specified in clause 8.5.3.9 with the luma coding block width cbWidth, the luma coding block height cbHeight, number of CPMVs numCpMv and the CPMVs cpMvLX[cpIdx] with cpIdx= 0 . . . numCpMv−1 as inputs.

For $ySbIdx$=0 . . . num$SbY$−1:

For $xSbIdx$=0 . . . num$SbX$−1:

The luma motion vector mvLX[xSbIdx][ySbIdx] is derived as follows:

$$x\text{Pos}Sb=\text{size}SbX*xSbIdx+(\text{size}SbX>>1) \quad (8\text{-}682)$$

$$y\text{Pos}Sb=\text{size}SbY*ySbIdx+(\text{size}SbY>>1) \quad (8\text{-}683)$$

$$mvLX[xSbIdx][ySbIdx][0]=(mv\text{BaseScaled}[0]+dX[0]*x\text{Pos}Sb+dY[0]*y\text{Pos}Sb) \quad (8\text{-}684)$$

$$mvLX[xSbIdx][ySbIdx][1]=(mv\text{BaseScaled}[1]+dX[1]*x\text{Pos}Sb+dY[1]*y\text{Pos}Sb) \quad (8\text{-}685)$$

The rounding process for motion vectors as specified in clause 8.5.3.10 is invoked the with mvX set equal to mvLX[xSbIdx][ySbIdx], rightShift set equal to 5, and leftShift set equal to 0 as inputs and the rounded mvLX[xSbIdx][ySbIdx] as output.

The motion vectors mvLX[xSbIdx][ySbIdx] are clipped as follows:

$$mvLX[xSbIdx][ySbIdx][0]=\text{Clip3}(-2^{17}, 2^{17}-1, mvLX[xSbIdx][ySbIdx][0]) \quad (8\text{-}686)$$

$$mvLX[xSbIdx][ySbIdx][1]=\text{Clip3}(-2^{17}, 2^{17}-1, mvLX[xSbIdx][ySbIdx][1]) \quad (8\text{-}687)$$

The derivation process for chroma motion vectors in clause 8.5.2.14 is invoked with mvLX[xSbIdx][ySbIdx] as input, and the chroma motion vector mvCLX[xSbIdx][ySbIdx] as output.

8.5.3.8 Derivation Process for Affine Subblock Size:

Inputs to this process are: two variables cbWidth and cbHeight specifying the width and the height of the luma coding block, the number of CPMVs numCpMv, the CPMVs cpMvLX[cpIdx], with cpIdx=0 . . . numCpMv−1 and X being 0 or 1, the prediction list utilization flags predFlagLX, with X being 0 or 1.

Outputs of this process are: the size of luma coding subblocks in horizontal direction sizeSbX and in vertical direction sizeSbY, the number of luma coding subblocks in horizontal direction numSbX and in vertical direction numSbY, the flag clipMV indicating motion vector clipping type for blocks processed with EIF. sizeSbX is set equal to cb Width, sizeSbY is set equal to cbHeight.

The variables eifCanBeAppliedX and clipMVX are derived as follows for X being 0 and 1: eifCanBeAppliedX is set to TRUE, and clipMVX is set equal to FALSE.

The variable eifSubblockSize is set equal to 4.

When predFlagLX is equal to 1, the following applies for X being 0 and 1:

Horizontal change of motion vector dX, vertical change of motion vector dY and base motion vector mvBaseScaled are derived by invoking the process specified in clause 8.5.3.9 with the luma coding block width cbWidth, the luma coding block height cbHeight, number of CPMVs numCpMv and the CPMVs cpMvLX[cpIdx] with cpIdx= 0 . . . numCpMv−1 as inputs.

The variable mvWx and mvWy are derived as follows:

$$mvWx=\max(\text{abs}(dX[0]),\text{abs}(dX[1]))$$

$$mvWy=\max(\text{abs}(dY[0]),\text{abs}(dY[1]))$$

The variable sizeSbXTemp is specified in Table 8-5 according to the value of mvWx.

The variable sizeSbYTemp is specified in Table 8-5 according to the value of mvWy.

The variable sizeSbX is modified as follow: sizeSbX=min (sizeSbX, sizeSbXTemp)

The variable sizeSbY is modified as follow: sizeSbY=min (sizeSbY, sizeSbYTemp)

TABLE 8-5

| Specification of sizeSbXTemp for various input values of mvWx | | | | | |
|---|---|---|---|---|---|
| mvWx | 0 | 1 | 2 | 3 | 4 | >4 |
| sizeSbX | cbWidth | 32 | 10 | 8 | 8 | 4 |

TABLE 8-5

| Specification of sizeSbYTemp for various input values of mvWy | | | | | |
|---|---|---|---|---|---|
| mvWx | 0 | 1 | 2 | 3 | 4 | >4 |
| sizeSbY | cbHeight | 32 | 16 | 8 | 8 | 4 |

The variables eifCanBeAppliedX and clipMVX are modified as follows:
The arrays X[i], Y[i] are derived as follows:
X[0]=0
X[1]=(eifSubblockSize+1)*(dX[0]+(1<<9))
X[2]=(eifSubblockSize+1)*dY[0]
X[3]=X[1]+X[2]
Y[0]=0
Y[1]=(eifSubblockSize+1)*dX[1]
Y[2]=(eifSubblockSize+1)*(dY[1]+(1<<9))
Y[3]=Y[1]+Y[2]
The variable Xmax is set equal to maximum of X[i] for i is equal 0 . . . 3
The variable Xmin is set equal to minimum of X[i] for i is equal 0 . . . 3
The variable Ymax is set equal to maximum of Y[i] for i is equal 0 . . . 3
The variable Ymin is set equal to minimum of Y[i] for i is equal 0 . . . 3
The variable W is set equal to (Xmax−Xmin+(1<<9)−1)>>9
The variable H is set equal to (Ymax−Ymin+(1<<9)−1)>>9
If (W+2)*(H+2) is greater than 81, the variable clipMVX is set equal to TRUE
If dY[1] is less than ((−1)<<9), then the variable eifCanBeAppliedX is equal to FALSE
Otherwise,
If(max(0, dY[1])+Abs(dX[1]))*(1+eifSubblockSize) is greater than (1<<9) then the variable eifCanBeAppliedX is equal to FALSE.
The variables eifCanBeApplied and clipMV are derived as following:
eifCanBeApplied=eifCanBeApplied0 & eifCanBeApplied1
clipMV=clipMV0|clipMV1
If eifCanBeApplied is equal to FALSE than the variables sizeSbX and sizeSbY are modified as follows:
sizeSbX=max(8, sizeSbX)
sizeSbY=max(8, sizeSbY)
The number of luma coding subblocks in horizontal direction numSbX and in vertical direction numSbY are derived as follows:
numSbX=cbWidth/sizeSbX
numSbY=cbHeight/sizeSbY 8.5.3.9 Derivation Process for Affine Motion Model Parameters from CPMVs:

Inputs to this process are: two variables cbWidth and cbHeight specifying the width and the height of the luma coding block, the number of CPMVs numCpMv, the CPMVs cpMvLX[cpIdx], with cpIdx=0 . . . numCpMv−1 and X being 0 or 1.

Outputs of this process are: horizontal change of motion vector dX, vertical change of motion vector dY, motion vector mvBaseScaled corresponding to the top left corner of the luma coding block.

The variables log 2CbW (also denoted as log 2CbWidth) and log 2CbH (also denoted as log 2CbHeight) are derived as follows:

$$\log 2CbW = \text{Log } 2(cb\text{Width}) \quad (8\text{-}688)$$

$$\log 2CbH = \text{Log } 2(cb\text{Height}) \quad (8\text{-}689)$$

Horizontal change of motion vector dX is derived as follows:

$$dX[0] = (cpMvLX[1][0] - cpMvLX[0][0]) << (7 - \log 2CbW) \quad (8\text{-}690)$$

$$dx[1] = (cpMvLX[1][1] - cpMvLX[0][1]) << (7 - \log 2CbW) \quad (8\text{-}691)$$

Vertical change of motion vector dY is derived as follows:
If numCpMv is equal to 3, dY is derived as follow:

$$dY[0] = (cpMvLX[2][0] - cpMvLX[0][0]) << (7 - \log 2CbH) \quad (8\text{-}692)$$

$$dY[1] = (cpMvLX[2][1] - cpMvLX[0][1]) << (7 - \log 2CbH) \quad (8\text{-}693)$$

Otherwise (numCpMv is equal to 2), dY is derived as follows:

$$dY[0] = -dx[1] \quad (8\text{-}694)$$

$$dY[1] = dX[0] \quad (8\text{-}695)$$

Motion vector mvBaseScaled corresponding to the top left corner of the luma coding block is derived as follows:

$$mvBaseScaled[0] = cpMvLX[0][0] << 7 \quad (8\text{-}696)$$

$$mvBaseScaled[1] = cpMvLX[0][1] << 7 \quad (8\text{-}697)$$

8.5.4 Decoding Process for Inter Prediction Samples:

Inputs to this process are: a luma location (xCb, yCb) specifying the top-left sample of the current luma coding block relative to the top-left luma sample of the current picture, two variables nCbW and nCbH specifying the width and the height of the current luma coding block, variables numSbX and numSbY specifying the number of luma coding subblocks in horizontal and vertical direction, the luma motion vectors in 1/16 fractional-sample accuracy mvL0[xSbIdx][ySbIdx] with xSbIdx=0 . . . numSbX−1, and ySbIdx=0 . . . numSbY−1, and mvL1[xSbIdx][ySbIdx] with xSbIdx=0 . . . numSbX−1, and ySbIdx=0 . . . numSbY−1 the refined motion vectors refMvL0[xSbIdx][ySbIdx] and refMvL1[xSbIdx][ySbIdx] with xSbIdx=0 . . . numSbX−1, and ySbIdx=0 . . . numSbY−1, the chroma motion vectors in 1/32 fractional-sample accuracy mvCL0[xSbIdx][ySbIdx] with xSbIdx=0 . . . numSbX−1, ySbIdx=0 . . . numSbY−1, and mvCL1[xSbIdx][ySbIdx] with xSbIdx=0 . . . numSbX−1, ySbIdx=0 . . . numSbY−1, the refined chroma motion vectors in 1/32 fractional-sample accuracy refMvCL0[xSbIdx][ySbIdx] with xSbIdx=0 . . . numSbX−1, ySbIdx=0 . . . numSbY−1, and refMvCL1[xSbIdx][ySbIdx] with xSbIdx=0 . . . numSbX−1, ySbIdx=0 . . . numSbY−1, the reference indices refIdxL0 and refIdxL1, the prediction list utilization flags, predFlagL0, and predFlagL1, a variable dmvrAppliedFlag indicating the use of DMVR, the number of CPMVs numCpMv, the CPMVs cpMvL0[cpIdx] with cpIdx=0 . . . numCpMv−1 and cpMvL1[cpIdx] with cpIdx=0 . . . numCpMv−1, clipMV flag specifying motion vector clipping type.

Outputs of this process are: an $(nCbW_L) \times (nCbH_L)$ array predSamples of luma prediction samples, where $nCbW_L$ and $nCbH_L$ are derived as specified below, when ChromaArrayType is not equal to 0, an $(nCbW_C) \times (nCbH_C)$ array preSamplescb of chroma prediction samples for the component Cb, where $nCbW_C$ and $nCbH_C$ are derived as specified below, when ChromaArrayType is not equal to 0, an $(nCbW_C) \times (nCbH_C)$ array predSamplescr of chroma residual samples for the component Cr, where $nCbW_C$ and $nCbH_C$ are derived as specified below.

The variables $nCbW_L$ and $nCbH_L$ are set equal to nCbW and nCbH, respectively, and the variables $nCbW_C$ and $nCbH_C$ are set equal to nCbW/SubWidthC and nCbH/SubHeightC, respectively.

Let predSamplesL0$_L$ and predSamplesL1$_L$ be (nCbW)×(nCbH) arrays of predicted luma sample values and, when ChromaArrayType is not equal to 0, predSampleL0$_{Cb}$, predSampleL1$_{Cb}$, predSampleL0$_{Cr}$, and predSampleL1$_{Cr}$ be (nCbW/SubWidthC)×(nCbH/SubHeightC) arrays of predicted chroma sample values.

For X being each of 0 and 1, when predFlagLX is equal to 1, the following applies:

The reference picture consisting of an ordered two-dimensional array refPicLXL of luma samples and, when ChromaArrayType is not equal to 0, two ordered two-dimensional arrays refPicLX$_{Cb}$ and refPicLX$_{Cr}$ of chroma samples is derived by invoking the process specified in clause 8.5.4.1 with refIdxLX as input.

The width and the height of the current luma coding sublock sbWidth, sbHeight are derived as follows:

$$sbWidth = nCbW/numSbX \quad (8\text{-}701)$$

$$sbHeight = nCbH/numSbY \quad (8\text{-}702)$$

If affine_flag is equal to 1 and one of the variables sbWidth, sbHeight is less than 8, the following applies:

Horizontal change of motion vector dX, vertical change of motion vector dY and base motion vector mvBaseScaled are derived by invoking the process specified in clause 8.5.3.9 with the luma coding block width nCbW, the luma coding block height nCbH, number of CPMVs numCpMv and the CPMVs cpMvLX[cpIdx] with cpIdx=0 . . . numCpMv−1 as inputs.

The array predSamplesLXL is derived by invoking interpolation process for enhanced interpolation filter specified in clause 8.5.4.3 with the luma location (xSb, ySb), the luma coding block width nCbW, the luma coding block height nCbH, horizontal change of motion vector dX, vertical change of motion vector dY, base motion vector mvBaseScaled, the reference array refPicLX$_L$, sample bitDepth bitDepth$_Y$, picture width pic_width_in_luma_samples, height pic_height_in_luma_samples, clipMV flag and flag isLuma equal to TRUE as inputs.

If ChromaArrayType is not equal to 0, the following applies:

The arrays predSamplesLX$_{Cb}$, is derived by invoking iterpolation process for enhanced interpolation filter specified in clause 8.5.4.3 with the luma location (xSb, ySb), the luma coding block width nCbW, the luma coding block height nCbH, horizontal change of motion vector dX, vertical change of motion vector dY, base motion vector mvBaseScaled, the reference array refPicLX$_{Cb}$, sample bitDepth bitDepth$_C$, picture width pic_width_in_luma_samples and height pic_height_in_luma_samples, clipMV flag and flag isLuma equal to FALSE as inputs.

The arrays predSamplesLX$_{Cr}$, is derived by invoking iterpolation process for enhanced interpolation filter specified in clause 8.5.4.3 with the luma location (xSb, ySb), the luma coding block width nCbW, the luma coding block height nCbH, horizontal change of motion vector dX, vertical change of motion vector dY, base motion vector mvBaseScaled, the reference array refPicLX$_{Cr}$, sample bitDepth bitDepth$_C$, picture width pic_width_in_luma_samples and height pic_height_in_luma_samples, clipMV flag and flag isLuma equal to FALSE as inputs.

[ . . . ]

8.5.4.3 Interpolation Process for the Enhanced Interpolation Filter

Inputs to this process are: a location (xCb, yCb) in full-sample units, two variables cb Width and cbHeight specifying the width and the height of the current coding block, horizontal change of motion vector dX, vertical change of motion vector dY, motion vector mvBaseScaled, the selected reference picture sample arrays refPicLX, sample bit depth bitDepth width of the picture in samples pic_width, height of the picture in samples pic_height, clipMV flag specifying if MV clipping is to be applied, isLuma flag specifying whether luma or chroma is processed Outputs of this process are: an (cbWidth)×(cbHeight) array predSamplesLX of prediction sample values.

Interpolation filter coefficients T[p] for each fractional sample position p equal to xFrac or yFrac are specified in Table 8-15.

The variables hor_max, ver_max, hor_min and ver_min are derived by invoking the process specified in 8.5.4.5 with a location (xCb, yCb) in full-sample units, two variables cbWidth and cbHeight specifying the width and the height of the current coding block, horizontal change of motion vector dX, vertical change of motion vector dY, motion vector mvBaseScaled, width of the picture in samples pic_width, height of the picture in samples pic_height and clipMV flag as input, and hor_max, ver_max, hor_min and ver_min as output.

If isLuma is equal to FALSE, the following steps are applied:

$$xCb = xCb/SubWidthC \quad (8\text{-}728)$$

$$yCb = yCb/SubHeigthC \quad (8\text{-}728)$$

$$cbWidth = cbWidth/SubWidthC \quad (8\text{-}728)$$

$$cbHeight = cbHeight/SubHeightC \quad (8\text{-}728)$$

$$mvBaseScaled[0] = mvBaseScaled[0]/SubWidthC \quad (8\text{-}728)$$

$$mvBaseScaled[1] = mvBaseScaled[1]/SubHeightC \quad (8\text{-}728)$$

$$hor\_min = hor\_min/SubWidthC \quad (8\text{-}728)$$

$$hor\_max = hor\_max/SubWidthC \quad (8\text{-}728)$$

$$ver\_min = ver\_min/SubHeightC \quad (8\text{-}728)$$

$$ver\_max = ver\_max/SubHeightC \quad (8\text{-}728)$$

The variables shift0, shift1, offset0 and offset1 are derived as follows:

shift0 is set equal to bitDepth−8, offset0 is equal to 0, and shift1 is set equal to 12−shift0, offset1 is equal to $2^{shift1-1}$.

For x=−1 . . . cbWidth and y=−1 . . . cbHeight, the following applies:

The motion vector mvX is derived as follows:

$$mvX[0] = (mvBaseScaled[0] + dX[0]*x + dY[0]*y) \quad (8\text{-}728)$$

$$mvX[1] = (mvBaseScaled[1] + dX[1]*x + dY[1]*y) \quad (8\text{-}729)$$

$$mvX[0] = \mathrm{Clip3}(hor\_min, hor\_max, mvX[0]) \quad (8\text{-}730)$$

$$mvX[1] = \mathrm{Clip3}(ver\_min, ver\_max, mvX[1]) \quad (8\text{-}731)$$

The variables xInt, yInt, xFrac and yFrac are derived as follows:

$$xInt = xCb + (mvX[0] >> 9) + x \quad (8\text{-}730)$$

$$yInt = yCb + (mvX[1] >> 9) + y \quad (8\text{-}731)$$

$$xFrac = (mvX[0] >> 4)\&31 \quad (8\text{-}732)$$

$$yFrac = (mvX[1] >> 4)\& 31 \quad (8\text{-}733)$$

The variables A and B are derived as follows:

$$A = (refPicLX[xInt][yInt]*T[xFrac][0] + + refPicLX[xInt+1][yInt]*T[xFrac][1] + offset0) >> shift0 \quad (8\text{-}736)$$

$B = (\text{refPic}LX[x \text{ Int}][y \text{ Int}+1]*T[x\text{Frac}][0]+\text{refPic}LX[x \text{ Int}+1][y \text{ Int}+1]*T[x\text{Frac}][1]+\text{offset0})\text{>>shift0}$  (8-737)

The sample value $b_{x,y}$ corresponding to location (x, y) is derived as follows:

$b_{x,y} = (A*T[y\text{Frac}][0]+B*T[y\text{Frac}][1]+\text{offset1})\text{>>shift1}$  (8-740)

The enhancement interpolation filter coefficients eF[ ] are specified as {−1, 10, −1}.

The variables shift2, shift3, offset2 and offset3 are derived as follows:

shift2 is set equal to max(bit_depth−11, 0), offset2 is equal to $2^{shift2-1}$, shift3 is set equal to (6−max(bit_depth−11, 0)), offset3 is equal to $2^{shift3-1}$, For x=0 . . . cbWidth−1 and y=−1 . . . cbHeight, the following applies:

$h_{x,y} = (eF[0]*b_{x-1,y}+eF[1]*b_{x,y}+eF[2]*b_{x+1,y}+\text{offset2})\text{>>shift2}$  (8-741)

For x=0 . . . cbWidth−1 and y=0 . . . cbHeight−1, the following applies:

$\text{predSamples}LX_L[x][y] = \text{Clip3}(0,(1\text{<<bitDepth})-1,(eF[0]*h_{x,y-1}+eF[1]*h_{x,y}+eF[2]*h_{x,y+1}+\text{offset3})\text{>>shift3})$  (8-742)

TABLE 8-15

Specification of the interpolation filter coefficients T[p] for each fractional sample position p

| Fractional sample position p | Interpolation filter coefficients | |
| --- | --- | --- |
| | T[p][0] | T[p][1] |
| 0 | 64 | 0 |
| 1 | 62 | 2 |
| 2 | 60 | 4 |
| 3 | 58 | 6 |
| 4 | 56 | 8 |
| 5 | 54 | 10 |
| 6 | 52 | 12 |
| 7 | 50 | 14 |
| 8 | 48 | 16 |
| 9 | 46 | 18 |
| 10 | 44 | 20 |
| 11 | 42 | 22 |
| 12 | 40 | 24 |
| 13 | 38 | 26 |
| 14 | 36 | 28 |
| 15 | 34 | 30 |
| 16 | 32 | 32 |
| 17 | 30 | 34 |
| 18 | 28 | 36 |
| 19 | 26 | 38 |
| 20 | 24 | 40 |
| 21 | 22 | 42 |
| 22 | 20 | 44 |
| 23 | 18 | 46 |
| 24 | 16 | 48 |
| 25 | 14 | 50 |
| 26 | 12 | 52 |
| 27 | 10 | 54 |
| 28 | 8 | 56 |
| 29 | 6 | 58 |
| 30 | 4 | 60 |
| 31 | 2 | 62 |

8.5.4.5 Derivation of Clipping Parameters for Affine Motion Vector:

Inputs to this process are: a location (xCb, yCb) in full-sample units, two variables cbWidth and cbHeight specifying the width and the height of the current coding block, horizontal change of motion vector dX, vertical change of motion vector dY, motion vector mvBaseScaled, width of the picture in samples pic_width, height of the picture in samples pic_height, clipMV flag specifying if MV clipping is to be applied.

Outputs of this process are: hor_max, ver_max, hor_min and ver_min that denotes the maximum and minimum allowed motion vector horizontal and vertical components.

The center motion vector mv_center is derived as follows:

$mv\_center[0] = (mv\text{BaseScaled}[0]+dX[0]*(cb\text{Width>>}1)+dY[0]*(cb\text{Height>>}1))$  (8-743)

$mv\_center[1] = (mv\text{BaseScaled}[1]+dX[1]*(cb\text{Width>>}1)+dY[1]*(cb\text{Height>>}1))$  (8-743)

The rounding process for motion vectors as specified in clause 8.5.3.10 is invoked with mv_center, rightShift set equal to 5, and leftShift set equal to 0 as inputs and the rounded motion vector is return as mv_center.

The motion vector mv_center is clipped as follows:

$mv\_center[0] = \text{Clip3}(-2^{17}, 2^{17}-1, mv\_center[0])$  (8-686)

$mv\_center[1] = \text{Clip3}(-2^{17}, 2^{17}-1, mv\_center[1])$  (8-686)

The variables hor_max_pic, ver_max_pic, hor_min_pic and ver_min_pic are derived as follows:

$\text{hor\_max\_pic} = (\text{pic\_width}+128-xCb-cb\text{Width})\text{<<}4$  (8-743)

$\text{ver\_max\_pic} = (\text{pic\_height}+128-yCb-cb\text{Height})\text{<<}4$  (8-743)

$\text{hor\_min\_pic} = (-128-xCb)\text{<<}4$  (8-743)

$\text{ver\_min\_pic} = (-128-yCb)\text{<<}4$  (8-743)

If clipMV is equal to FALSE, then the output variables hor_max, ver_max, hor_min and ver_min that denotes the maximum and minimum allowed motion vector horizontal and vertical components are derived as following:

$\text{hor\_max} = \text{hor\_max\_pic}\text{<<}5$  (8-743)

$\text{ver\_max} = \text{ver\_max\_pic}\text{<<}5$  (8-743)

$\text{hor\_min} = \text{hor\_min\_pic}\text{<<}5$  (8-743)

$\text{ver\_min} = \text{ver\_min\_pic},\text{<<}5$  (8-743)

Otherwise if clipMV is equal to TRUE, the following steps are applied:

The variables mv_hor_min, mv_ver_min, mv_hor_max and mv_ver_max are derived as following:

$mv\_hor\_min = mv\_center[0] - \text{deviation}MV[\log 2Cb\text{Width}-3]$  (8-743)

$mv\_ver\_min = mv\_center[1] - \text{deviation}MV[\log 2Cb\text{Height}-3]$  (8-743)

$mv\_hor\_max = mv\_center[0] + \text{deviation}MV[\log 2Cb\text{Width}-3]$  (8-743)

$mv\_ver\_max = mv\_center[1] + \text{deviation}MV[\log 2Cb\text{Height}-3]$  (8-743)

with array deviationMV specified for k=0 . . . 4 as deviationMV[k]={64, 128, 272, 560, 1136}.

The variables hor_max, ver_max, hor_min and ver_min are derived as following:

$\text{hor\_max} = \min(\text{hor\_max\_pic}, mv\_hor\_max)\text{<<}5$  (8-743)

$\text{ver\_max} = \min(\text{ver\_max\_pic}, mv\_ver\_max)\text{<<}5$  (8-743)

$\text{hor\_min} = \max(\text{hor\_min\_pic}, mv\_hor\_min)\text{<<}5$  (8-743)

$\text{ver\_min} = \max(\text{ver\_min\_pic}, mv\_ver\_min)\text{<<}5$  (8-743)

Related to the above-described embodiments and examples, in the condition "If (W+2)*(H+2) is greater than 81, the variable clipMV is set equal to TRUE", the value of 81 may be replaced by 72.

Following is an explanation of the applications of the encoding method as well as the decoding method as shown in the above-mentioned embodiments, and a system using them.

Figure 10:
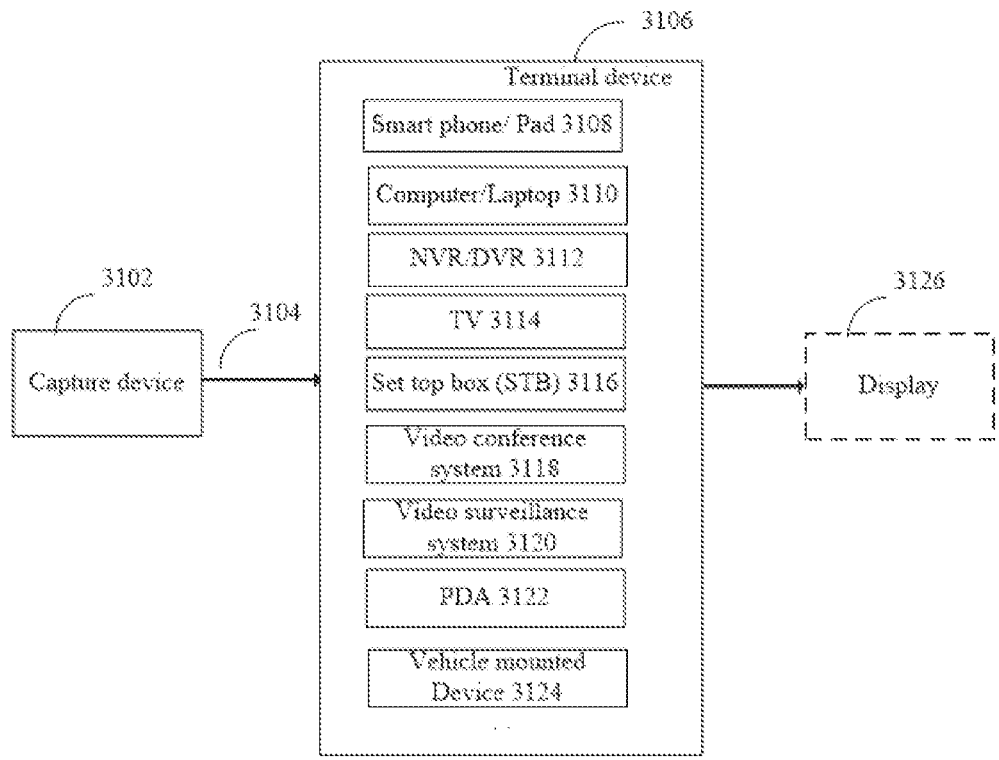
FIG. 10 is a block diagram showing an example structure of a content supply system 3100 which realizes a content delivery service.

FIG. 10 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 11:
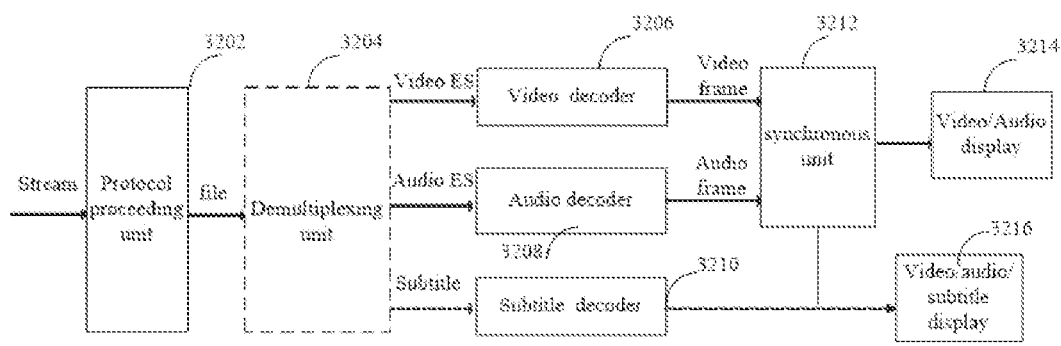
FIG. 11 is a block diagram showing a structure of an example of a terminal device.

FIG. 11 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optional subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 11) before feeding it to the synchronous unit 3212. Similarly, the audio frame may store in a buffer (not shown in FIG. 11) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Figure 12:
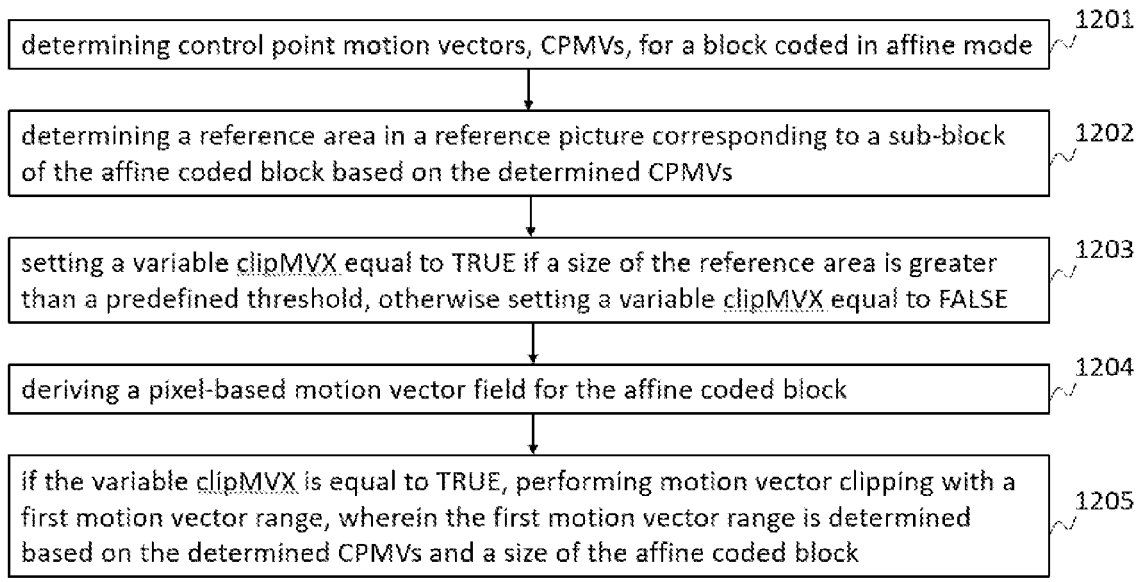
FIG. 12 is a block diagram illustrating the method according to the first aspect of the present disclosure.

FIG. 12 is a block diagram illustrating the method according to the first aspect of the present disclosure. The method of the first aspect includes the following steps.

1201: Determining CPMVs for a block coded in affine mode.

1202: Determining a reference area in a reference picture corresponding to a sub-block of the affine coded block based on the determined CPMVs.

1203: Setting a variable clipMVX equal to TRUE if a size of the reference area is greater than a predefined threshold, otherwise setting a variable clipMVX equal to FALSE.

1204: Deriving a pixel-based motion vector field for the affine coded block.

1205: If the variable clipMVX is equal to TRUE, performing motion vector clipping with a first motion vector range, wherein the first motion vector range is determined based on the determined CPMVs and a size of the affine coded block.

The CPMVs can, for example, be identified in FIG. 9 as the vectors at the corners of the sub-block defined by the unprimed points to the corresponding corners of the reference area having the primed points.

With reference to the above description of the embodiments, in the condition "If (W+2)*(H+2) is greater than 81, the variable clipMV is set equal to TRUE", the values of 81 or 72 correspond to the predefined threshold of the size of the reference area.

An advantage of this method is, for example, that Enhanced Interpolation Filtering, EIF, can still be used even if the memory bandwidth threshold is exceeding, due to including MV clipping, instead of not using EIF at all, see also below.

The first motion vector range may be determined by determining a motion vector for a central point of the affine coded block, determining a second motion vector range based on the motion vector for the central point of the affine coded block and predefined offsets for a respective block size, the block size comprising the size of the affine coded block. Determining the motion vector for the central point of the affine coded block can performed by the following equations (see description above):

$$mv\_center[0]=(mvBaseScaled[0]+dX[0]*(cbWidth>>1)+dY[0]*(cbHeight>>1))$$

$$mv\_center[1]=(mvBaseScaled[1]+dX[1]*(cbWidth>>1)+dY[1]*(cbHeight>>1)),$$

wherein mvBaseScaled represents the motion vector of the top left corner of the block, cbWidth and cbHeight represents the width and height of the block, respectively, dX[0], dX[1] represents the respective differences of the horizontal and vertical parts of the motion vector per one sample in horizontal direction, and dY[0], dY[1] represents the respective differences of the horizontal and vertical parts of the motion vector per one sample in vertical direction, and mv_center [0] and mv_center [1] represent horizontal and vertical parts of the motion vector for the central point, respectively.

The determining a second motion vector range based on the motion vector for the central point of the affine coded block and the predefined offsets for a respective block size may be performed by using the following equations:

$$mv\_hor\_min=mv\_center[0]-deviationMV[\log 2CbWidth-3]$$

$$mv\_ver\_min=mv\_center[1]-deviationMV[\log 2CbHeight-3]$$

$$mv\_hor\_max=mv\_center[0]+deviationMV[\log 2CbWidth-3]$$

$$mv\_ver\_max=mv\_center[1]+deviationMV[\log 2CbHeight-3]$$

wherein deviationMV[ ] represents a table of the offsets predefined for a respective block size, and mv_hor_min, mv_ver_min, mv_hor_max and mv_ver_max represent the second motion vector range. The offsets predefined for respective block sizes may be proportional to {64, 128, 272, 560, 1136}, wherein 64 corresponds to the block size having corresponding dimension equal to 8, 128 corresponds to the block size having corresponding dimension equal to 16, 272 corresponds to the block size having corresponding dimension equal to 32, 560 corresponds to the block size having corresponding dimension equal to 64, or 1136 corresponds to the block size having corresponding dimension equal to 128.

The first motion vector range may be scaled according to subsampling parameters SubWidthC and SubHeightC:

$$hor\_min=hor\_min/SubWidthC$$

$$hor\_max=hor\_max/SubWidthC$$

$$ver\_min=ver\_min/SubHeightC$$

$$ver\_max=ver\_max/SubHeightC$$

wherein hor_min, ver_min, hor_max and ver_max represent the scaled first motion vector range.

The method may further comprise the steps of obtaining interpolated samples in a reference picture based on the derived motion vector field using bilinear interpolation, and applying a high-pass filter to the interpolated samples. Accordingly, the method is advantageously applicable to affine motion compensation using enhanced interpolation filter (EIF). See also the above comments in this regard.

The sub-block of the affine coded block may have a size 4×4. The predefined threshold may be 72.

In case that the affine inter-prediction comprises bi-prediction, the setting a variable clipMVX may comprises deriving the variable clipMV0 for list 0, deriving the variable clipMV1 for list 1, and deriving the variable clipMV as clipMV0|clipMV1, wherein "|" means OR.

Figure 13:
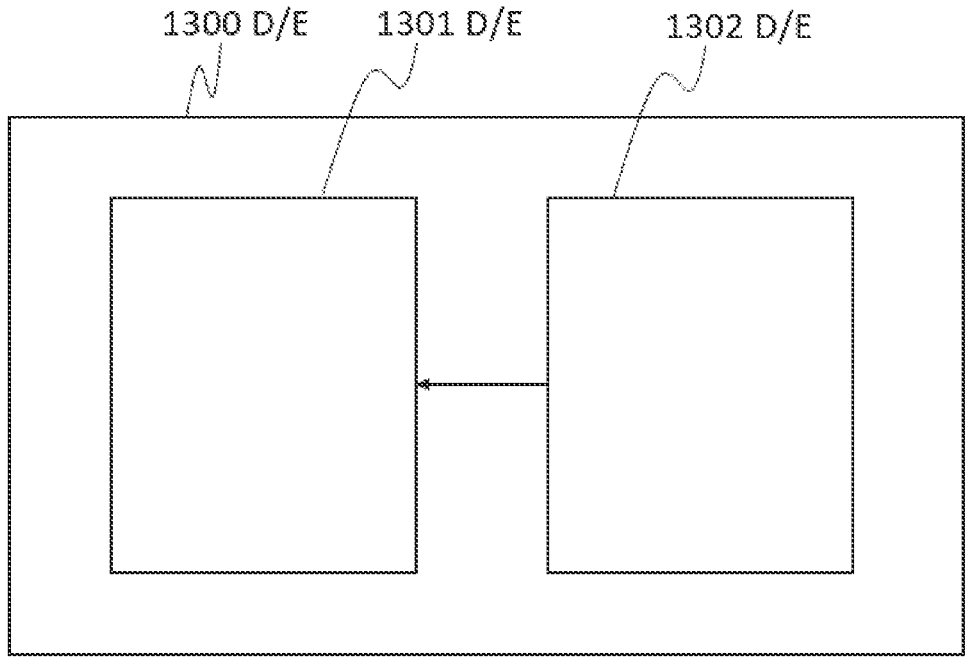
FIG. 13 is a block diagram illustrating the decoder and encoder according to the fifth and sixth aspect of the present disclosure.

FIG. 13 is a block diagram illustrating the decoder 1300 D and encoder 1300 E according to the fifth and sixth aspect of the present disclosure.

The decoder 1300 D according to a fifth aspect comprises one or more processors 1301 D, and a non-transitory computer-readable storage medium 1302 D coupled to the one or more processors 1301 D and storing instructions for execution by the one or more processors 1301 D, wherein the instructions, when executed by the one or more processors, configure the decoder 1300 D to carry out the method according to the first aspect of the present disclosure or any implementation form thereof.

The encoder 1300 E according to the sixth aspect comprises one or more processors 1301 E, and a non-transitory computer-readable storage medium 1302 E coupled to the one or more processors 1301 E and storing instructions for execution by the one or more processors 1301 E, wherein the instructions, when executed by the one or more processors, configure the encoder 1300 E to carry out the method according to the first aspect of the present disclosure or any implementation form thereof.

Figure 14:
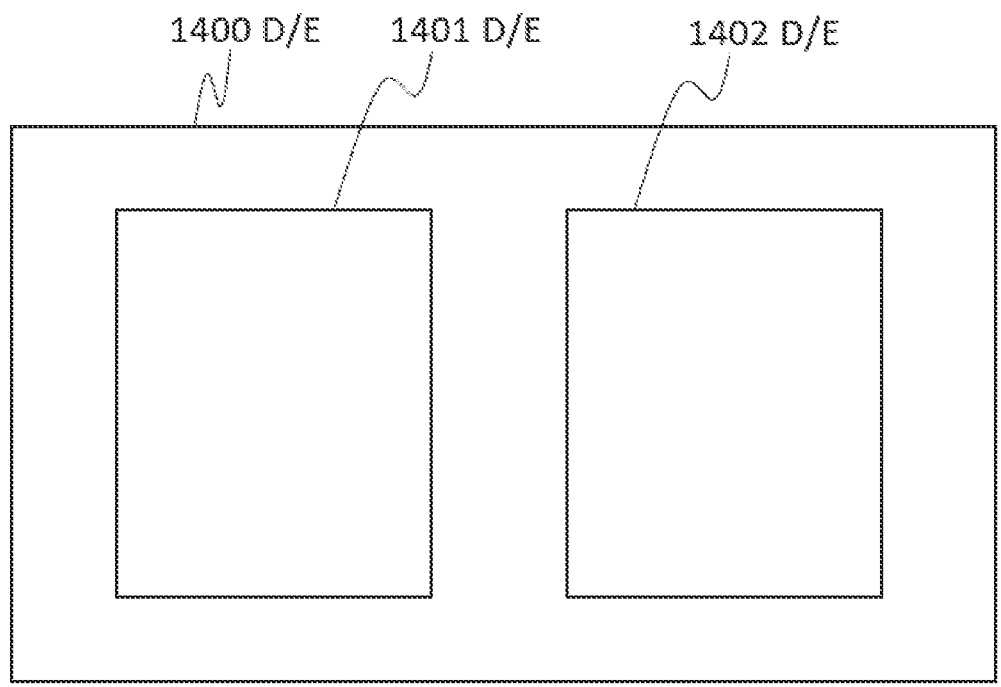
FIG. 14 is a block diagram illustrating the decoder and encoder according to the eighth aspect of the present disclosure.

FIG. 14 is a block diagram illustrating the decoder 1400 D and encoder 1400 E according to the eighth aspect of the present disclosure.

The decoder 1400 D or the encoder 1400 E for coding a video sequence comprise a determining unit 1401 D/E configured determine CPMVs for a affine coded block coded in affine mode and to determine a reference area in a reference picture corresponding to a sub-block of the affine coded block based on the determined CPMVs, and a predicting unit 1402 D/E configured to set a variable clipMVX equal to TRUE if a size of the reference area is greater than the predefined threshold, otherwise set a variable clipMVX equal to FALSE, derive a pixel-based motion vector field for the affine coded block, wherein, if variable clipMVX is equal to TRUE, deriving the pixel-based motion vector field further comprises motion vector clipping based on a first clipping range, wherein the first clipping range is determined based on the determined CPMVs and a size of the affine coded block.

The present disclosure provides the following further examples:

1. A method of coding implemented by a decoding/encoding device for coding video data, comprising calculating optimal subblock size M×N based on affine motion model parameters, when both optimal subblock width M and optimal subblock height N are greater than or equal to a predefined value, performing subblock motion compensation with M×N subblock. when neither optimal subblock width M nor optimal subblock height N is greater than or equal to the predefined value, checking Enhanced bi-linear Interpolation Filter (EIF) applicability conditions.

2. The method of example 1, wherein the predefined value is 8.

3. The method of example 1 or 2, wherein when all EIF applicability conditions are met, the method further comprises performing EIF motion compensation.

4. The method of example 1 or 2, wherein when one of EIF applicability conditions is not met, the method further comprises calculating a first motion vector range that provides fulfilment of conditions that were not met, and clipping motion vectors calculated according to affine model so that these vectors are in first motion vector range.

5. The method of any one of examples 1-4, wherein if at least one of abovementioned conditions not met, the method further comprises setting M=max(M, 8), N=max(N, 8) and perform subblock motion compensation with M×N subblock 6. The method of any one of examples 1-5, wherein the EIF applicability conditions comprises at least one of memory bandwidth restrictions, the internal buffer is limited by R lines, where R is predefined value, memory access is sequential, no more than one additional line can be fetched for all lines of the current block except for the first, the inequalities for affine motion model parameters.

7. The method of example 6, wherein the inequalities for affine motion model parameters, are as follows:

$$\begin{cases} a \leq dHorX \leq b \\ c \leq dHorY \leq d \\ e \leq dVerX \leq f \\ g \leq dVerY \leq h \end{cases},$$

where a, b, c, d, e, f, g, h are predefined values or plus/minus infinity.

$$\begin{cases} dHorX \leq a * dVerX \\ dVerY \leq b * dHorY \end{cases},$$

where a and b are predefined values.

8. A method of coding implemented by a decoding/encoding device for coding video data, comprising calculating optimal subblock size M×N based on affine motion model parameters, if both optimal subblock width M and optimal subblock height N are greater or equal than 8, performing subblock motion compensation with M×N subblock. otherwise, check EIF applicability conditions:

EIF applicability condition 1: The internal buffer is limited by R lines, where R is predefined value and can be for example 3, 4, 5 or more. This means that during processing of one line (one row) of the current block (subblock) no more than R lines from the reference picture can be used.

EIF applicability condition 2: Memory access should be sequential, which means that if for $i_{th}$ line of current block $j_{th}$ line of the reference picture is fetched, then for $(i+1)_{th}$ line of the current block only lines j+1, j+2, . . . can be fetched.

EIF applicability condition 3: No more than one additional line can be fetched for all lines of the current block except for the first.

. . .

EIF applicability condition P:

If all EIF applicability conditions are met, then perform EIF motion compensation. EIF motion compensation process comprise:

Check EIF applicability condition P+1: Checking memory bandwidth restrictions.

. . .

Check EIF applicability condition P+K:

If one of EIF applicability conditions P+1 . . . P+K are not met, then calculate first motion vector range that provide fulfilment of conditions that were not met.

Clip motion vectors calculated according to affine model to guarantee, that these vectors are in first motion vector range.

Otherwise, set M'=max(M, 8), N'=max(N, 8) and perform subblock motion compensation with M×N subblock.

9. A method of coding implemented by a decoding/encoding device for coding video data, comprising: calculating optimal subblock size M×N based on affine motion model parameters, if both optimal subblock width M and optimal subblock height N are greater or equal than 8, performing subblock motion compensation with M×N subblock. otherwise, check EIF applicability conditions:

EIF applicability condition 1: The internal buffer is limited by R lines, where R is predefined value and can be for example 3, 4, 5 or more. This means that during processing of one line (one row) of the current block (subblock) no more than R lines from the reference picture can be used.

EIF applicability condition 2: Memory access should be sequential, which means that if for $i_{th}$ line of current block $j_{th}$ line of the reference picture is fetched, then for $(i+1)_{th}$ line of the current block only lines j+1, j+2, . . . can be fetched.

EIF applicability condition 3: No more than one additional line can be fetched for all lines of the current block except for the first.

. . .

EIF applicability condition P

If all EIF applicability conditions are met, then perform EIF motion compensation. EIF motion compensation process comprise:

Check EIF applicability condition P+1: Checking memory bandwidth restrictions.

. . .

Check EIF applicability condition P+K

If one of EIF applicability conditions P+1 . . . P+K are not met, then calculate the first motion vector range that provide fulfilment of conditions that were not met and set the second motion vector range equal to the first motion vector range.

Otherwise, calculate third motion vector range and set the second motion vector range equal to the third motion vector range Clip motion vectors calculated according to affine model to guarantee, that these vectors are in the second motion vector range Otherwise set M'=max(M, 8), N'=max(N, 8) and perform subblock motion compensation with M×N subblock.

10. The method of example 9, wherein checking memory bandwidth restrictions comprises calculation of MVs of the corner points of the affine block.

11. The method of any of examples 9-10, wherein checking memory bandwidth restrictions comprises calculation of the area of the bounding box comprising 4 points which are pointed to by MVs of the corner points of the affine block.

12. The method of example 11, wherein the bounding box comprising 4 points which are pointed to by MVs of the corner points of the affine block is the square area with size (W+D1)×(H+D2), where W×H is size of minimal square area (area with minimal area value) comprising 4 points which are pointed to by MVs of the corner points of the affine block and D1 and D2 are integer non-negative numbers.

13. The method of any of examples 9-12 wherein calculate the first motion vector range that provide fulfilment of conditions that were not met comprises calculation of MV for central point of the affine block.

14. The method of any of examples 9-13 wherein calculate the first motion vector range that provide fulfilment of conditions, that were not met, comprise calculation of motion vector spread based on affine block size.

15. The method of example 14 wherein motion vector spread is calculated based on integer numbers predefined for each possible block width and for each possible block height.

16. The method of any of examples 9-15, wherein third motion vector range is calculated in order to guarantee that MVs point to the area inside the reference picture with a margin.

17. The method of example 16, wherein the margin depends on maximum CTU size.

18. The method of any of examples 8-17, wherein N is equal to 3 that means that the algorithm above will not have steps d-e.

19. The method of any of examples 8-17, wherein K is equal to 1 that means that the algorithm above will not have steps f.ii-f.iii.

20. A method of coding implemented by a decoding/encoding device for coding video data, comprising calculating optimal subblock size M×N based on affine motion model parameters, when both optimal subblock width M and optimal subblock height N are greater or equal than 8, performing subblock motion compensation with M×N subblock, Otherwise, check EIF applicability conditions:

EIF applicability condition 1
EIF applicability condition 2
. . .
EIF applicability condition P If all EIF applicability conditions are met, then perform EIF motion compensation. EIF motion compensation process comprise:

Check EIF applicability condition P+1
Check EIF applicability condition P+2
. . .
Check EIF applicability condition P+K If one of EIF applicability conditions P+1 . . . P+K are not met, then calculate first motion vector range that provide fulfilment of conditions that were not met, clip motion vectors calculated according to affine model to guarantee, that these vectors are in first motion vector range.

Otherwise set M'=max(M, 8), N'=max(N, 8) and perform subblock motion compensation with M×N subblock.

21. The method of example 20, wherein N is equal to zero that means that the algorithm will not have steps a)-d).

22. The method of example 20, wherein K is equal to zero that means that the algorithm will not have steps e).i-e).v.

23. The method of any one of examples 20-22, wherein the EIF applicability conditions comprises at least one of: memory bandwidth restrictions, the internal buffer is limited by R lines, where R is predefined value, memory access is sequential, no more than one additional line can be fetched for all lines of the current block except for the first, the inequalities for affine motion model parameters.

24. The method of example 23, wherein the inequalities for affine motion model parameters, are as follows:

$$\begin{cases} a \le dHorX \le b \\ c \le dHorY \le d \\ e \le dVerX \le f \\ g \le dVerY \le h \end{cases},$$

where a, b, c, d, e, f, g, h are predefined values or plus/minus infinity.

$$\begin{cases} dHorX \le a*dVerX \\ dVerY \le b*dHorY \end{cases},$$

where a and b are predefined values.

25. A method of coding implemented by a decoding/encoding device for coding video data, comprising calculating a subblock size M×N based on affine motion model parameters or based on information from which the affine motion model parameters can be derived, in the case that either a subblock width M or a subblock height N is smaller than or equal to a predefined value, performing EIF motion compensation process, wherein the performing EIF motion compensation process comprises deriving a motion vector of a respective subblock of an image block (such as an affine image block) based on the affine motion model parameters on a P×Q (such as 1×1) subblock basis, and performing clipping on the motion vector of the subblock, so that the clipped motion vector is in a motion vector range (such as a second motion vector range).

26. The method of example 25, wherein in the case that either a subblock width M or a subblock height N is smaller than or equal to a predefined value, the method further comprises determining whether a first set of EIF applicability conditions is met, wherein the performing EIF motion compensation process, comprises, if the first set of EIF applicability conditions is met, performing the EIF motion compensation process.

27. The method of example 25 or 26, wherein the motion vector range is set as a first motion vector range, or the motion vector range is set as a third motion vector range.

28. The method of example 27, wherein the motion vector range is set as the third motion vector range if a second set of EIF applicability conditions is met, Otherwise, the motion vector range is set as the first motion vector range.

29. The method of any one of the preceding examples, wherein the method further comprises, if any one of the first set of EIF applicability conditions is not met, performing, based on affine motion model parameters, subblock motion compensation on a M'×N' subblock basis, wherein M'=max (M, 8), N'=max(N, 8).

30. The method of any one of the preceding examples, wherein the method further comprises, when both the subblock width M and subblock height N are greater than or equal to a predefined value (such as 8), performing subblock motion compensation based on affine motion model parameters on a M×N subblock basis.

31. The method of any one of the preceding examples, wherein the performing EIF motion compensation process further comprises performing motion compensation of each subblock based on the clipped motion vector.

32. The method of any one of the preceding examples, wherein the step of calculating a subblock size M×N, comprises deriving the subblock size M×N based on motion vector differences of one or more affine control points of the affine image block and the width and height of the affine image block, or obtaining the subblock size M×N using a looking up table according to one or more of motion vector differences of one or more affine control points of the affine image block, a block size of the affine image block (such as, the width and/or height of the affine image block), and predefined motion vector precision.

33. The method of any one of the preceding examples, wherein the first set of EIF applicability conditions comprises at least one of memory bandwidth restrictions, the internal buffer is limited by R lines, where R is predefined value, memory access is sequential, no more than one additional line can be fetched for all lines of the current block except for the first, the inequalities for affine motion model parameters.

34. The method of any one of the preceding examples, wherein subblock size P×Q is equal to 1×1.

35. The method of any of examples 26-34, wherein the first set of EIF applicability conditions comprises the internal buffer is limited by R lines, where R is predefined value, memory access is sequential no more than one additional line can be fetched for all lines of the current block except for the first.

36. The method of any of examples 28-35, wherein the second set of EIF applicability conditions comprise memory bandwidth restrictions.

37. The method of example 36, wherein checking memory bandwidth restrictions comprises calculation MVs of the corner points (e.g. controlling points) of the affine block.

38. The method of any of example 37, wherein checking memory bandwidth restrictions further comprises calculation of the area of the bounding box comprising 4 points which are pointed to by MVs of the corner points of the affine block.

39. The method of example 38, wherein the bounding box comprising 4 points which are pointed to by MVs of the corner points of the affine block is the square area with size (W+D1)×(H+D2), where W×H is a size of minimal square area (such as, an area with a minimal area value) comprising 4 points which are pointed to by MVs of the corner points of the affine block and D1 and D2 are integer non-negative numbers.

40. The method of any of examples 38-39, wherein the checking memory bandwidth restrictions further comprises calculation threshold T1 based on the affine block size W×H and a predefined threshold T, comparison of the value of the calculated area of the bounding box with the threshold T1.

41. The method of example 40, wherein the calculation threshold T1 based on the affine block size W×H and a predefined threshold T is performed as T1=W*H*T.

42. The method of any of examples 40-41, wherein memory bandwidth restrictions are considered as met if the value of the calculated area of the bounding box is less than or equal to the threshold T1.

43. The method of any of examples 27-42 wherein calculation of the first motion vector range comprises calculation of MV for central point of the affine block.

44. The method of example 43, wherein the calculation of the first motion vector range further comprise calculation of motion vector spread based on the affine block size (e.g. the affine block size W×H).

45. The method of example 44, wherein the motion vector spread is calculated based on integer numbers predefined for each possible block width and for each possible block height.

46. The method of any of examples 27-45, wherein the third motion vector range is calculated in order to guarantee that MVs point to the area inside the reference picture with a margin, wherein the margin is an extended area surrounding the reference picture.

47. The method of example 46, wherein the margin depends on a maximum CTU size.

48. The method of any of preceding examples, wherein the deriving a motion vector of a respective subblock of an image block depends on color plane (such as luma or chroma) processed by the EIF.

49. The method of any of preceding examples, wherein the determining whether the first set of EIF applicability conditions is met comprise determining whether a part or a whole of the first set of EIF applicability conditions is met for the affine motion parameters obtained from CPMVs associated with the first reference picture list (such as list0), and/or determining whether a part or a whole of the first set of EIF applicability conditions is met for the affine motion parameters obtained from CPMVs associated with the second reference picture list (such as list1).

50. The method of any of preceding examples, wherein the determining whether the first set of EIF applicability conditions is met comprises considering the first set of EIF applicability conditions as met if a part or a whole of the first set of EIF applicability conditions is met for affine motion parameters obtained from CPMVs associated with the first reference picture list (such as list0) and if a part or a whole of the first set of EIF applicability conditions is met for affine motion parameters obtained from CPMVs associated with the second reference picture list (such as list1).

51. The method of any of preceding examples, wherein determining whether the second set of EIF applicability conditions is met comprise determining whether a part or a whole of a second set of EIF applicability conditions is met for affine motion parameters obtained from CPMVs associated with the first reference picture list (such as list0), and/or determining whether a part or a whole of a second set of EIF applicability conditions is met for affine motion parameters obtained from CPMVs associated with the second reference picture list (such as list1).

52. The method of any of preceding examples,, wherein determining whether the second set of EIF applicability conditions is met comprise considering the second set of EIF applicability conditions as met if a part or a whole of a second set of EIF applicability conditions is met for affine motion parameters obtained from CPMVs associated with the first reference picture list (such as list0) and if a part or a whole of a second set of EIF applicability conditions is met for affine motion parameters obtained from CPMVs associated with the second reference picture list (such as list1).

53. An encoder (20) comprising processing circuitry for carrying out the method according to any one of examples 1 to 52.

54. A decoder (30) comprising processing circuitry for carrying out the method according to any one of examples 1 to 52

55. A computer program product comprising program code for performing the method according to any one of the preceding examples when executed on a computer or a processor.

56. A decoder, comprising one or more processors, and a non-transitory computer-readable storage medium coupled to the processors and storing programming for execution by the processors, wherein the programming, when executed by the processors, configures the decoder to carry out the method according to any one of the preceding examples.

57. An encoder, comprising one or more processors, and a non-transitory computer-readable storage medium coupled to the processors and storing programming for execution by the processors, wherein the programming, when executed by the processors, configures the encoder to carry out the method according to any one of the preceding examples.

58. A non-transitory computer-readable medium carrying a program code which, when executed by a computer device, causes the computer device to perform the method of any one of the preceding examples.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

x % y Modulus. Remainder of x divided by y, defined only for integers x and y with x>=0 and y>0.

Logical Operators:

The following logical operators are defined as follows:
x && y Boolean logical "and" of x and y
x || y Boolean logical "or" of x and y
! Boolean logical "not"
x ? y:z If x is TRUE or not equal to 0, evaluates to the value of y, otherwise, evaluates to the value of z.

Relational Operators:

The following relational operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators:

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:
= Assignment operator
++ Increment, i.e., x++ is equivalent to x=x+1, when used in an array index, evaluates to the value of the variable prior to the increment operation.
-- Decrement, i.e., x-- is equivalent to x=x-1, when used in an array index, evaluates to the value of the variable prior to the decrement operation.
+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation:

The following notation is used to specify a range of values:

x=y . . . zx takes on integer values starting from y to z, inclusive, with x, y, and z being integer numbers and z being greater than y.

Mathematical Functions:

The following mathematical functions are defined:

$$\text{Abs}(x) = \begin{cases} x & ; \quad x >= 0 \\ -x & ; \quad x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$\text{Atan2}(y, x) = \begin{cases} \text{Atan}\left(\frac{y}{x}\right) & ; \quad x > 0 \\ \text{Atan}\left(\frac{y}{x}\right) + \pi & ; \quad x < 0 \,\&\&\, y >= 0 \\ \text{Atan}\left(\frac{y}{x}\right) - \pi & ; \quad x < 0 \,\&\&\, y < 0 \\ +\frac{\pi}{2} & ; \quad x == 0 \,\&\&\, y >= 0 \\ -\frac{\pi}{2} & ; \quad \text{otherwise} \end{cases}$$

Ceil(x) the smallest integer greater than or equal to x.

$\text{Clip1}_Y(x) = \text{Clip3}(0, (1 \ll \text{BitDepth}_Y) - 1, x)$ $\text{Clip1}_C(x) = \text{Clip3}(0, (1 \ll \text{BitDepth}_C) - 1, x)$ $$\text{Clip3}(x, y, z) = \begin{cases} x & ; \quad z < x \\ y & ; \quad z > y \\ z & ; \quad \text{otherwise} \end{cases}$$

Cos(x) the trigonometric cosine function operating on an argument x in units of radians.

Floor(x) the largest integer less than or equal to X.

$$\text{GetCurrMsb}(a, b, c, d) = \begin{cases} c+d & ; \quad b-a >= d/2 \\ c-d & ; \quad a-b > d/2 \\ c & ; \quad \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\text{Min}(x, y) = \begin{cases} x & ; \quad x <= y \\ y & ; \quad x > y \end{cases}$$

$$\text{Max}(x, y) = \begin{cases} x & ; \quad x >= y \\ y & ; \quad x < y \end{cases}$$

Round(x)=Sign(x)*Floor(Abs(x)+0.5)

$$\text{Sign}(x) = \begin{cases} 1 & ; \quad x > 0 \\ 0 & ; \quad x == 0 \\ -1 & ; \quad x < 0 \end{cases}$$

Sin(x) the trigonometric sine function operating on an argument x in units of radians $\text{Sqrt}(x) = \sqrt{x}$ $\text{Swap}(x, y) = (y, x)$ Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest, a higher position in the table indicates a higher precedence.

For those operators that are also used in the C programming language, the order of precedence used in this Specification is the same as used in the C programming language.

TABLE

Operation precedence from highest (at top of table) to lowest (at bottom of table) operations (with operands x, y, and z)

"x++", "x−−"

"!x", "−x" (as a unary prefix operator)

$x^y$

"x * y", "x/y", "x ÷ y", "$\frac{x}{y}$", "x % y"

"x + y", "x − y" (as a two-argument operator), "$\sum_{i=x}^{y} f(i)$"

"x << y", "x >> y"

"x < y", "x <= y", "x > y", "x >= y"

"x == y", "x != y"

"x & y"

"x | y"

"x && y"

"x || y"

"x ? y : z"

"x . . . y"

"x = y", "x += y", "x −= y"

Text Description of Logical Operations

In the text, a statement of logical operations as would be described mathematically in the following form:

```
if( condition 0 )
    statement 0
else if( condition 1 )
    statement 1
...
else /* informative remark on remaining condition */
    statement n
``` may be described in the following manner:
. . . as follows/ . . . the following applies:
  If condition 0, statement 0
  Otherwise, if condition 1, statement 1
  . . .
  Otherwise (informative remark on remaining condition), statement n Each "If . . . Otherwise, if . . . Otherwise, . . . " statement in the text is introduced with "as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b )
    statement 0
else if( condition 1a | | condition 1b )
    statement 1
...
else
    statement n
``` may be described in the following manner:
. . . as follows/ . . . the following applies:
  If all of the following conditions are true, statement 0:
  condition 0a
  condition 0b
  Otherwise, if one or more of the following conditions are true, statement 1:
  condition 1a
  condition 1b
  . . .
  Otherwise, statement n In the text, a statement of logical operations as would be described mathematically in the following form:

```
if( condition 0 )
    statement 0
if( condition 1)
    statement 1
``` may be described in the following manner:
  When condition 0, statement 0
  When condition 1, statement 1.

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, electrically erasable programmable ROM (EEPROM), compact-disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, DVD, floppy disk and BLU-RAY disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method comprising:
   determining, for a block coded in an affine mode, control point motion vectors (CPMVs);
   determining, based on the CPMVs, a reference area in a reference picture corresponding to a sub-block of the block;
   setting a variable clipMVX equal to TRUE when a first size of the reference area is greater than a predefined threshold, wherein the predefined threshold is 72;
   setting the variable clipMVX equal to FALSE when the first size is less than or equal to the predefined threshold;
   deriving a pixel-based motion vector field for the block, wherein, when the variable clipMVX is equal to TRUE, deriving the pixel-based motion vector field further comprises motion vector clipping with a first motion vector range, and wherein the first motion vector range is based on the CPMVs and a second size of the block; and
   scaling, according to subsampling parameters SubWidthC and SubHeightC, the first motion vector range to obtain a scaled first motion vector range.

2. The method of claim 1, further comprising:
   determining a first motion vector for a central point of the block; and
   determining a second motion vector range based on the first motion vector and predefined offsets for a respective block size, wherein the respective block size comprises the second size.

3. The method of claim 2, further comprising further determining the first motion vector using equations, wherein the equations comprise:

$mv\_center[0]=(mvBaseScaled[0]+dX[0]*(cbWidth\!\!>\!\!>\!\!1)+dY[0]*(cbHeight\!\!>\!\!>\!\!1));$ and $mv\_center[1]=(mvBaseScaled[1]+dX[1]*(cbWidth\!\!>\!\!>\!\!1)+dY[1]*(cbHeight\!\!>\!\!>\!\!1)),$ wherein mvBaseScaled represents a second motion vector of a top left corner of the block, wherein cbWidth represents a width of the block, wherein cbHeight represents a height of the block, wherein dX[0] represents a difference of a horizontal part of the first motion vector per one sample in a horizontal direction, wherein dX[1] represents a difference of a vertical part of the first motion vector per one sample in the horizontal direction, wherein dY[0] represents a difference of a horizontal part of the first motion vector per one sample in a vertical direction, wherein dY[1] represents a difference of a vertical part of the first motion vector per one sample in the vertical direction, wherein mv_center [0] represents a horizontal part of the first motion vector for the central point, and wherein mv_center [1] represents a vertical part of the first motion vector for the central point.

4. The method of claim 2, further comprising further determining the second motion vector range using equations, wherein the equations comprise:

$mv\_hor\_min=mv\_center[0]-deviationMV[\log 2CbWidth-3];$ $mv\_ver\_min=mv\_center[1]-deviationMV[\log 2CbHeight-3];$ $mv\_hor\_max=mv\_center[0]+deviationMV[\log 2CbWidth-3];$ and $mv\_ver\_max=mv\_center[1]+deviationMV[\log 2CbHeight-3],$ wherein deviationMV[log 2CbWidth−3] and deviationMV [log 2CbHeight−3] represents a table of the predefined offsets, wherein mv_center [0] represents a horizontal part of the first motion vector for the central point, and wherein mv_center [1] represents a vertical part of the first motion vector for the central point, and wherein mv_hor_min, mv_ver_min, mv_hor_max, and mv_ver_max represent the second motion vector range.

5. The method of claim 2, wherein the predefined offsets are proportional to {64, 128, 272, 560, 1136}, and wherein 64 corresponds to the respective block size having corresponding dimension equal to 8, 128 corresponds to the respective block size having corresponding dimension equal to 16, 272 corresponds to the respective block size having corresponding dimension equal to 32, 560 corresponds to the respective block size having corresponding dimension equal to 64, or 1136 corresponds to the respective block size having corresponding dimension equal to 128.

6. The method of claim 1, further comprising further scaling the first motion vector range, using equations to obtain the scaled first motion vector range, wherein the equations comprise:

$hor\_min2=hor\_min1/SubWidthC;$ $hor\_max2=hor\_max1/SubWidthC;$ $ver\_min2=ver\_min1/SubHeightC;$ and $ver\_max2=ver\_max1/SubHeightC,$ wherein hor_min2, ver_min2, hor_max2, and ver_max2 represent the scaled first motion vector range, and wherein hor_min1, ver_min1, hor_max1, and ver_max1 represent the first motion vector range.

7. The method of claim 1, further comprising:
   obtaining interpolated samples in the reference picture based on the pixel-based motion vector field using bilinear interpolation; and
   applying a high-pass filter to the interpolated samples.

8. The method of claim 1, wherein the sub-block has a third size of 4×4.

9. The method of claim 1, wherein, in the affine mode, an affine inter-prediction comprises bi-prediction, and wherein the method further comprises:
   deriving a variable clipMV0 for list 0;
   deriving a variable clipMV1 for list 1; and
   deriving a variable clipMV as clipMV0|clipMV1, wherein represents OR operation.

10. A computer program product comprising computer-executable instructions that are stored on a non-transitory computer-readable medium and that, when executed by a processor, cause a computer device to:
- determine, for a block coded in an affine mode, control point motion vectors (CPMVs);
- determine, based on the CPMVs, a reference area in a reference picture corresponding to a sub-block of the block;
- set a variable clipMVX equal to TRUE when a first size of the reference area is greater than a predefined threshold, wherein the predefined threshold is 72;
- set the variable clipMVX equal to FALSE when the first size is less than or equal to the predefined threshold;
- derive a pixel-based motion vector field for the block;
- perform motion vector clipping with a first motion vector range when the variable clipMVX is equal to TRUE, wherein the first motion vector range is based on the CPMVs and a second size of the block; and
- scale, according to subsampling parameters SubWidthC and SubHeightC, the first motion vector range to obtain a scaled first motion vector range.

11. A computer device comprising:
- a processor; and
- a memory coupled to the processor and configured to store programming instructions, wherein when executed by the processor, the programming instructions cause the computer device to:
  - determine, for an affine coded block coded in an affine mode, control point motion vectors (CPMVs) to determine a reference area in a reference picture corresponding to a sub-block of the affine coded block based on the CPMVs;
  - set a variable clipMVX equal to TRUE when a first size of the reference area is greater than a predefined threshold, wherein the predefined threshold is 72;
  - set the variable clipMVX equal to FALSE when the first size is less than or equal to the predefined threshold;
  - perform motion vector clipping with a first motion vector range when the variable clipMVX is equal to TRUE, wherein the first motion vector range is based on the CPMVs and a second size of the affine coded block; and
  - scale, according to subsampling parameters SubWidthC and SubHeightC, the first motion vector range to obtain a scaled first motion vector range.

12. The computer device of claim 11, wherein when executed by the processor, the programming instructions further cause the computer device to:
- determine a first motion vector for a central point of the affine coded block; and
- determine a second motion vector range based on the first motion vector and predefined offsets for a respective block size, wherein the respective block size comprises the second size.

13. The computer device of claim 12, wherein when executed by the processor, the programming instructions further cause the computer device to further determine the first motion vector using equations, and wherein the equations comprise:

$$mv\_center[0]=(mvBaseScaled[0]+dX[0]*(cbWidth>>1)+dY[0]*(cbHeight>>1)); \text{ and}$$

$$mv\_center[1]=(mvBaseScaled[1]+dX[1]*(cbWidth>>1)+dY[1]*(cbHeight>>1)),$$

wherein mvBaseScaled represents a second motion vector of a top left corner of the affine coded block, wherein cbWidth represents a width of the block, wherein cbHeight represents a height of the block, wherein dX[0] represents a difference of a horizontal part of the first motion vector per one sample in a horizontal direction, wherein dX[1] represents a difference of a vertical part of the first motion vector per one sample in the horizontal direction, wherein dY[0] represents a difference of a horizontal part of the first motion vector per one sample in a vertical direction, wherein dY[1] represents a difference of a vertical part of the first motion vector per one sample in the vertical direction, wherein mv_center [0] represents a horizontal part of the first motion vector for the central point, and wherein mv_center [1] represents a vertical part of the first motion vector for the central point.

14. The computer device of claim 12, wherein when executed by the processor, the programming instructions further cause the computer device to further determine the second motion vector range using equations, and wherein the equations comprise:

$$mv\_hor\_min=mv\_center[0]-deviationMV[\log 2CbWidth-3];$$

$$mv\_ver\_min=mv\_center[1]-deviationMV[\log 2CbHeight-3];$$

$$mv\_hor\_max=mv\_center[0]+deviationMV[\log 2CbWidth-3]; \text{ and}$$

$$mv\_ver\_max=mv\_center[1]+deviationMV[\log 2CbHeight-3],$$

wherein deviationMV[log 2CbWidth−3] and deviationMV[log 2CbHeight−3] represents a table of the predefined offsets, wherein mv_center [0] represents a horizontal part of the first motion vector for the central point, and wherein mv_center [1] represents a vertical part of the first motion vector for the central point, and wherein mv_hor_min, mv_ver_min, mv_hor_max, and mv_ver_max represent the second motion vector range.

15. The computer device of claim 12, wherein the predefined offsets are proportional to {64, 128, 272, 560, 1136}, and wherein 64 corresponds to the respective block size having corresponding dimension 128 corresponds to the respective block size having corresponding dimension equal to 16, 272 corresponds to the respective block size having corresponding dimension equal to 32, 560 corresponds to the respective block size having corresponding dimension equal to 64, or 1136 corresponds to the respective block size having corresponding dimension equal to 128.

16. The computer device of claim 12, wherein when executed by the processor, the programming instructions further cause the computer device to further scale the first motion vector range, using equations to obtain a scaled first motion vector range, and wherein the equations comprise:

$$hor\_min2=hor\_min1/SubWidthC;$$

$$hor\_max2=hor\_max1/SubWidthC;$$

$$ver\_min2=ver\_min1/SubHeightC; \text{ and}$$

$$ver\_max2=ver\_max1/SubHeightC,$$

wherein hor_min2, ver_min2, hor_max2, and ver_max2 represent the scaled first motion vector range, and wherein hor_min1, ver_min1, hor_max1, and ver_max1 represent the first motion vector range.

17. The computer device of claim 12, wherein when executed by the processor, the programming instructions further cause the computer device to:
- obtain interpolated samples in the reference picture based on the pixel-based motion vector field using bilinear interpolation; and
- apply a high-pass filter to the interpolated samples.

18. The computer device of claim 12, wherein the sub-block has a third size of 4×4.

19. The computer program product of claim 10, wherein the sub-block has a size of 4×4.

20. The computer program product of claim 10, wherein when executed by the processor, the computer-executable instructions further cause the computer device to:
- obtain interpolated samples in the reference picture based on the pixel-based motion vector field using bilinear interpolation; and
- apply a high-pass filter to the interpolated samples.

* * * * *